(12) United States Patent
Sawai

(10) Patent No.: US 10,979,937 B2
(45) Date of Patent: Apr. 13, 2021

(54) COMMUNICATION CONTROL DEVICE AND COMMUNICATION CONTROL METHOD FOR CONTROLLING FREQUENCY CHANNEL SHARING AND HANDOVER ARRANGEMENTS BETWEEN PRIMARY SYSTEM AND SECONDARY SYSTEM

(71) Applicant: SONY CORPORATION, Tokyo (JP)

(72) Inventor: Ryo Sawai, Tokyo (JP)

(73) Assignee: SONY CORPORATION, Tokyo (JP)

(*) Notice: Subject to any disclaimer, the term of this patent is extended or adjusted under 35 U.S.C. 154(b) by 14 days.

(21) Appl. No.: 14/761,445

(22) PCT Filed: Jan. 14, 2014

(86) PCT No.: PCT/JP2014/050482
§ 371 (c)(1),
(2) Date: Jul. 16, 2015

(87) PCT Pub. No.: WO2014/148069
PCT Pub. Date: Sep. 25, 2014

(65) Prior Publication Data
US 2015/0365848 A1 Dec. 17, 2015

(30) Foreign Application Priority Data

Mar. 19, 2013 (JP) .............................. JP2013-056700

(51) Int. Cl.
*H04W 36/00* (2009.01)
*H04W 16/14* (2009.01)
(Continued)

(52) U.S. Cl.
CPC ....... *H04W 36/0005* (2013.01); *H04W 16/14* (2013.01); *H04W 36/0055* (2013.01);
(Continued)

(58) Field of Classification Search
CPC . H04W 36/0005; H04W 16/14; H04W 36/08; H04W 36/0058; H04W 36/0055; H04W 84/20
See application file for complete search history.

(56) References Cited

U.S. PATENT DOCUMENTS 9,629,050 B2 * 4/2017 Siomina ................ H04W 36/04
9,642,021 B2 * 5/2017 Siomina ................ H04W 24/10
(Continued)

FOREIGN PATENT DOCUMENTS

JP  2008-099306 A  4/2008
JP  2012-516108 A  7/2012
(Continued)

OTHER PUBLICATIONS

"Technical and Operational Requirements for the Possible Operation of Cognitive Radio Systems in the "White Spaces" of the Frequency Band 470-790 MHz" ECC Report 159, Jan. 2011, 163 Pages.

(Continued)

*Primary Examiner* — Erin F Heard
*Assistant Examiner* — Donald H B Braswell
(74) *Attorney, Agent, or Firm* — Xsensus LLP

(57) ABSTRACT

[Object] To enable the wireless communication that is being performed already to be continued in the secondary system. [Solution] Provided is a communication control device including: a recognizing unit configured to recognize a handover of a wireless communication device, the handover enabling the wireless communication device to communicate wirelessly through a frequency channel for a primary system in a secondary system that secondarily utilizes the frequency channel; and a control unit configured to control the handover of the wireless communication device.

22 Claims, 35 Drawing Sheets

(51) Int. Cl.
*H04W 36/08* (2009.01)
*H04W 84/20* (2009.01)

(52) U.S. Cl.
CPC ........ *H04W 36/0058* (2018.08); *H04W 36/08* (2013.01); *H04W 84/20* (2013.01)

(56) References Cited

U.S. PATENT DOCUMENTS

| | | | |
|---|---|---|---|
| 9,648,626 B2* | 5/2017 | Uemura | H04L 5/001 |
| 2004/0018839 A1* | 1/2004 | Andric | H04L 12/2856 |
| | | | 455/433 |
| 2010/0184435 A1 | 7/2010 | Shellhammer et al. | |
| 2010/0246506 A1* | 9/2010 | Krishnaswamy | H04W 72/085 |
| | | | 370/329 |
| 2011/0310866 A1 | 12/2011 | Kennedy et al. | |
| 2012/0039284 A1 | 2/2012 | Barbieri et al. | |
| 2013/0336156 A1* | 12/2013 | Wei | H04W 72/0453 |
| | | | 370/252 |
| 2016/0192166 A1* | 6/2016 | deCharms | H04W 4/021 |
| | | | 348/14.02 |

FOREIGN PATENT DOCUMENTS

| | | |
|---|---|---|
| JP | 2-521729 A | 9/2012 |
| JP | 2012-182713 A | 9/2012 |
| JP | 2012-521729 A | 9/2012 |
| WO | WO 2008/058224 A2 | 5/2008 |
| WO | 2012/116489 A1 | 9/2012 |

OTHER PUBLICATIONS

"Complementary Report to ECC Report 159; Further definition of technical and operational requirements for the operation of white space devices in the band 470-790 MHz" ECC Report 185, Approved Jan. 2013, 150 Pages.

Naotaka Sato (Sony Corporation), et al., "TV White Spaces as part of the future Spectrum Landscape for Wireless Communications" ETSI Reconfigurable Radio Systems Workshop, Dec. 12, 2012, Cannes, France, 8 Pages.

"Requirements, Candidate Solutions & Technology Roadmap for LTE Rel-12 Onward" NTT Docomo, Inc., 3GPP Workshop on Release 12 and Onwards, Ljubljana, Slovenia, Jun. 11-12, 2012, 27 Pages.

International Search Report dated Mar. 25, 2014 in PCT/JP2014/050482 (with English language translation).

Extended European Search Report dated Oct. 11, 2016, in European Application No. 14769786.6.

Office Action dated Oct. 3, 2017, in JP 2015-506620 (with English-language translation).

Office Action dated Dec. 19, 2017 in Japanese Application No. 2015-506620.

European Article 94(3) Communication dated Nov. 7, 2018, issued in corresponding European Patent Application No. 14 769 786.6.

Japanese Office Action dated Dec. 11, 2018, issued in corresponding Japanese Patent Application No. 2018-050612.

* cited by examiner

FIG.8
BEFORE HANDOVER
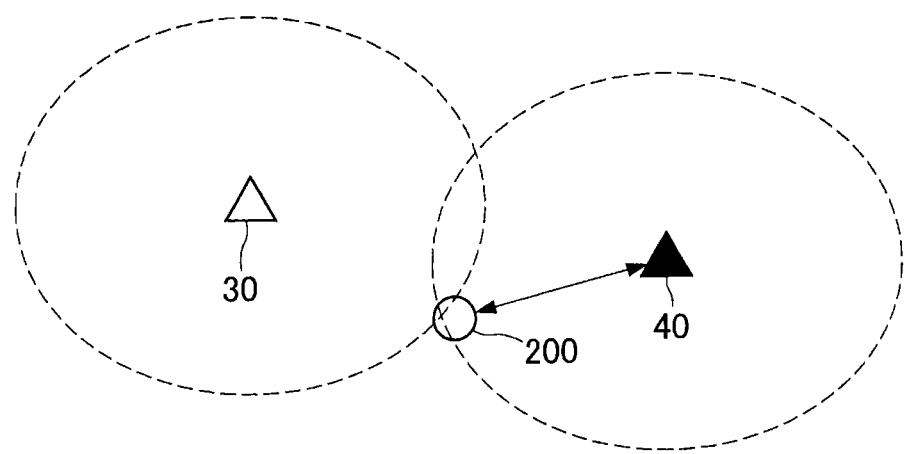
AFTER HANDOVER
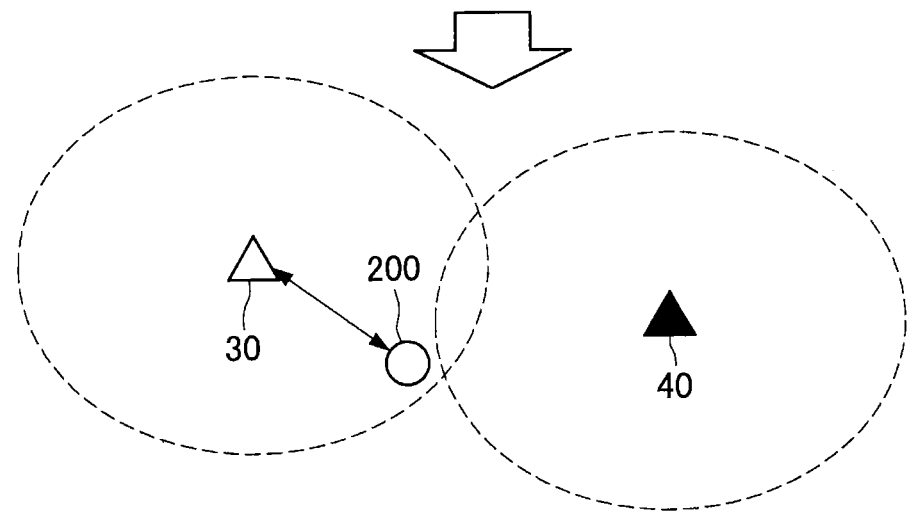
△ MASTER WSD
○ SLAVE WSD
▲ NODE OF PRIMARY SYSTEM

FIG.9
BEFORE HANDOVER
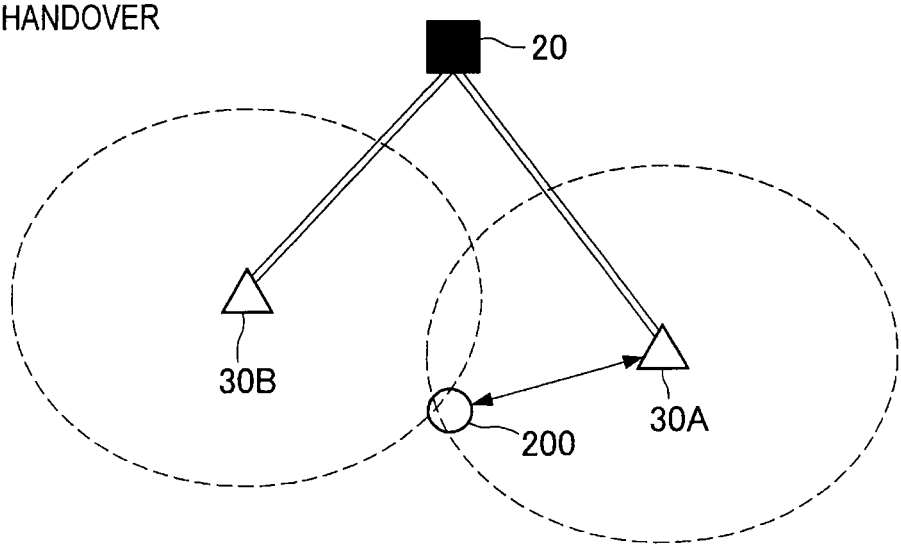
AFTER HANDOVER
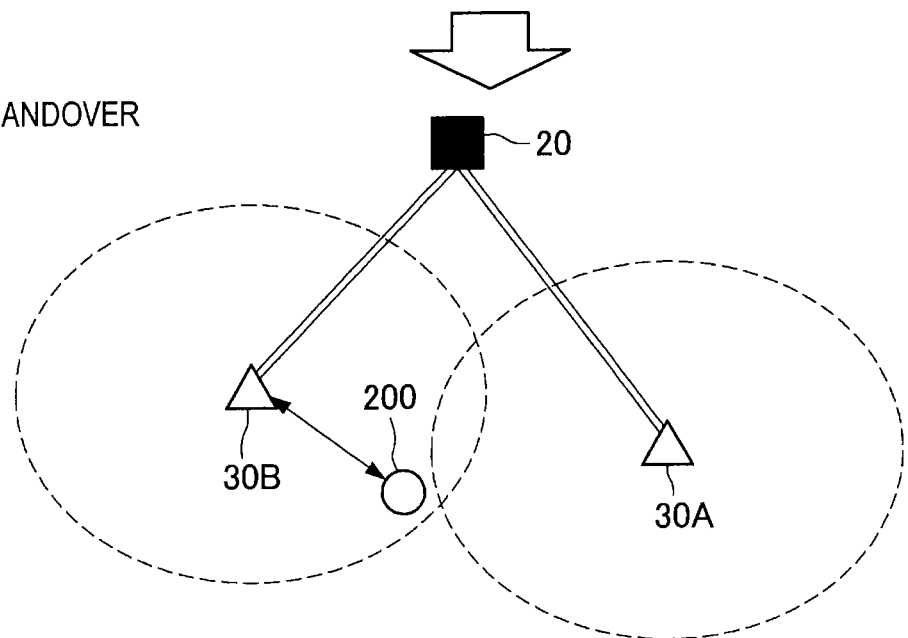
■ MANAMGEMENT DB
△ MASTER WSD
○ SLAVE WSD

FIG.10
BEFORE HANDOVER
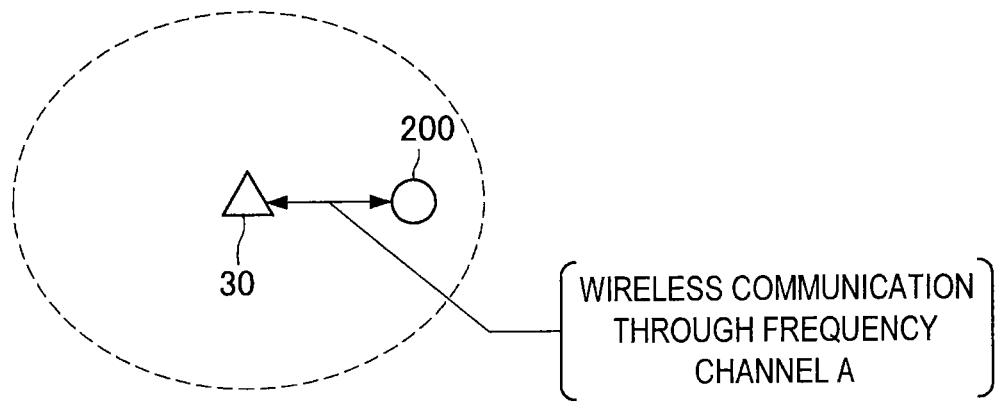
AFTER HANDOVER
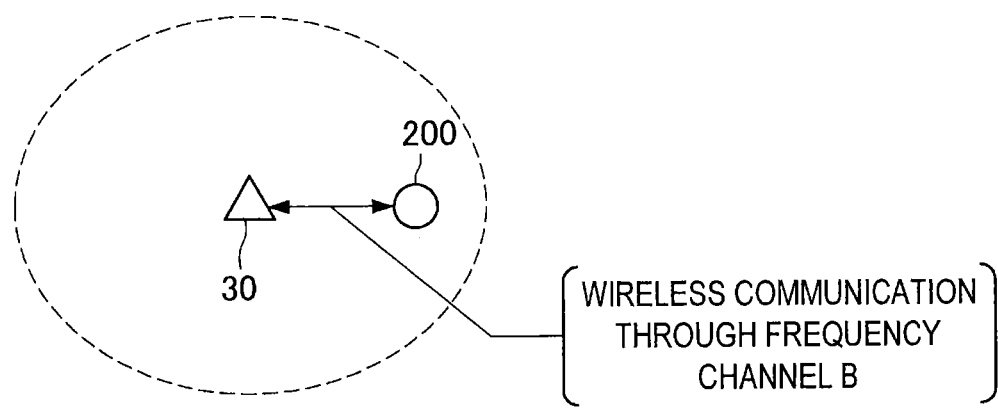
△ MASTER WSD
○ SLAVE WSD

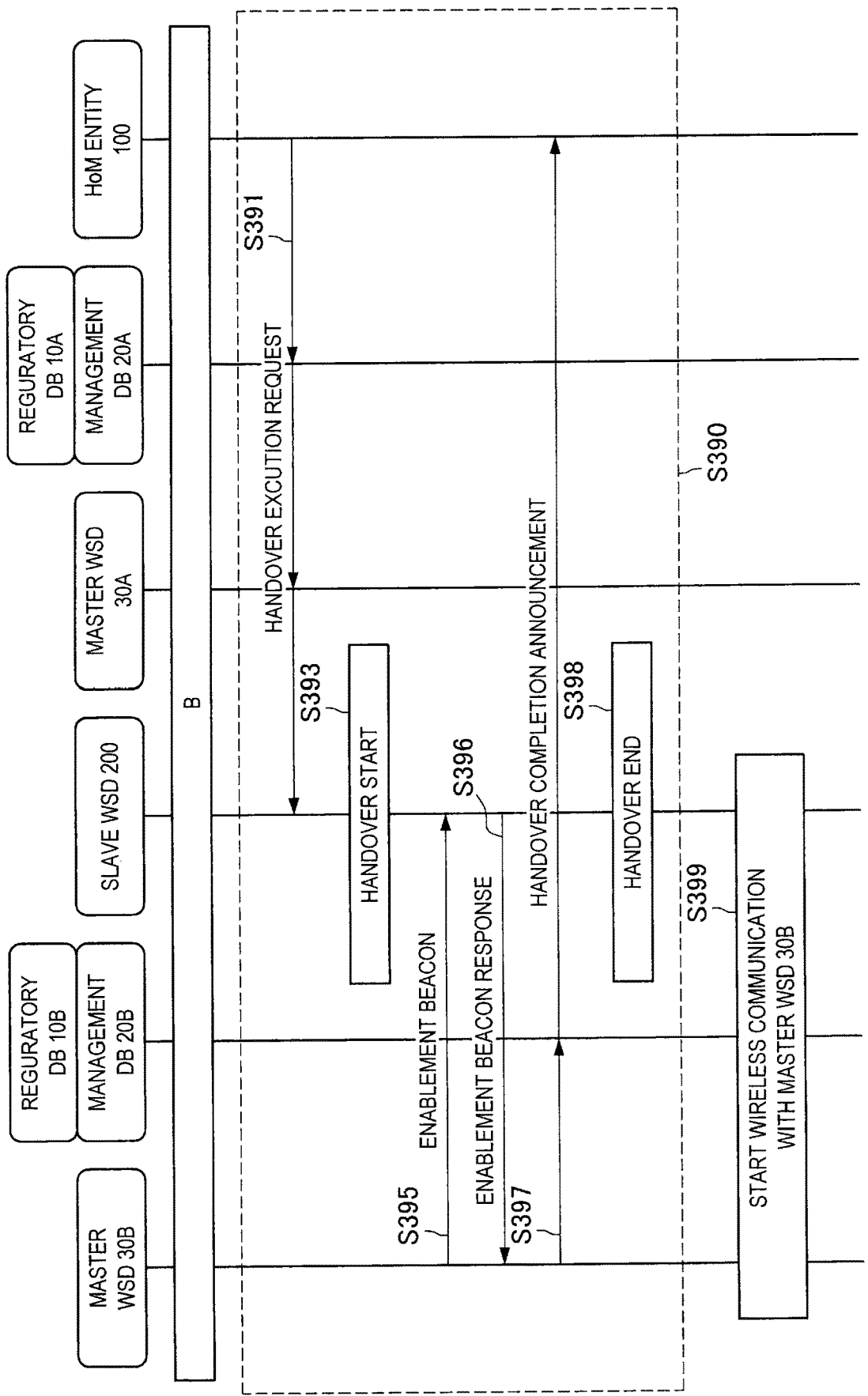

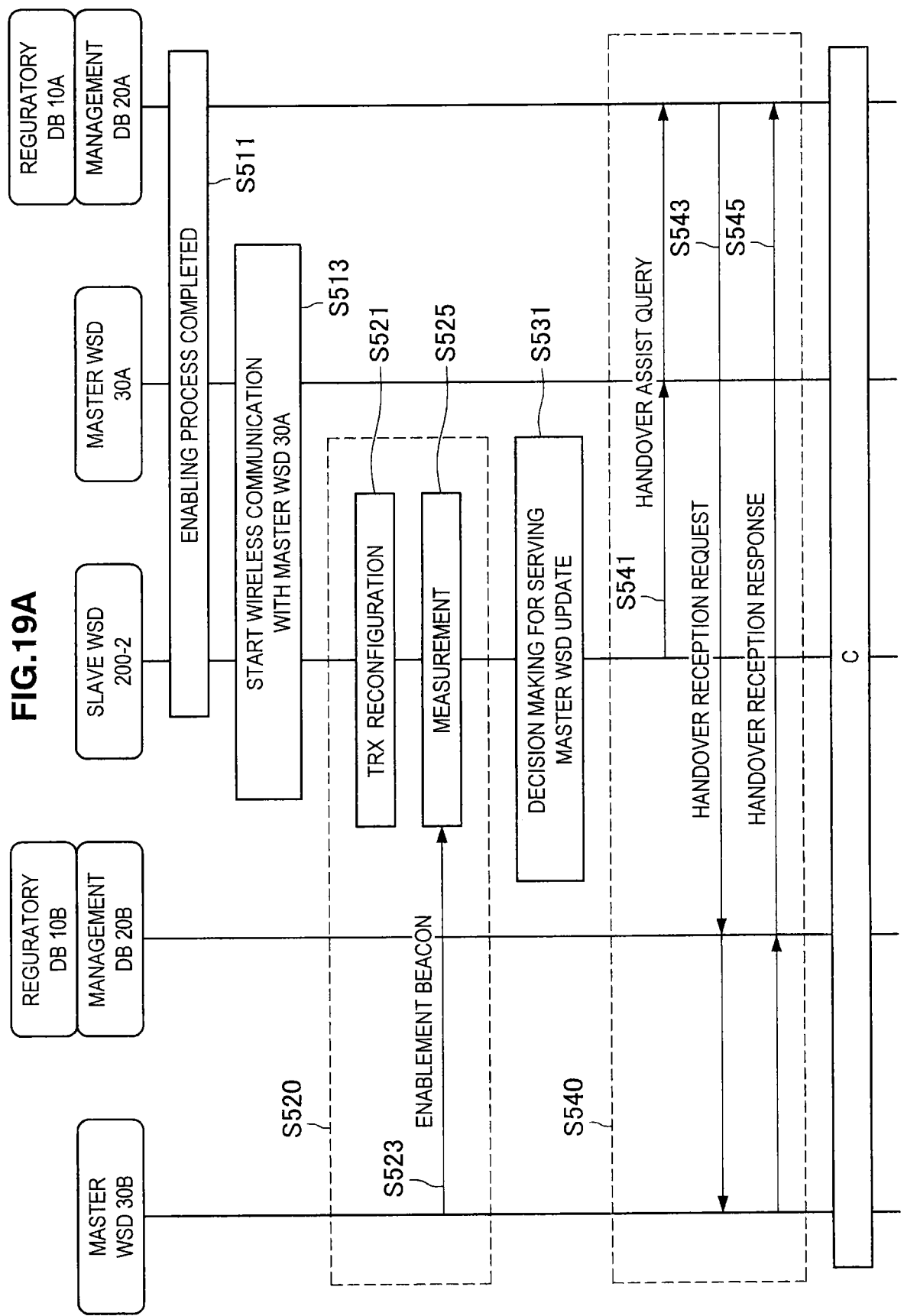

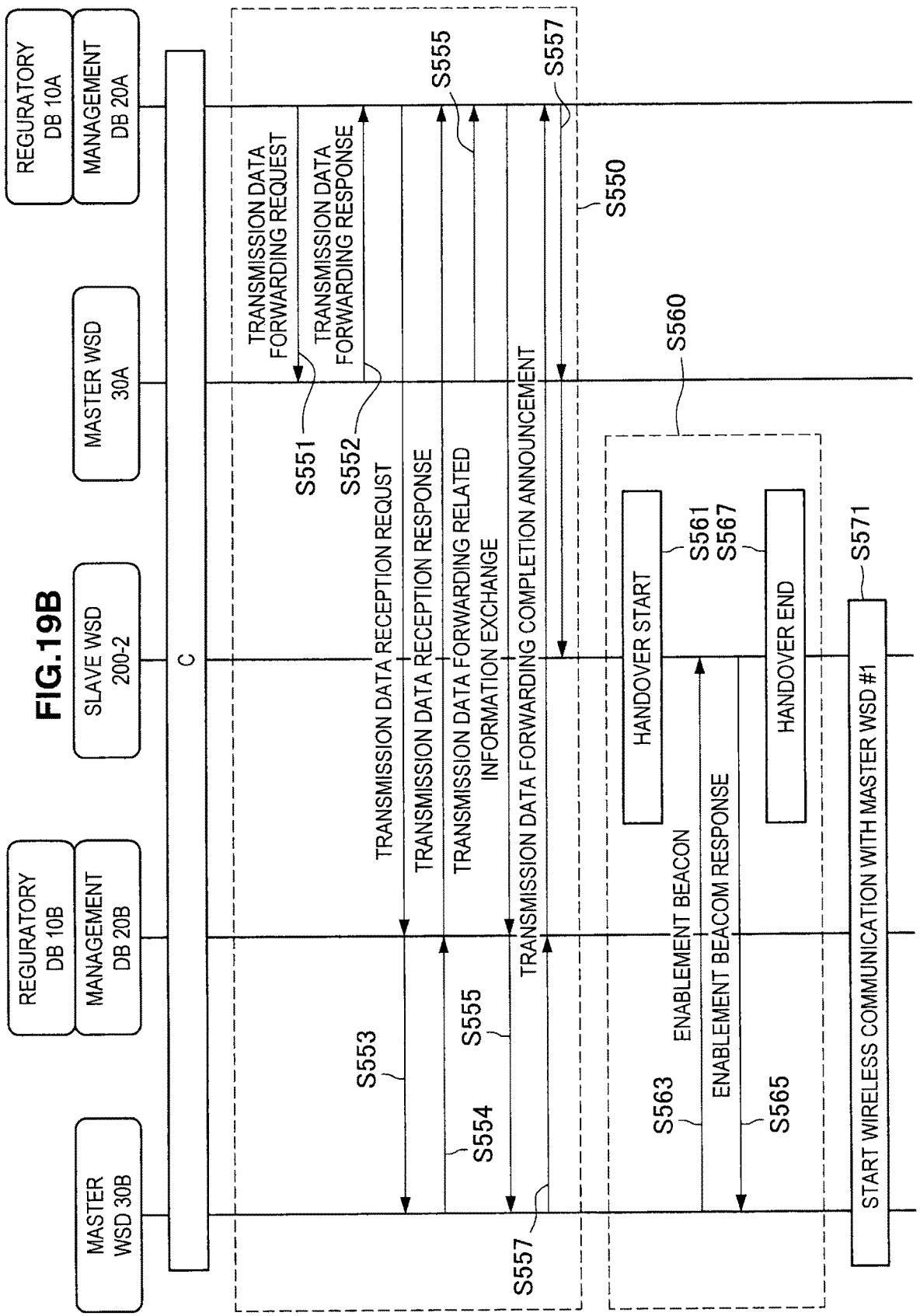

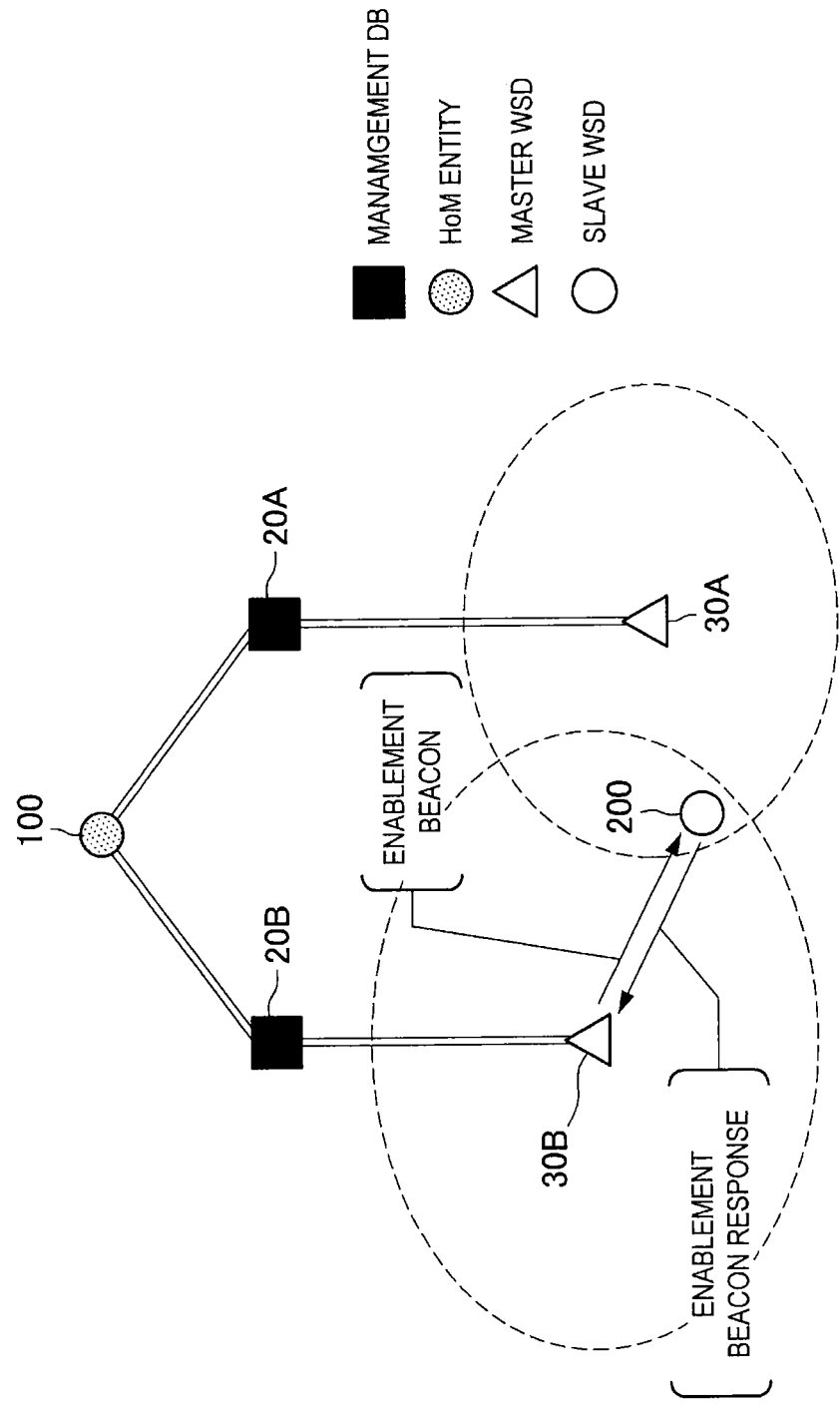

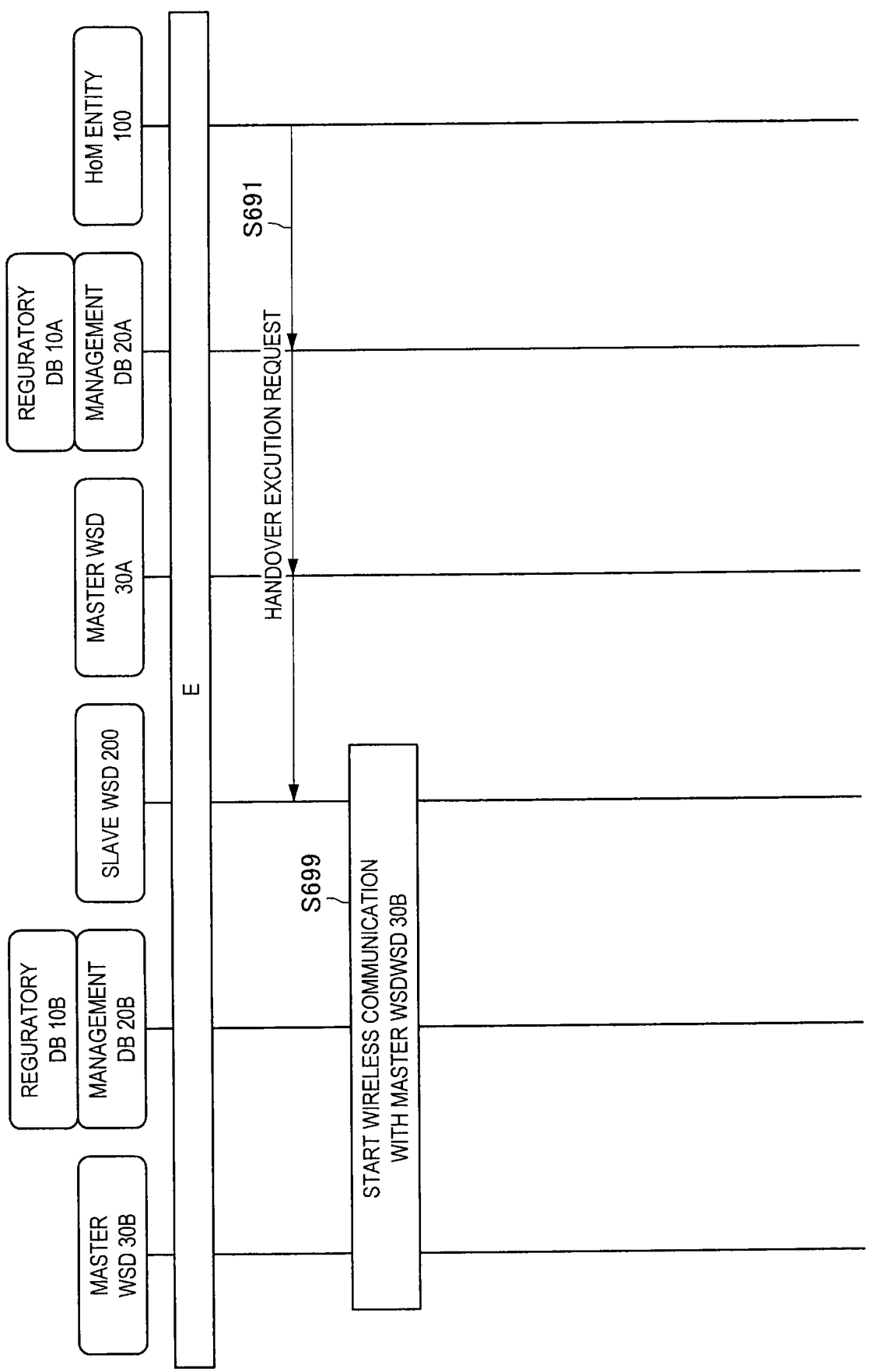

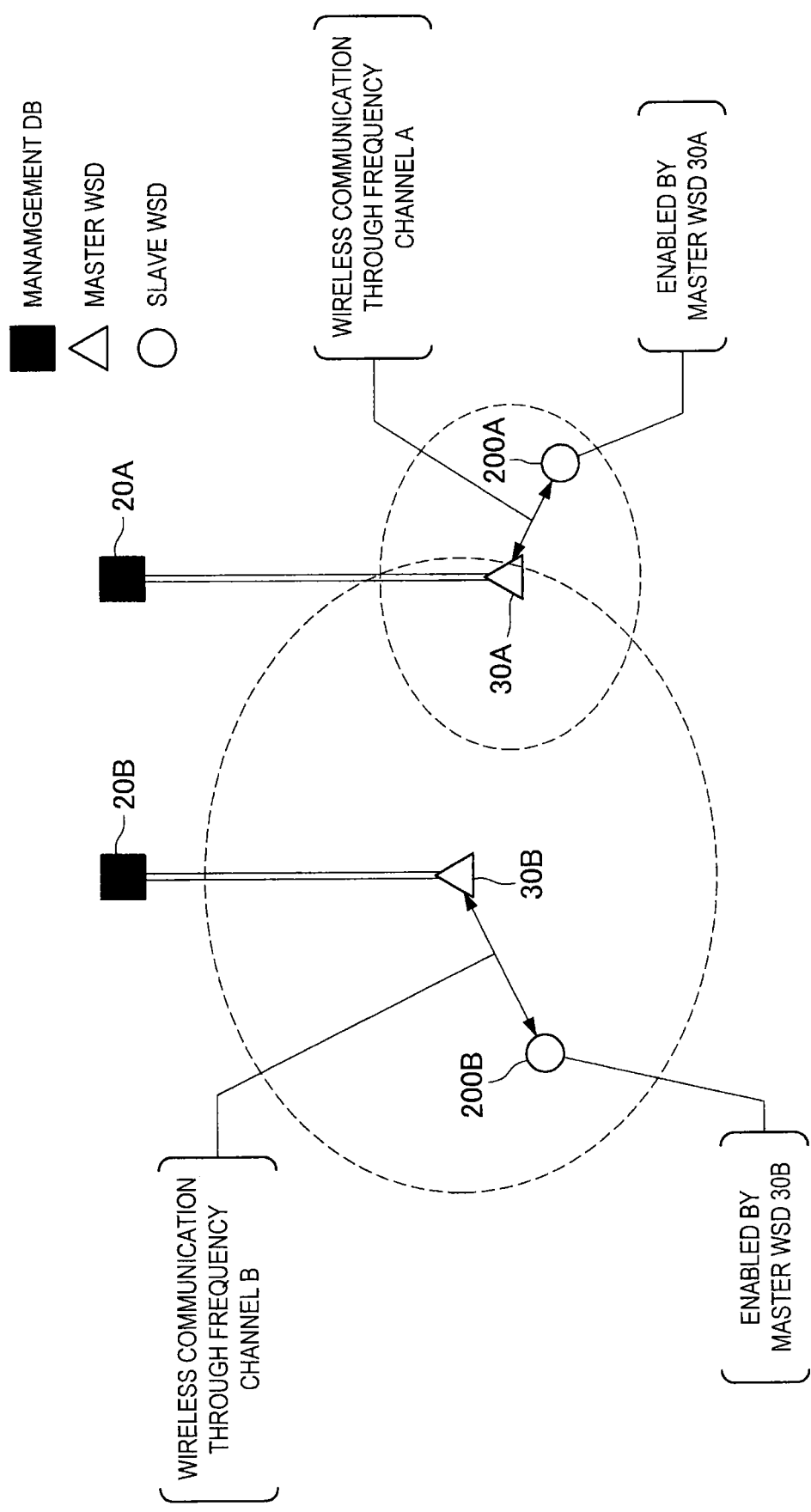

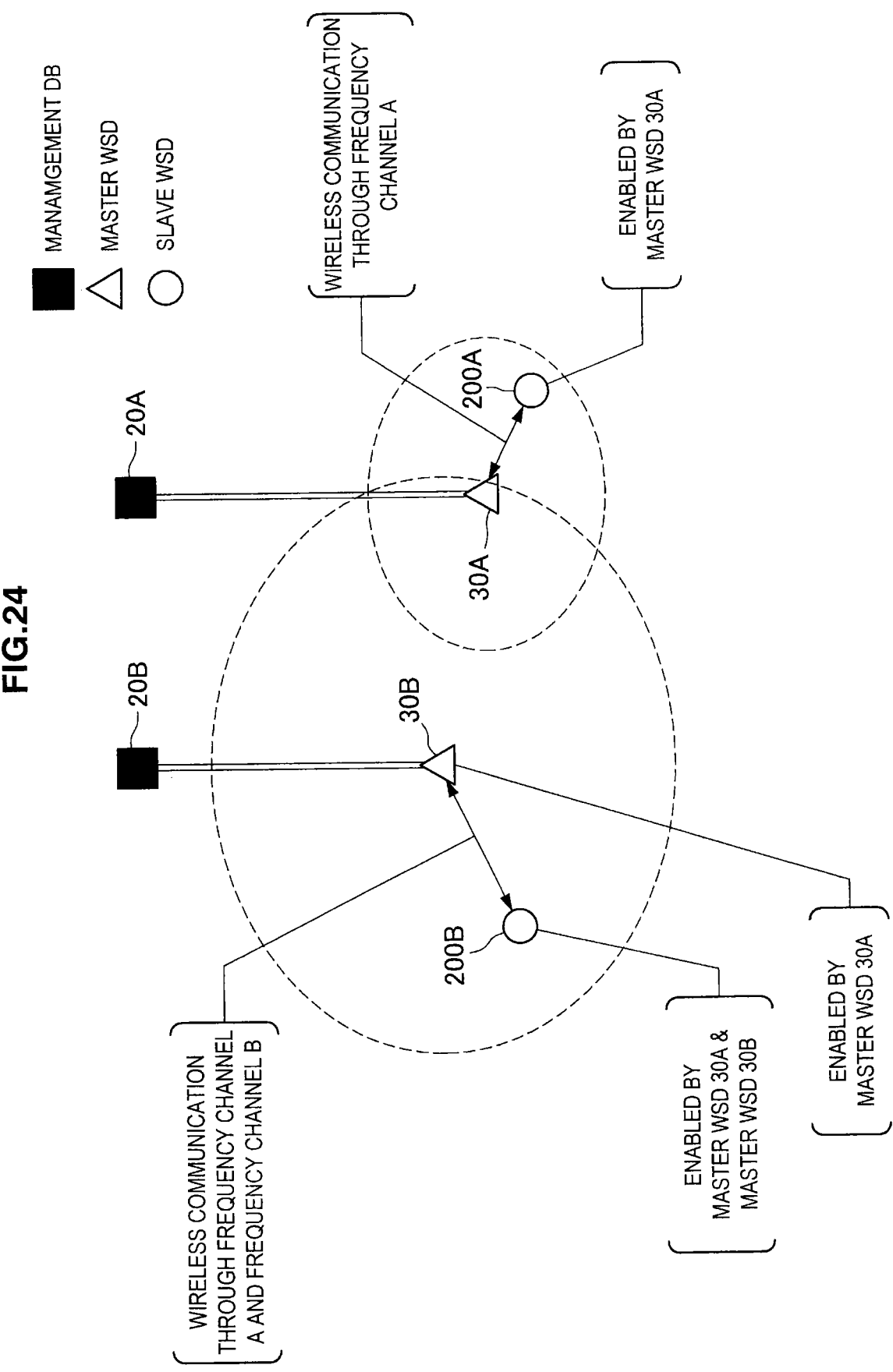

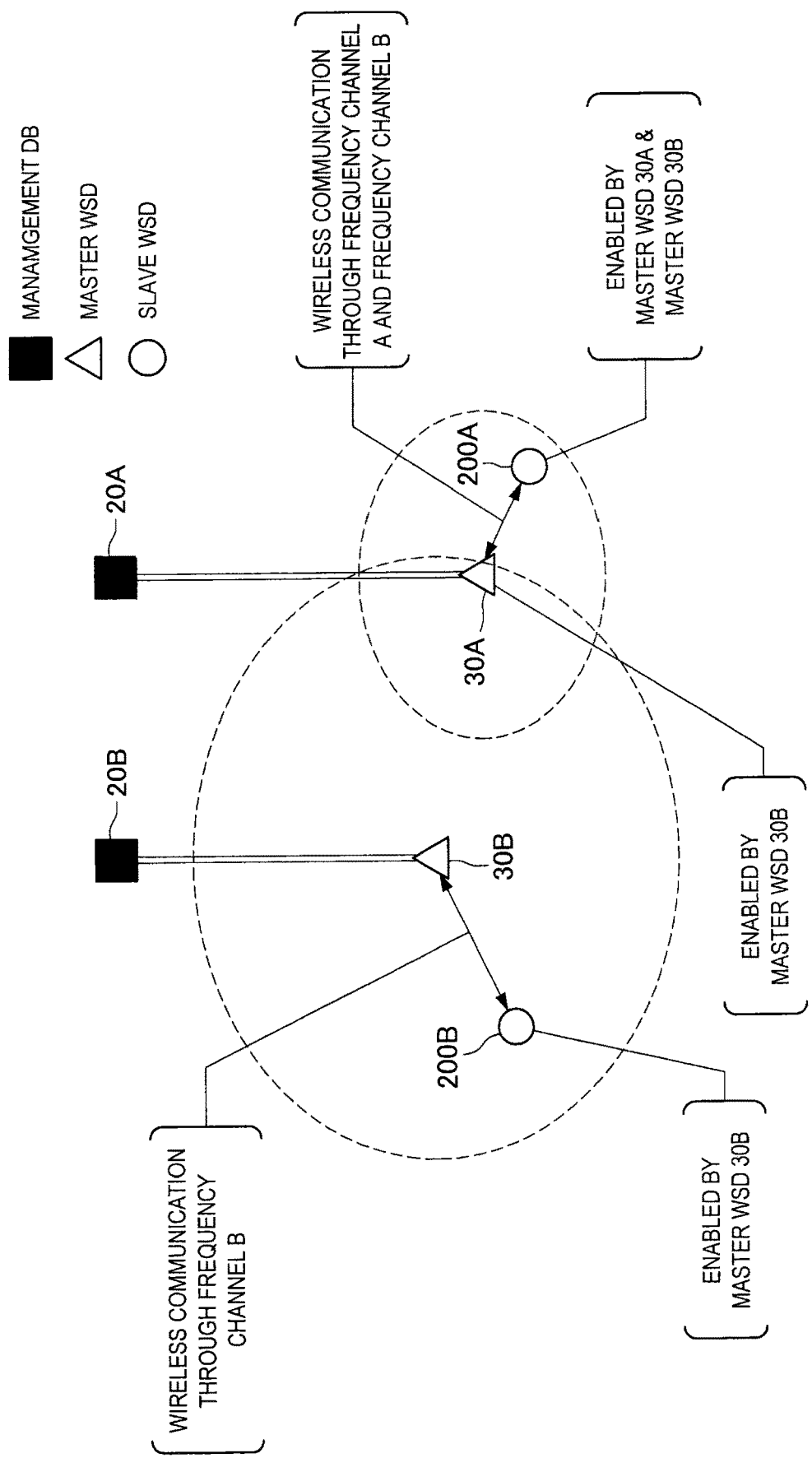

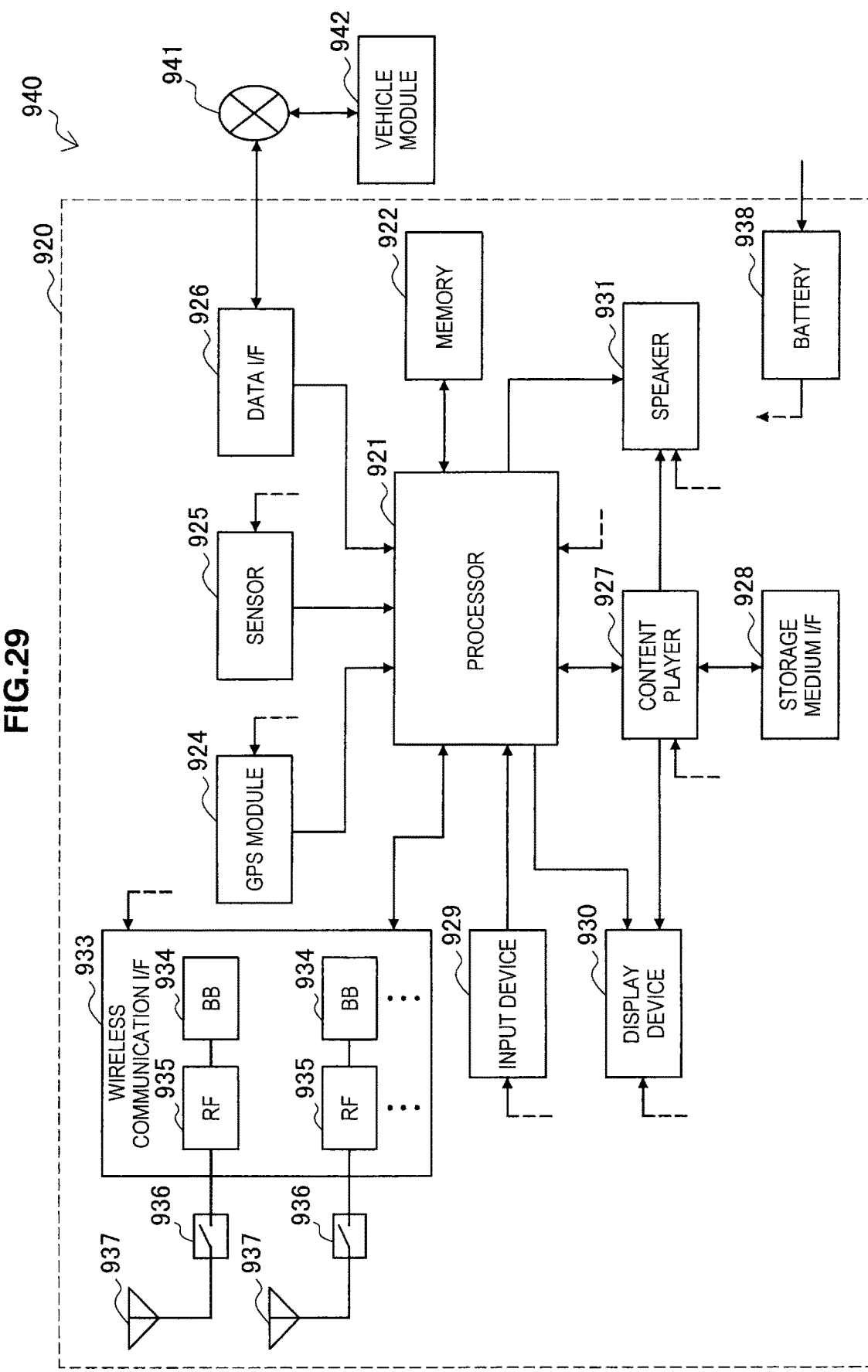

COMMUNICATION CONTROL DEVICE AND COMMUNICATION CONTROL METHOD FOR CONTROLLING FREQUENCY CHANNEL SHARING AND HANDOVER ARRANGEMENTS BETWEEN PRIMARY SYSTEM AND SECONDARY SYSTEM

TECHNICAL FIELD

The present disclosure relates to a communication control device, a communication control method, and a communication device.

BACKGROUND ART

Wireless communication environments of recent years are facing the problem of depletion of frequency resources, which has been caused by soaring amounts of data traffic. Thus, active discussions have been exchanged with regard to a framework for opening frequency bands that were authorized for use by specific business operators but are not being used for secondary communication. The framework for secondary communication is referred to as Licensed Shared Access (LSA). For example, the European Conference of Postal and Telecommunications Administrations (CEPT) suggests technical requirements for devices that secondarily use so-called "TV white spaces" (White Space Devices, or WSDs) that are not being used for television broadcasting in Non-Patent Literature 1 below.

Generally, transmission power of a transmitter that uses a frequency band secondarily is restricted from causing unfavorable interference with a receiver of a primary system. For example, Non-Patent Literature 1 below proposes deployment of a geo-location database (GLDB) which provides information on the coverage of digital terrestrial television (DTT) systems that are primary systems, positions of DTT receivers, tolerable interference levels, and the like in order to appropriately control transmission power of a WSD. Since use of frequency bands is normally authorized by country (or region), a different GLDB may be deployed for each country (or region).

Non-Patent Literature 3 below proposes, for example, a country or a third party installing an advanced geo-location engine (AGLE) which uses information provided from a GLDB for maximizing a system capacity of a secondary system through more advanced calculation. The frequency managing agent of the UK, the Office of Communications (OfCom), and a third party database provider have decided to employ the approach of installing an AGLE.

CITATION LIST

Non-Patent Literature

Non-Patent Literature 1: Electronic Communications Committee (ECC), "TECHNICAL AND OPERATIONAL REQUIREMENTS FOR THE POSSIBLE OPERATION OF COGNITIVE RADIO SYSTEMS IN THE 'WHITE SPACES' OF THE FREQUENCY BAND 470 TO 790 MHz," ECC REPORT 159, January 2011

Non-Patent Literature 2: Electronic Communications Committee (ECC), "Complementary Report to ECC Report 159; Further definition of technical and operational requirements for the operation of white space devices in the band 470 to 790 MHz," ECC REPORT 185, September 2012

Non-Patent Literature 3: Naotaka Sato (Sony Corporation), "TV WHITE SPACE AS PART OF THE FUTURE SPECTRUM LANDSCAPE FOR WIRELESS COMMUNICATIONS," ETSI Workshop on Reconfigurable Radio Systems, Dec. 12, 2012, Cannes (France)

SUMMARY OF INVENTION

Technical Problem

However, it is possible that a slave WSD that communicates wirelessly with a master WSD, which plays a role of an access point or a base station in a secondary system, is unable to continue the wireless communication that is being performed already in the secondary system.

As one example, it is possible that, when moving, the slave WSD is unable to continue the wireless communication with the master WSD in communication. Then, after the movement, the slave WSD newly executes an enabling process for enabling the wireless communication in the secondary system. Then, if there is a newly utilizable frequency band, the slave WSD newly starts the wireless communication in the frequency band, at the time point.

Also, as another example, it is possible that, when the period of a secondary use of a frequency band expires, the master WSD is unable to utilize the frequency band. As a result, the slave WSD that has performed wireless communication with the above master WSD at the frequency band is unable to continue the wireless communication. Then, the slave WSD newly performs the enabling process for enabling the wireless communication in the secondary system. Then, if there is a newly utilizable frequency band, the slave WSD newly starts the wireless communication in the frequency band, at the time point.

As described above, it is possible that the slave WSD is unable to continue the wireless communication that has been performed in the secondary system. The same problem arises not only in the secondary system with respect to a TV white space, but also in the secondary system of another type.

Thus, it is desirable to provide a scheme that enables the wireless communication that is being performed already to be continued in the secondary system.

Solution to Problem

According to the present disclosure, there is provided a communication control device including: a recognizing unit configured to recognize a handover of a wireless communication device, the handover enabling the wireless communication device to communicate wirelessly through a frequency channel for a primary system in a secondary system that secondarily utilizes the frequency channel; and a control unit configured to control the handover of the wireless communication device.

According to the present disclosure, there is provided a communication control method including: recognizing a handover of a wireless communication device, the handover enabling the wireless communication device to communicate wirelessly through a frequency channel for a primary system in a secondary system that secondarily utilizes the frequency channel; and controlling the handover of the wireless communication device.

Advantageous Effects of Invention

As described above, according to the present disclosure, the wireless communication that is being performed already is continued in the secondary system.

BRIEF DESCRIPTION OF DRAWINGS

FIG. 8 is an explanatory diagram for describing an example of a handover from a communication control node of a primary system to a master WSD of a secondary system.

FIG. 9 is an explanatory diagram for describing an example of a handover between master WSDs of the same secondary system.

FIG. 10 is an explanatory diagram for describing an example of a handover between frequency channels in a secondary system.

FIG. 13C is a third sequence diagram illustrating an example of a schematic flow of a communication control process according to a first embodiment.

FIG. 19A is a first sequence diagram illustrating an example of a schematic flow of a communication control process according to a third embodiment.

FIG. 19B is a second sequence diagram illustrating an example of a schematic flow of a communication control process according to a third embodiment.

FIG. 20 is an explanatory diagram for describing an example of a request performed for a wireless communication through a utilizable channel by a slave WSD.

FIG. 22C is a third sequence diagram illustrating an example of a schematic flow of a communication control process according to a first exemplary variant of an embodiment of the present disclosure.

FIG. 23 is an explanatory diagram for describing an example of a utilizable channel for each master WSD.

FIG. 24 is an explanatory diagram for describing an example in which a first secondary system causes a master WSD of a second secondary system to act as a slave network node.

FIG. 25 is an explanatory diagram for describing an example in which a master WSD of a first secondary system acts as a slave network node of a second secondary system.

FIG. 29 is a block diagram illustrating an example of a schematic configuration of a car navigation apparatus.

DESCRIPTION OF EMBODIMENTS

Figure 1:
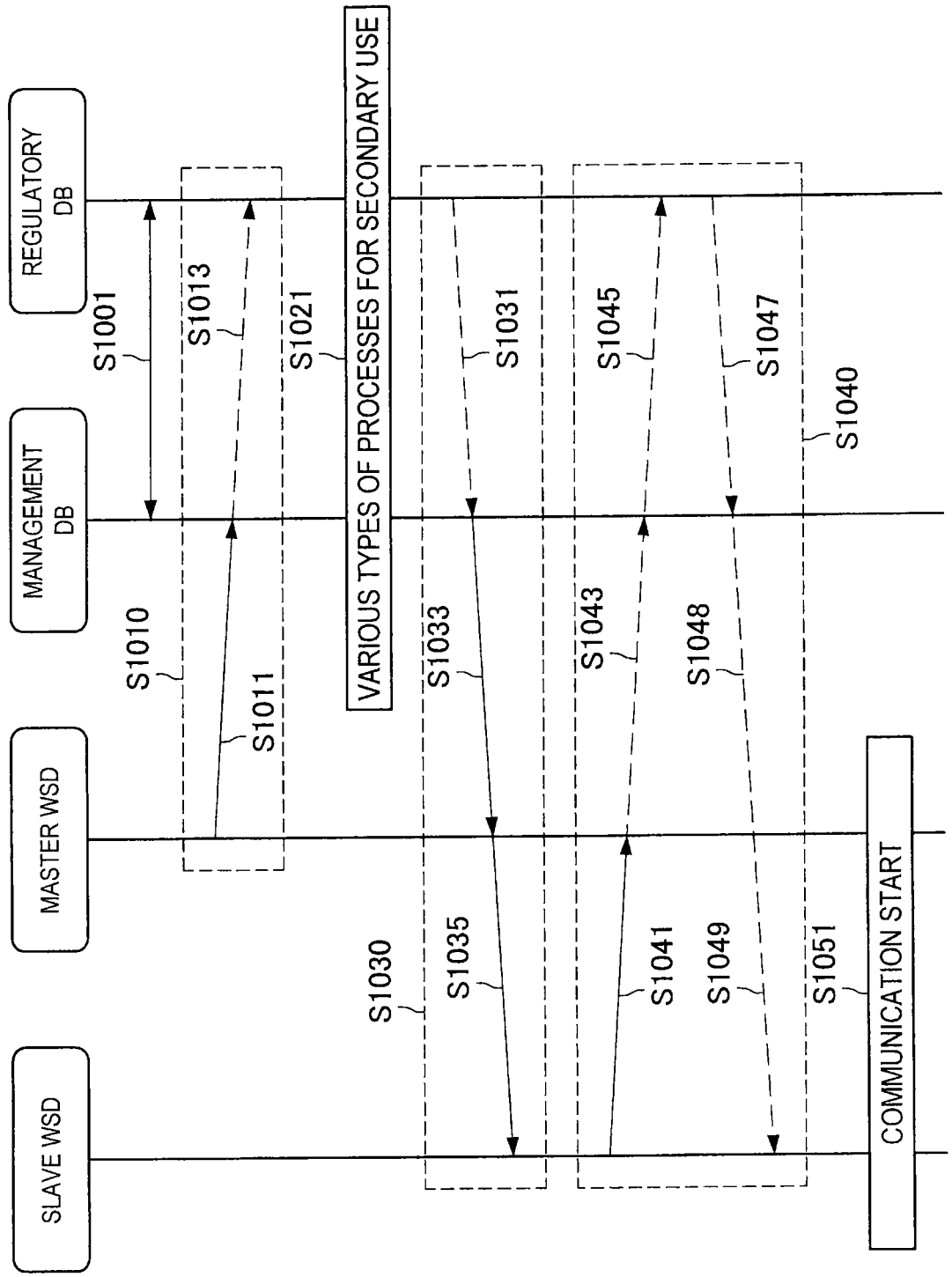
FIG. 1 is a sequence diagram illustrating an example of an enabling process.

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Note that, description will be made in the following order.
1. introduction
2. a schematic configuration of a secondary system according to the present embodiment
3. a handover according to the present embodiment
4. First Embodiment
4.1. a control by an HoM entity
4.2. function and configuration of an HoM entity 4.3. a flow of a process
4.4. another implementation example of an HoM entity
5. Second Embodiment
5.1. a function and configuration of a slave WSD
5.2. a flow of a process
6. Third Embodiment
6.1. a function and configuration of a slave WSD
6.2. a flow of a process
7. an exemplary variant
7.1. first exemplary variant
7.2. second exemplary variant
8. an application example
8.1. an application example relevant to an HoM entity
8.2. an application example relevant to a slave WSD
9. conclusion 1. Introduction First, as a related technology, an enabling process and a handover process in the cellular communication system will be described. Then, the technical problem and the new method of the present embodiment will be described briefly.
(Enabling Process)

First, in a secondary system with respect to a TV white space, the enabling process is executed, before the slave WSD starts wireless communication through a frequency channel (i.e., the frequency band) that is secondarily utilized by the secondary system. In the following, an example of the enabling process will be described with reference to FIG. 1.

FIG. 1 is a sequence diagram illustrating an example of the enabling process. In this example, interactions are performed between a slave WSD, a master WSD, a management database (hereinafter, referred to as "management DB"), and a regulatory database (hereinafter, referred to as "regulatory DB"). For example, the management DB is Registered Location Secure Server (RLSS) of IEEE802.11af, Coexistence Manager of IEEE802.19, Cognitive Engine of IEEE1900.6, or, the above AGLE. Also, for example, the regulatory DB is GLDB. Note that, where the interactions between the slave WSD, the master WSD, the management DB, and the regulatory DB are represented by solid lines and dotted lines, the solid lines represent essential interactions, and the dotted lines represent non-essential arbitrary interactions.

First, the management DB and the regulatory DB execute authentication, registration, exchange of basic information, and the like (S1001).

Also, before starting the operation of the network, or cyclically, the master WSD transmits to the management DB or the regulatory DB the information relevant to the operation of the network of itself (geolocation information, various types of IDs, utilization time, QoS, transmission and reception related information, etc.), as well as a query of secondary use start of a frequency channel (S1010). Thereafter, the management DB and/or the regulatory DB perform various types of processes necessary for the secondary use of the frequency channel (for example, approval of the query, etc.) (S1021).

Thereafter, when the query is approved, the frequency channel utilizable in the above network is notified (S1030). Specifically, the management DB or the regulatory DB transmits the above information relevant to the above frequency channel to the master WSD (S1031, S1033). Then, the master WSD transmits an enablement beacon through the above frequency channel (S1035). Hence, the slave WSD receives the above enablement beacon through the above frequency channel, to thereby know that the frequency channel is utilizable. Note that the enablement beacon may include information relevant to the frequency channel utilizable for the master WSD.

Then, a process in which the slave WSD communicates wirelessly through the above frequency channel is executed (S1040). Specifically, the slave WSD transmits a response to the enablement beacon (i.e., a query for communicating wirelessly through the above frequency channel) (S1041). Here, for example, the wireless communication through the above frequency channel is permitted. When the management DB or the regulatory DB executes the permission of the wireless communication of the slave WSD, the management DB or the regulatory DB executes the permission (S1043 to S1048).

Thereafter, the slave WSD communicates wirelessly through the above frequency channel with the master WSD (S1051).

As described above, the enabling process is executed. In the secondary system, the frequency channel of the primary system is just utilized secondarily, and therefore this enabling process necessitates confirmation whether the wireless communication is performable through the frequency channel. At this point, the secondary system is different from the primary system which can utilize the frequency channel basically any time.
(Enabling Process-Exemplary Variant)

Next, with reference to FIG. 2, an exemplary variant of the enabling process will be described.

Figure 2:
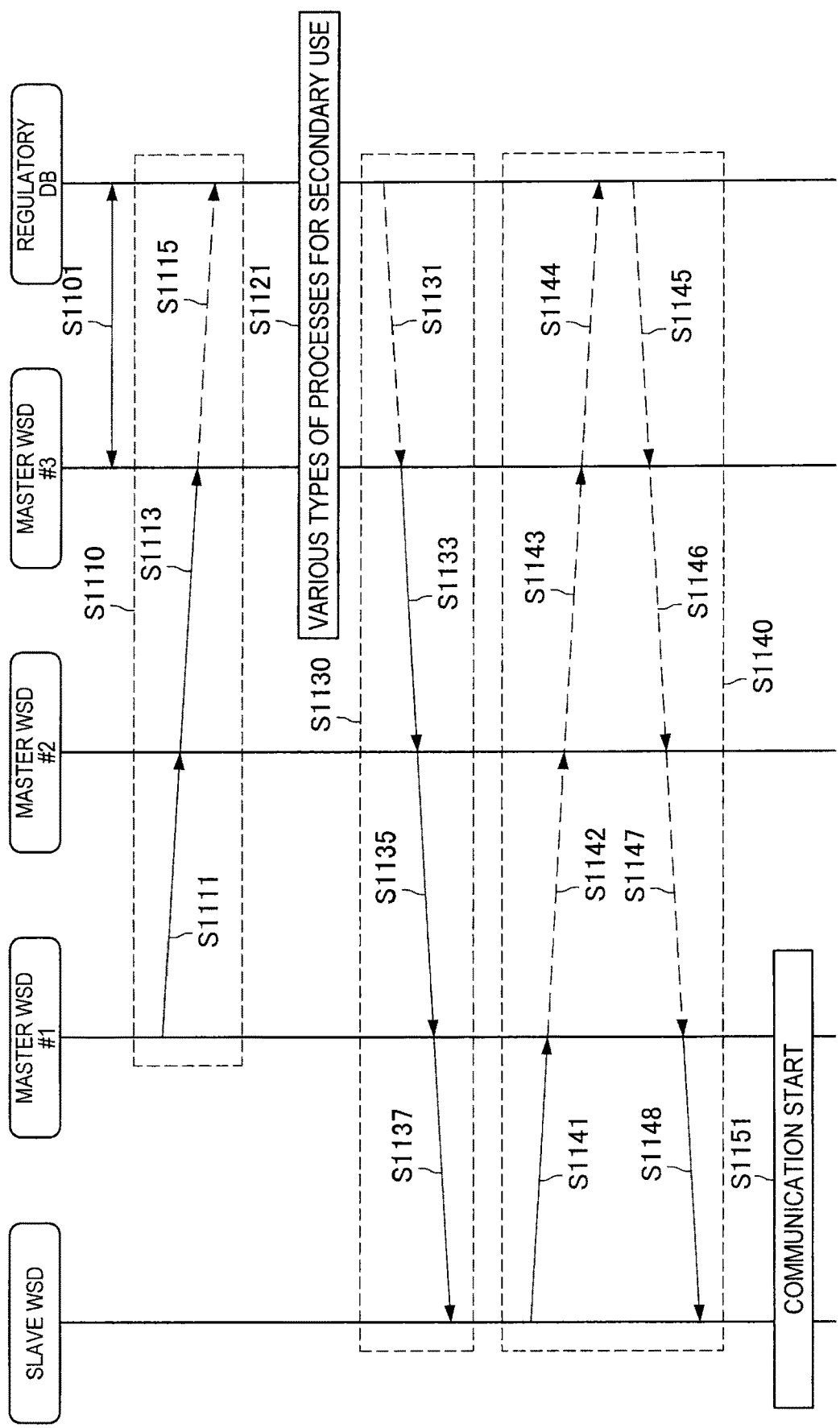
FIG. 2 is a sequence diagram illustrating an example of an exemplary variant of an enabling process.

FIG. 2 is a sequence diagram illustrating an example of the exemplary variant of the enabling process. In the exemplary variant, when it is difficult for the master WSD #1 to connect to the management DB (and/or the regulatory DB) through the wired backhaul (for example, breaking of wire, no wired connection means, etc.), the neighboring master WSD #2 intermediates the enabling process.

Steps S1101, S1110, S1121, S1130, S1140, and S1150 illustrated in FIG. 2 correspond to steps S1001, S1010, S1021, S1030, S1040, and S1050 illustrated in FIG. 1, respectively. In the example of FIG. 1, the master WSD directly communicates with the management DB, whereas in the example of FIG. 2, the master WSD #1 communicates with the management DB via the master WSD #2.
(Handover Process in Cellular Communication System)

Figure 3:
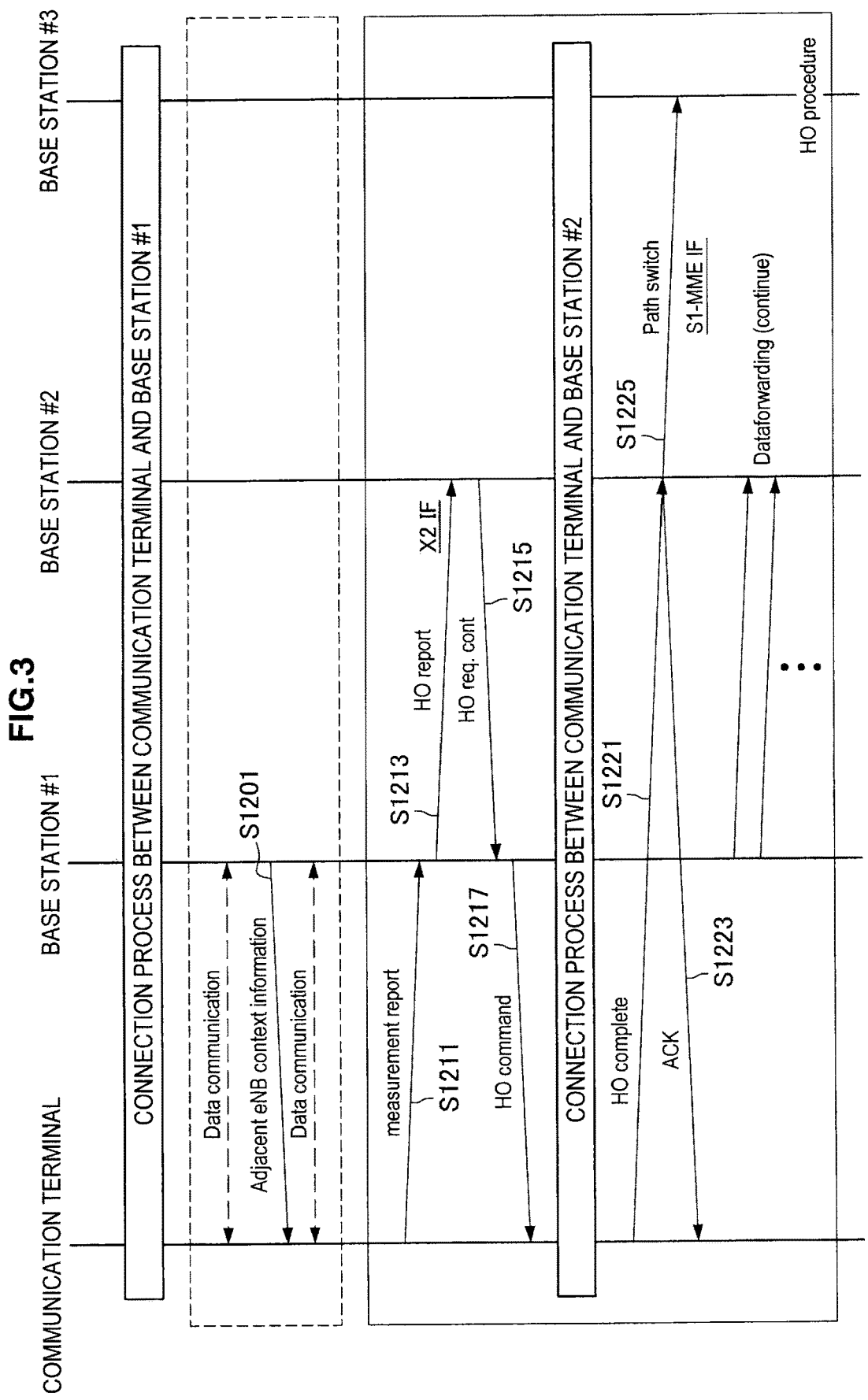
FIG. 3 is a sequence diagram illustrating an example of a handover process in a cellular communication system.

Next, with reference to FIG. 3, an example of a handover process in a cellular communication system will be described. FIG. 3 is a sequence diagram illustrating an example of the handover process in the cellular communication system.

When a communication terminal and a base station #1 are connected to each other, the base station #1 transmits to the communication terminal the context information (Adjacent eNB context information) indicating the target to be measured, such as an adjacent base station #2 (S1201).

Thereafter, the communication terminal communicates with the base station #1, and measures the radio wave strength and others of the signal that the base station #2 or the like has transmitted in accordance with the context information. Then, the communication terminal reports a measurement report to the base station #1 at a predetermined cycle or in accordance with a rule, (S1211).

Note that S1201 and S1211 may be omitted, when the base station #1 executes the handover of the communication terminal by the forced determination of the network side.

Then, the base station #1 requests a reception of the handover of the communication terminal to the base station #2 (S1213), and when the reception is approved by the base station #2 (S1215), instructs the communication terminal to execute the handover (S1217).

Then, after executing a connection process to the base station #2, the communication terminal notifies the base station #2 that the preparation for the handover is finished (S1221). Then, the base station #2 returns an acknowledgment to this notification (S1223), and reports the management server/S-GW that the handover of the communication terminal to the base station #2 is executed (S1225).

In the above example, a case in which the network side such as the management server or S-GW decides the execution of the handover on the basis of the measurement report measured by the communication terminal (a case in which the communication terminal cooperates) has been described, but the trigger of the handover is not limited to such an example. For example, the handover may be executed on the basis of the forced determination by the network side, such as the management server or S-GW. Also, the communication terminal may take the initiative in executing the handover, by selecting a base station in accordance with the measurement report and executing the connection process.

Note that this handover process is a process for the primary system which can utilize the frequency channel basically any time.

Technical Problem and New Method of Present Embodiment

As described above, the enabling process and the handover process in the cellular communication system have been described.

As described above, when communicating wirelessly through the frequency channel that is secondarily utilized by the secondary system, the slave WSD executes the enabling process at each time, and newly starts the wireless communication through the frequency channel. Hence, it is possible that the slave WSD is unable to continue the wireless communication that is being performed already, in the secondary system.

As one example, it is possible that, when moving, the slave WSD is unable to continue the wireless communication with the master WSD in communication. Then, after the movement, the slave WSD newly executes an enabling process for enabling the wireless communication in the secondary system. Then, if there is a newly utilizable frequency channel, the slave WSD newly starts the wireless communication in the frequency channel, at the time point.

Also, as another example, it is possible that, when the period of a secondary use of a frequency channel expires, the master WSD is unable to utilize the frequency channel. As a result, the slave WSD that has performed wireless communication with the above master WSD at the frequency channel is unable to continue the wireless communication. Then, the slave WSD newly performs the enabling process for enabling the wireless communication in the secondary system. Then, if there is a newly utilizable frequency channel, the slave WSD newly starts the wireless communication in the frequency channel, at the time point.

As described above, it is possible that the slave WSD is unable to continue the wireless communication that has been performed in the secondary system. The same problem arises not only in the secondary system with respect to a TV white space, but also in the secondary system of another type.

Note that, in the primary system which can utilize the frequency channel basically any time, the above handover process is executed, but this handover process is not considered in the secondary system.

Thus, the present embodiment enables the wireless communication that is being performed already to be continued in the secondary system.

In the present embodiment, as a new method, the handover that enables the wireless communication in the secondary system is proposed. Specifically, the handover of the wireless communication device (for example, the slave WSD), which enables the above wireless communication device to communicate wirelessly through the above frequency channel in the secondary system that secondarily utilizes the frequency channel for the primary system, is recognized. Then, the above handover of the above wireless communication device is controlled.

2. Schematic Configuration of Secondary System According to Present Embodiment

Figure 4:
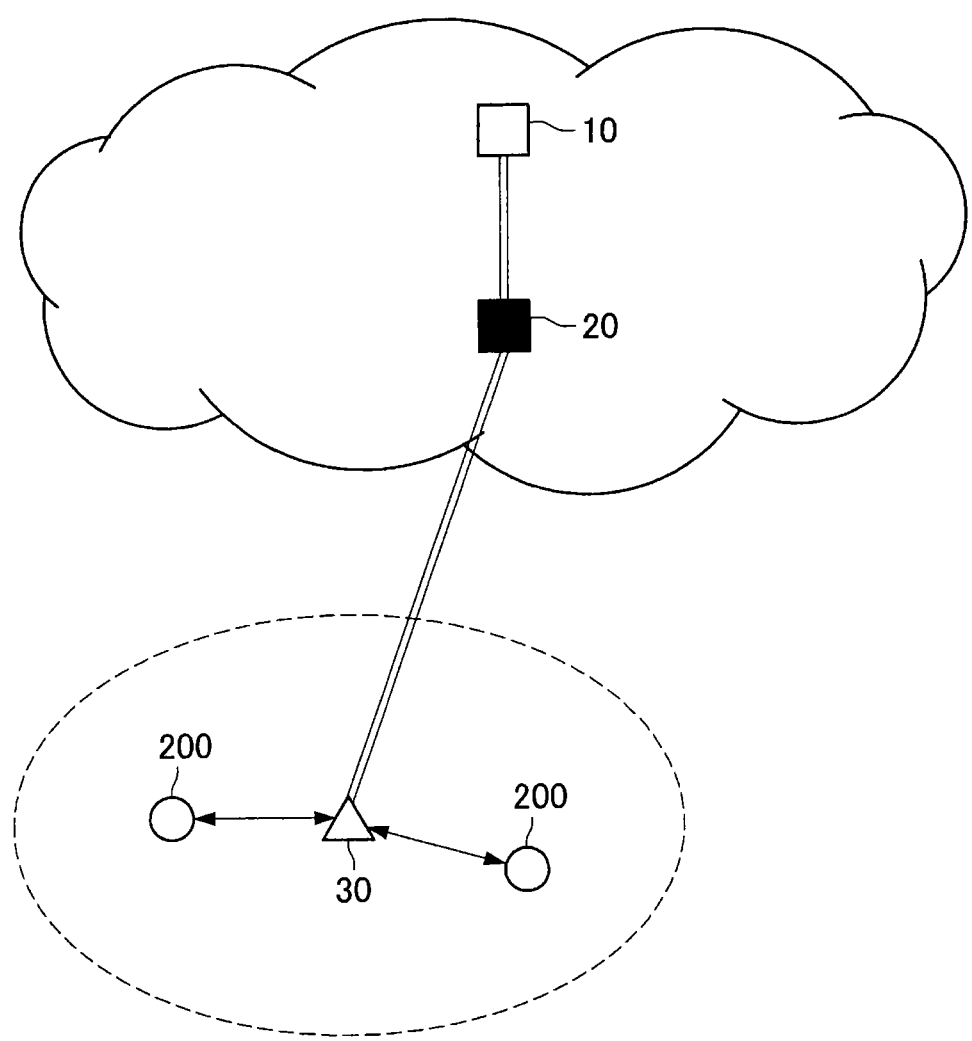
FIG. 4 is an explanatory diagram illustrating an example of a schematic configuration of a secondary system according to an embodiment of the present disclosure.

Next, a schematic configuration of the secondary system according to the embodiment of the present disclosure will be described with reference to FIG. 4. FIG. 4 is an explanatory diagram illustrating an example of the schematic configuration of the secondary system according to the present embodiment. Referring to FIG. 4, the secondary system includes a management DB 20, a master WSD 30, and a slave WSD 200. Also, there is a common regulatory DB 10 in one or more secondary systems. Note that, in this example, the secondary system is an example of the communication system relevant to a TV white space. Also, the regulatory DB 10 is a database for the TV white space.

The regulatory DB 10 is a database for managing the data of frequency channels that a country regulates. For example, the regulatory DB 10 provides and monitors the protection rule and the information relevant to the primary system. As one example, the regulatory DB 10 provides the information (hereinafter, referred to as "utilizable channel related information") relevant to a utilizable frequency channel (hereinafter, referred to as "utilizable channel") for the secondary system. The utilizable channel related information includes information, such as the center frequency, the band width, and the maximum transmission electric power, of the utilizable channel. As one example, the regulatory DB 10 is GLDB.

The management DB 20 is a secondary system administration node operated by the frequency regulator or a third party in a country. For example, the management DB 20 may modify the utilizable channel related information provided by the regulatory DB 10, using a more advanced protection algorithm, or may add the new information to the above utilizable channel related information. In this example, there is one management DB 20 for the regulatory DB 10, but there may be a plurality of management DBs 20 for the regulatory DB 10. For example, the management DB 20 is Registered Location Secure Server (RLSS) of IEEE802.11af, Coexistence Manager of IEEE802.19, Cognitive Engine of IEEE1900.6, or, the above AGLE.

The master WSD 30 is a communication control node that communicates wirelessly through the frequency channel that is secondarily utilized by the secondary system. The master WSD 30 operates the secondary system. The frequency channel through which the master WSD 30 communicates wirelessly, the transmission electric power in the wireless communication, and others are decided by the regulatory DB 10 and/or the management DB 20.

The slave WSD 200 is a wireless communication device that communicates wirelessly through the frequency channel that is secondarily utilized by the secondary system. The slave WSD 200 communicates wirelessly with the master WSD 30.

Note that the above secondary system secondarily utilizes the frequency channel for the above primary system. For example, the above secondary system secondarily utilizes the above frequency channel, by utilizing the above frequency channel within a period during which the frequency channel for the above primary system is not utilized for the primary system.

3. Handover According to Present Embodiment

Next, the handover according to the present embodiment will be described, with reference to FIGS. 5 to 10.

As described above, the present embodiment recognizes the handover that enables the slave WSD 200 to communicate wirelessly through the above frequency channel in the secondary system that secondarily utilizes the frequency channel for the primary system. Then, the control of the above handover of the above slave WSD 200 is executed.

The handover of the target of the present embodiment includes a handover to the master WSD 30 of the secondary system, and a handover between the frequency channels.

<3.1. Handover to Master WSD of Secondary System>

First, the handover to the master WSD 30 of the secondary system will be described with reference to FIGS. 5 to 9.

For example, the above secondary system includes one or more master WSDs 30 that communicate wirelessly through the above frequency channel. Then, the above handover is a handover from an original communication control node that communicates wirelessly with the slave WSD 200, to one master WSD 30 that satisfies a predetermined condition among the above one or more master WSDs 30. Also, the predetermined condition includes being able to utilize the above frequency channel.

For example, the above predetermined condition includes being able to utilize the above frequency channel at or after the handover. That is, one master WSD that satisfies the above predetermined condition is able to utilize the frequency channel for the primary system at or after the handover.

With this handover, the slave WSD is able to continue the wireless communication in the secondary system, even when not being able to continue the wireless communication with the original communication control node. That is, the slave WSD allows the wireless communication that is being performed already to be continued in the secondary system. (Handover from Communication Control Node of Another System)

For example, the above original communication control node is a communication control node included in another system different from the above secondary system. That is, the above handover is a handover from the communication control node included in another system, to the master WSD 30 included in the secondary system.

Handover from Communication Control Node of Another Secondary System

For the first example, the above other system different from the above secondary system is another secondary system that is not the above secondary system. That is, the above handover is a handover from the communication control node included in the first secondary system, to the master WSD 30 included in the second secondary system.

As a specific example, for example, the above first secondary system is also a secondary system with respect to a TV white space, and the communication control node included in the first secondary system is a master WSD 30. That is, the above handover is a handover between master WSDs 30 of different secondary systems. In the following, a specific example will be described with reference to FIG. 5, with respect to this point.

Figure 5:
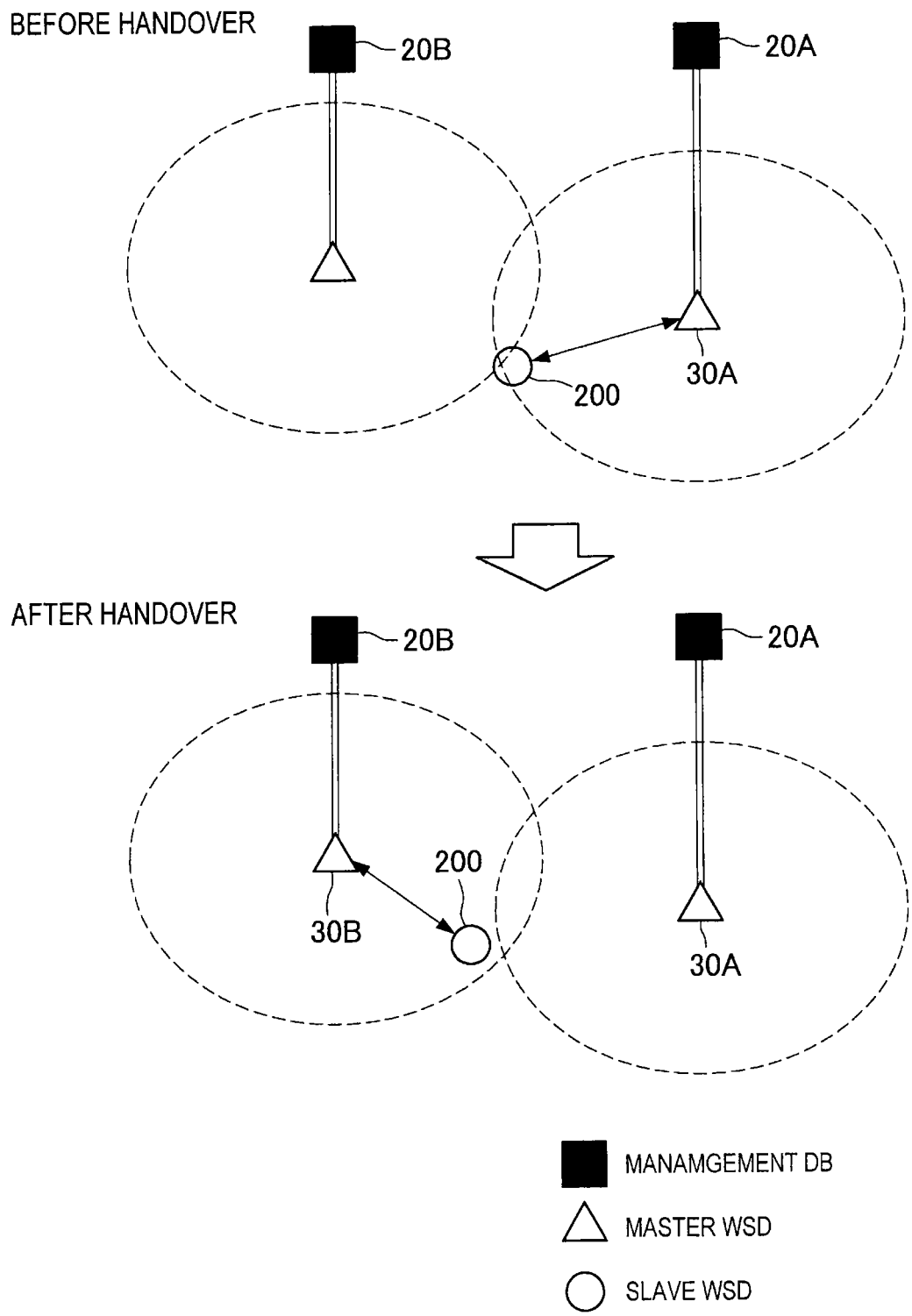
FIG. 5 is an explanatory diagram for describing an example of a handover between master WSDs of different secondary systems.

FIG. 5 is an explanatory diagram for describing an example of the handover between master WSDs of different secondary systems. Referring to FIG. 5, the management DB 20A and the master WSD 30A included in the first secondary system, as well as the management DB 20B and the master WSD 30B included in the second secondary system, are illustrated. Before the handover, the slave WSD 200 communicates wirelessly with the master WSD 30A in the first secondary system. Thereafter, the slave WSD 200 executes the handover from the master WSD 30A to the master WSD 30B. As a result, after the handover, the slave WSD 200 communicates wirelessly with the master WSD 30B in the second secondary system.

Note that the above management DB 20A and the management DB 20B may correspond to the same regulatory DB 10, or may correspond to different regulatory DBs 10. In the following, a specific example will be described with reference to FIGS. 6 and 7, with respect to this point.

Figure 6:
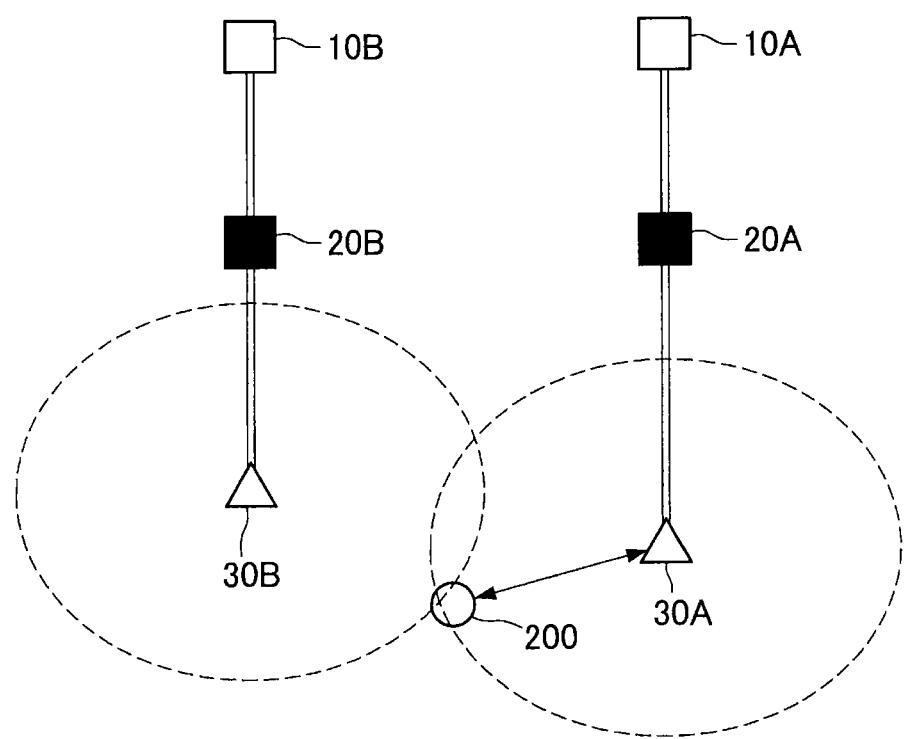
FIG. 6 is an explanatory diagram for describing a first example of regulatory DBs corresponding to two management DBs related to a handover.

FIG. 6 is an explanatory diagram for describing a first example of regulatory DBs corresponding to two management DBs related to the handover. Referring to FIG. 6, in this example, the management DB 20A corresponds to a regulatory DB 10A, and the management DB 20B corresponds to a regulatory DB 10B. That is, the slave WSD 200 executes a handover from the secondary system of a certain country to the secondary system of another country.

Figure 7:
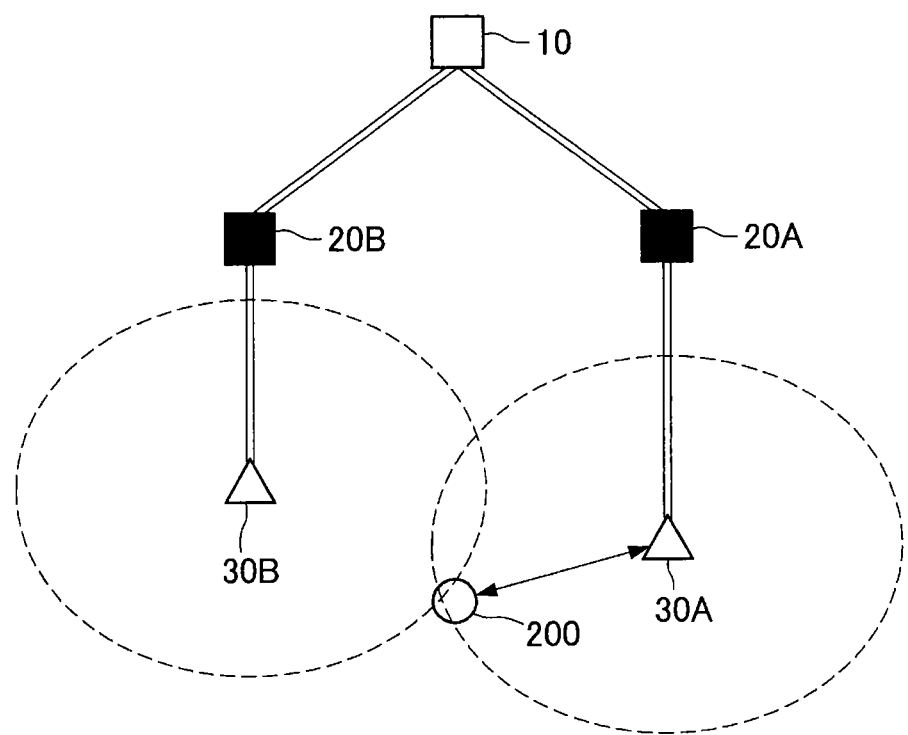
FIG. 7 is an explanatory diagram for describing a second example of regulatory DBs corresponding to two management DBs related to a handover.

FIG. 7 is an explanatory diagram for describing a second example of the regulatory DB corresponding to two management DBs related to the handover. Referring to FIG. 7, in this example, the management DB 20A and the management DB 20B correspond to the same regulatory DB 10. That is, the slave WSD 200 executes a handover between two secondary systems in a certain country.

As described above, the handover according to the present embodiment is a handover from the communication control node (for example, the master WSD 30) included in the first secondary system, to the master WSD 30 included in the second secondary system, for example. With this handover, the slave WSD is able to continue the wireless communication in another secondary system, even when not being able to continue the wireless communication in the original secondary system (when away from the communication control node (for example, the master WSD) of the secondary system, when being unable to the utilizable channel etc.). That is, the slave WSD allows another secondary system to continue the wireless communication that is being performed already in a certain secondary system.

Handover from Communication Control Node of Primary System

For the second example, the above other system different from the above secondary system is the above primary system. That is, the above handover is a handover from the communication control node included in the primary system, to the master WSD 30 included in the secondary system. In the following, a specific example will be described with reference to FIG. 8, with respect to this point.

FIG. 8 is an explanatory diagram for describing an example of the handover from the communication control node of the primary system to the master WSD of the secondary system. Referring to FIG. 8, the communication control node 40 included in the primary system, and the master WSD 30 included in the secondary system are illustrated. Before the handover, the slave WSD 200 wirelessly communicates with the communication control node 40 in the primary system. Thereafter, the slave WSD 200 executes the handover from the communication control node 40 to the master WSD 30. As a result, after the handover, the slave WSD 200 communicates wirelessly with the master WSD 30 in the secondary system.

As described above, the handover according to the present embodiment is a handover from the communication control node included in the primary system, to the master WSD 30 included in the secondary system, for example. With this handover, the slave WSD is able to continue the wireless communication in the secondary system, even when not being able to continue the wireless communication in the primary system (when away from the communication control node of the primary system, when a frequency resource is not allocated, etc.). That is, the slave WSD allows the wireless communication that is being performed in the primary system already to be continued in the secondary system.

Also, with this handover, offloading is achieved with respect to the primary system. That is, the traffic is transferred from the primary system to the secondary system, and therefore the load is reduced for the primary system. As a result, throughput in the primary system (and/or the entire system) is improved, and the cost for the primary system is also reduced. Also, throughput for the slave WSD can be improved.

Handover from Communication Control Node of Another System

Note that, as yet another example, the above other system different from the above secondary system may be yet another system.

As described above, the handover according to the present embodiment is a handover from the communication control node included in another system, to the master WSD 30 included in the secondary system, for example. With this handover, the slave WSD is able to continue the wireless communication in the secondary system, even when not being able to continue the wireless communication in the original system. That is, the wireless communication that is being performed already in the original system is allowed to continue in the secondary system.

(Handover Between Master WSDs of Same Secondary System)

For example, the above original communication control node may be another master WSD 30 of the above one or more master WSDs 30 included in the above secondary system. That is, the above handover may be a handover between the master WSDs 30 included in the same secondary system. In the following, a specific example will be described with reference to FIG. 9, with respect to this point.

FIG. 9 is an explanatory diagram for describing an example of the handover between master WSDs of the same secondary system. Referring to FIG. 9, the management DB 20A, the master WSD 30A, and the master WSD 30B included in the secondary system are illustrated. Before the handover, the slave WSD 200 communicates wirelessly with the master WSD 30A in the secondary system. Thereafter, the slave WSD 200 executes the handover from the master WSD 30A to the master WSD 30B. As a result, after the handover, the slave WSD 200 communicates wirelessly with the master WSD 30B in the same secondary system.

As described above, the handover according to the present embodiment may be the handover between the master WSDs 30 included in the same secondary system. With this handover, the slave WSD is able to continue the wireless communication in the same secondary system, even when not being able to continue the wireless communication with the original master WSD in the secondary system (when away from the original master WSD, etc.). That is, the slave WSD allows the wireless communication to continue in a certain secondary system.

<3.2. Handover Between Frequency Channels>

Next, a handover between frequency channels will be described with reference to FIG. 10.

For example, the above secondary system secondarily utilizes two or more frequency channels. Then, the above handover is a handover from the original frequency channel through which the slave WSD 200 communicates wirelessly, among the above two or more frequency channels, to another frequency channel among the above two or more frequency channels. That is, the above handover is a handover between the frequency channels.

More specifically, for example, the secondary system secondarily utilizes the first frequency channel and the second frequency channel for the primary system. Then, the master WSD 30 included in the secondary system is approved to communicate wirelessly through the first frequency channel and the second frequency channel. In this case, the above handover is a handover from the first frequency channel to the second frequency channel, by the slave WSD 200 that communicates wirelessly with the master WSD 30. In the following, a specific example will be described with reference to FIG. 10, with respect to this point.

FIG. 10 is an explanatory diagram for describing an example of the handover between the frequency channels in the secondary system. Referring to FIG. 10, the management DB 20 and the master WSD 30 included in the secondary system are illustrated. Before the handover, the slave WSD 200 wirelessly communicates through the frequency channel A with the master WSD 30 in the secondary system. Thereafter, the slave WSD 200 executes a frequency handover from the frequency channel A to the frequency channel B. As a result, after the handover, the slave WSD 200 communicates wirelessly through the frequency channel B with the master WSD 30 in the second secondary system in the secondary system.

As described above, the handover according to the present embodiment is a handover between the frequency channels, for example. With this handover, the slave WSD is able to continue the wireless communication through another frequency channel, even when not being able to continue the wireless communication through a certain frequency channel in the secondary system (when the utilizable channel for the master WSD is changed, when a permitted time is elapsed, etc.). That is, the slave WSD allows the wireless communication to continue in the secondary system.

<3.3. Enabling Process in Handover>

Further, the enabling process in the handover will be described.

In the above secondary system, the process for enabling the wireless communication through the above frequency channel by the slave WSD 200 is performed, before the slave WSD 200 starts the wireless communication through the frequency channel that is secondarily used by the secondary system. Also, for example, the process includes making a request for the wireless communication through the above frequency channel by the slave WSD 200.

For example, the above process is an enabling process. As a specific example, the master WSD 30 transmits an enablement beacon through the utilizable frequency channel for the secondary system (i.e., the utilizable channel). Then, the slave WSD 200 acquires a knowledge that the frequency channel is a utilizable channel, by receiving the enablement beacon through the frequency channel. Then, the slave WSD 200 makes a request for the slave WSD 200 to wirelessly communicate through the utilizable channel, by replying to the enablement beacon through the utilizable channel (i.e., transmitting an enablement beacon response). Thereafter, the master WSD 30, the management DB 20, or the regulatory DB 10 may permit the wireless communication through the utilizable channel, or the permission by these nodes may be unnecessary.

For example, the above enabling process is executed. In particular, in the present embodiment, the above process is also executed at the time of various types of handovers which are the target of the present embodiment.

4. First Embodiment

Next, the first embodiment of the present disclosure will be described with reference to FIGS. 11 to 15. In the first embodiment of the present disclosure, the handover management entity (hereinafter, referred to as "HoM entity") controls the handover.

<4.1. Control by HoM Entity>

First, an HoM entity for controlling the handover will be described with reference to FIG. 11.

Figure 11:
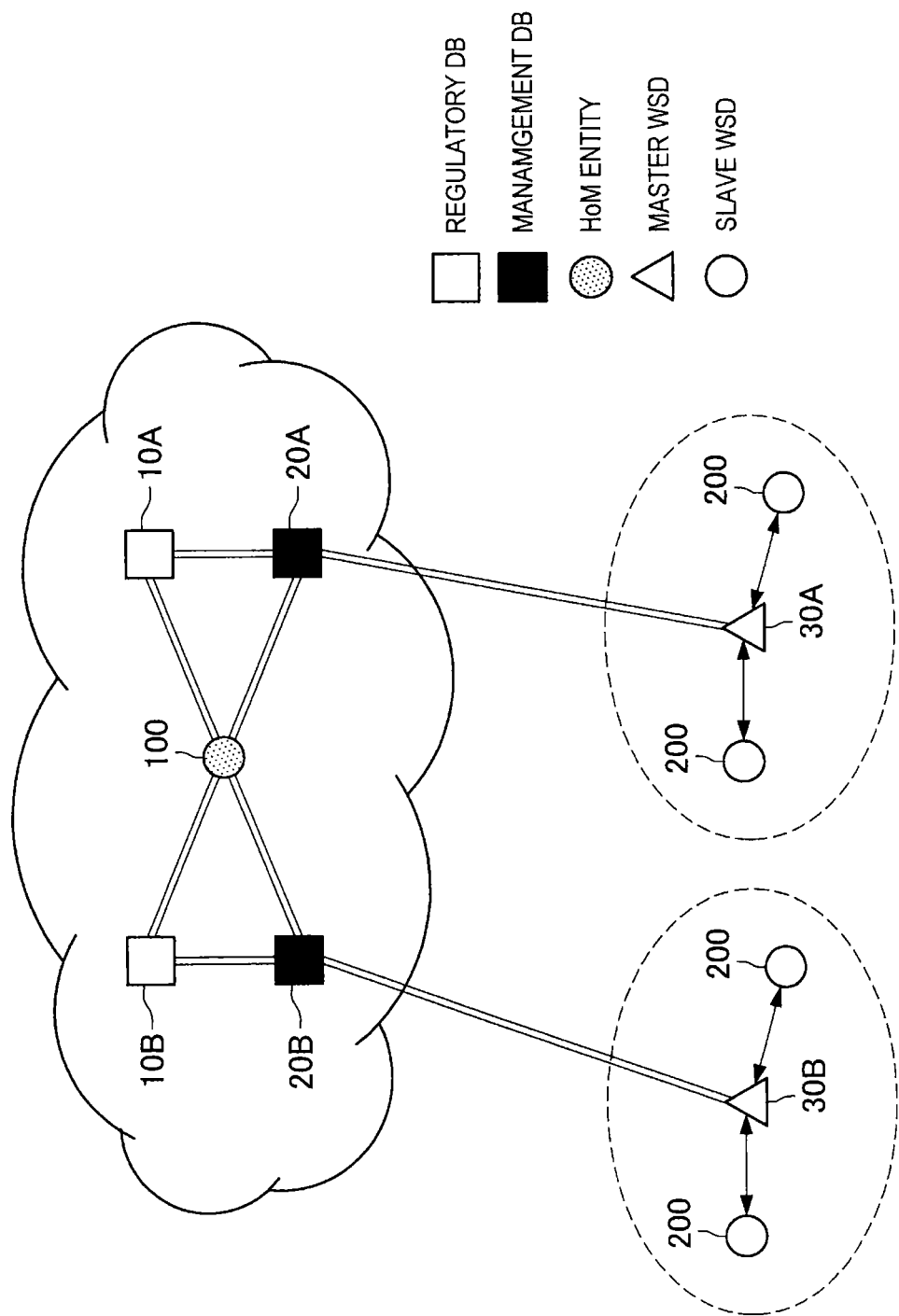
FIG. 11 is an explanatory diagram for describing an example of an implementation form of an HoM entity according to a first embodiment.

FIG. 11 is an explanatory diagram for describing an example of an implementation form of the HoM entity according to the first embodiment. Referring to FIG. 11, the management DB 20A, the first secondary system including the master WSD 30A and the slave WSD 200, and the second secondary system including the management DB 20B, the master WSD 30B, and the slave WSD 200 are illustrated. Also, the regulatory DB 10A corresponding to the management DB 20A, and the regulatory DB 10B corresponding to the management DB 20B are illustrated. The regulatory DB 10A and the regulatory DB 10B may be different databases, or may be a same database.

In particular, in the first embodiment, for example, the handover relevant to these secondary systems is controlled by the HoM entity 100. Then, as illustrated in FIG. 11, as one example, the HoM entity 100 is implemented as another independent device that is not the regulatory DB 10 and the management DB 20.

<4.2. Function and Configuration of HoM Entity>

Figure 12:
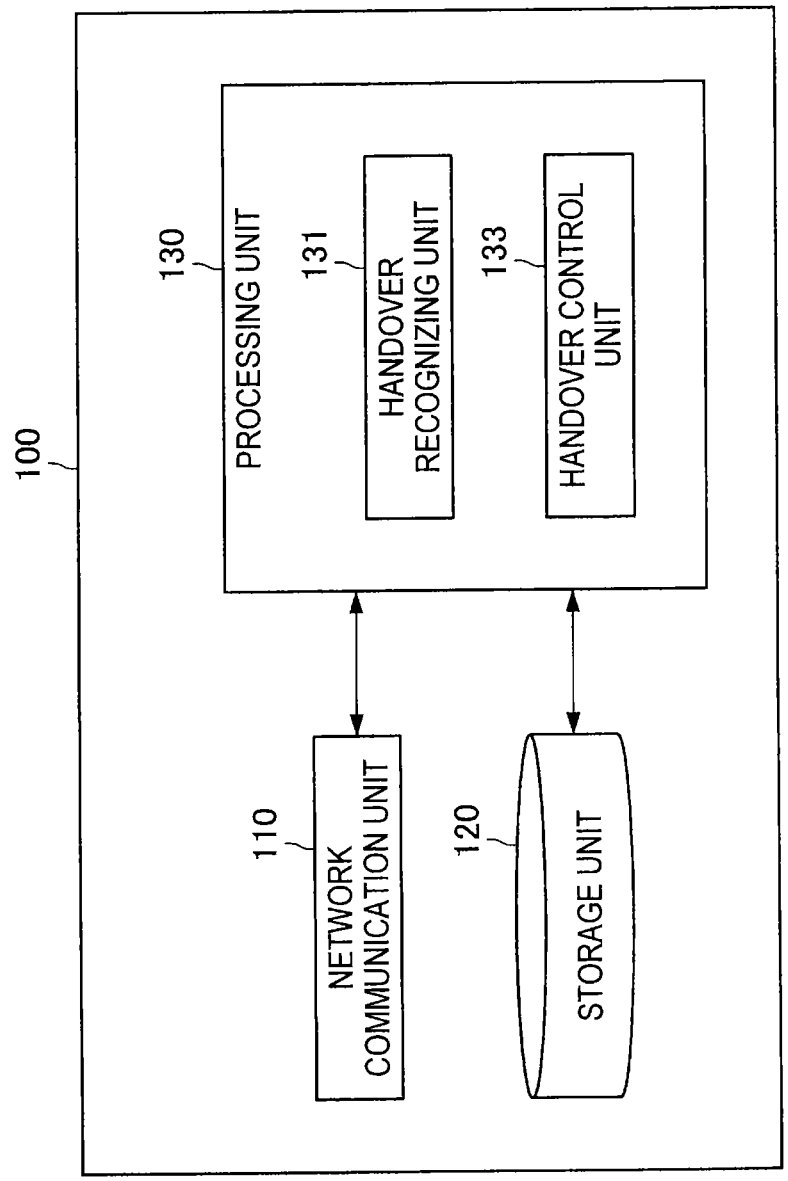
FIG. 12 is a block diagram illustrating an example of a configuration of an HoM entity according to a first embodiment.

Next, an example of the configuration of the HoM entity 100 according to the first embodiment will be described with reference to FIG. 12. FIG. 12 is a block diagram illustrating the example of the configuration of the HoM entity 100 according to the first embodiment. Referring to FIG. 12, the HoM entity 100 includes a network communication unit 110, a storage unit 120, and a processing unit 130.

(Network Communication Unit 110)

The network communication unit 110 communicates with another communication node. For example, the network communication unit 110 communicates with the regulatory DB 10 and/or the management DB 20.

(Storage Unit 120)

The storage unit 120 stores programs and data for the operation of the HoM entity. Also, the storage unit 120 stores various types of information provided by the regulatory DB 10 and/or the management DB 20, for example.

(Processing Unit 130)

The processing unit 130 provides various functions of the HoM entity. The processing unit 130 includes a handover recognizing unit 131 and a handover control unit 133.

(Handover Recognizing Unit 131)

The handover recognizing unit 131 recognizes the handover of the slave WSD 200 which enables the slave WSD 200 to communicate wirelessly through the frequency channel in the secondary system that secondarily utilizes the above frequency channel for the primary system.

In Case of Handover to Communication Control Node of Secondary System

As described above, for example, the above handover is a handover from the original communication control node that communicates wirelessly with the slave WSD 200, to one master WSD 30 that satisfies a predetermined condition among one or more master WSDs 30 included in the secondary system. That is, the above handover is a handover from the original communication control node, to the master WSD 30 of the secondary system. Also, the above predetermined condition includes being able to utilize the above frequency channel.

In this case, for example, the handover recognizing unit 131 recognizes the above handover, by recognizing at least one master WSD 30 that satisfies the above predetermined condition, among the above one or more master WSDs 30 included in the above secondary system.

Specifically, for example, the management DB 20 or the regulatory DB 10 provides the HoM entity 100 with the utilizable channel related information with respect to the secondary system. That is, the management DB 20 or the regulatory DB 10 provides the HoM entity 100 with the information relevant to the frequency channel utilizable for the secondary system (or each master WSD 30 included in the secondary system). Then, the handover recognizing unit 131 acquires the utilizable channel related information, and acquires a knowledge of the utilizable channel of each master WSD 30. Also, the management DB 20 or the regulatory DB 10 provides the HoM entity 100 with the geolocation information of the master WSD 30, and the handover recognizing unit 131 acquires the geolocation information of the master WSD 30. Also, the geolocation information of the slave WSD 200 is provided by the slave WSD 200, and the HoM entity 100 acquires the geolocation information of the slave WSD 200. Then, the HoM entity 100 identifies the master WSDs that the slave WSD 200 can communicate with, from the geolocation information of the slave WSD 200 and the geolocation information of the master WSD. Then, the HoM entity 100 recognizes the master WSD 30 that satisfies a predetermined condition (i.e., that can utilize the frequency channel) from among the identified master WSDs 30.

As described above, the master WSD 30 that can utilize the frequency channel secondarily utilized by the secondary system is recognized. Thereby, a knowledge of to which master WSD 30 the handover can be executed among the master WSDs 30 of the secondary system is acquired. As a result, the handover to the master WSD 30 of the secondary system can be actually executed.

In Case of Handover Between Frequency Channels

As described above, for example, the above secondary system secondarily utilizes two or more frequency channels. Then, the above handover is a handover from the original frequency channel through which the slave WSD 200 communicates wirelessly, among the above two or more frequency channels, to another frequency channel among the above two or more frequency channels. That is, the above handover is a handover between the frequency channels.

In this case, for example, the handover recognizing unit 131 recognizes the above handover by recognizing at least one frequency channel other than the above original frequency channel, among the above two or more frequency channels.

Specifically, for example, the management DB 20 or the regulatory DB 10 provides the HoM entity 100 with the utilizable channel related information with respect to the secondary system. That is, the management DB 20 or the regulatory DB 10 provides the HoM entity 100 with the information relevant to the frequency channel utilizable for the secondary system (or each master WSD 30 included in the secondary system). Then, the handover recognizing unit 131 acquires the utilizable channel related information, and acquires a knowledge of the utilizable channel of each master WSD 30. Then, the handover recognizing unit 131 recognizes the frequency channel other than the frequency channel through which the slave WSD 200 communicates wirelessly, among the frequency channels utilizable for the master WSD 30 that communicates wirelessly with the slave WSD 200.

As described above, at least one frequency channel other than the original frequency channel through which the slave WSD 200 communicates wirelessly is recognized, among two or more frequency channels secondarily utilized by the secondary system. Thereby, a knowledge in terms of to which frequency channel the handover between frequencies is possible is acquired. As a result, the handover between frequencies is performed actually in the secondary system.
(Handover Control Unit 133)

The handover control unit 133 controls the above handover of the slave WSD 200. That is, the handover control unit 133 controls the handover recognized by the handover recognizing unit 131.

Notification of Handover to Slave WSD
For example, the above control of the above handover includes notifying the slave WSD 200 of the above handover. That is, the above control of the above handover includes notifying the target slave WSD 200 of the handover recognized by the handover recognizing unit 131.

More specifically, for example, when the handover (the master WSD 30 or the frequency channel) is recognized by the handover recognizing unit 131, the handover control unit 133 notifies the slave WSD 200 of the handover, via the network communication unit 110. Also, when a plurality of handovers (a plurality of master WSDs 30 or a plurality of frequency channels) are recognized as candidates, a part or all of the plurality of handover candidates are notified of. Also, for example, at the time of the notification of the handover, information relevant to the frequency channel of the handover destination (for example, the center frequency, the band width, etc.) is provided. As one example, the notification of the handover is notified as a request of preparation of the handover.

For example, with this notification, the slave WSD 200 can perform the measurement for deciding the handover to be executed from among the plurality of handover candidates. As a result, an optimal handover for the slave WSD 200 can be selected. Also, the slave WSD 200 can perform reconfiguration when the handover is executed actually.

Decision of Execution of Handover
For example, the above control of the above handover includes deciding the execution of the above handover of the slave WSD 200. That is, the above control of the above handover includes deciding the execution of the handover recognized by the handover recognizing unit 131.

More specifically, for example, when the handover (the master WSD 30 or the frequency channel) is recognized by the handover recognizing unit 131, the handover control unit 133 decides the execution of the handover. Also, when a plurality of handovers are recognized as candidates by the handover recognizing unit 131, the handover control unit 133 decides the execution of one handover among a plurality of handover candidates, on the basis of the measurement result or the like of the communication quality by the slave WSD 200, for example.

With this decision, the handover of the slave WSD 200 is actually executed. As a result, the slave WSD 200 is allowed to continue in the secondary system the wireless communication that is being performed already.

Control of Transfer Associated with Handover
As described above, for example, the above handover is a handover from the original communication control node that communicates wirelessly with the slave WSD 200, to one master WSD 30 that satisfies a predetermined condition among one or more master WSDs 30 included in the secondary system. To say simply, the above handover is a handover to the master WSD 30.

In this case, for example, the above control of the above handover includes the control of forwarding the communication data addressed to the slave WSD 200 from the above original communication control node to above one master WSD 30.

More specifically, for example, when the execution of the handover of the slave WSD 200 from the first master WSD 30 to the second master WSD 30 is decided, the handover control unit 133 controls the forwarding of the transmitted data addressed to the slave WSD 200 from the first master WSD 30 to the second master WSD 30. As one example, the handover control unit 133 queries (or instructs) the first master WSD 30 via the management DB 20 or the regulatory DB 10, to forward to the second master WSD 30 the transmitted data addressed to the slave WSD 200 which remains in the first master WSD 30 via the network communication unit 110. As a result, the above transmitted data is forwarded to the second master WSD 30 by the control of the management DB 20 corresponding to the first master WSD 30.

By the control of this forwarding, the transmitted data which remains in the master WSD 30 of the handover source becomes transmittable from the master WSD 30 of the handover destination. Hence, the slave WSD 200 can receive the transmitted data seamlessly. Thereby, the communication quality is enhanced at the time of the handover.

Control of Start of Enabling Process
As described above, in the secondary system, the process for enabling the wireless communication through the above frequency channel by the slave WSD 200 is performed, before the slave WSD 200 starts the wireless communication through the frequency channel secondarily used by the secondary system. Also, the process is executed at the time of the handover.

In this case, for example, the above control of the above handover includes controlling the start of the above process executed at the time of the above handover.

Specifically, for example, the above process is an enabling process. Then, after the decision of the execution of the handover, the handover control unit 133 triggers the enabling process. As one example, the handover control unit 133 requests the slave WSD 200 to execute the handover via the network communication unit 110. Then, the slave WSD 200 receives the enablement beacon through the utilizable channel of the handover destination, and transmits the reply to the enablement beacon (i.e., an enablement beacon response).

With this control, the slave WSD communicates wirelessly in the handover destination actually.

<4.3. Flow of Process>

Figure 13A:
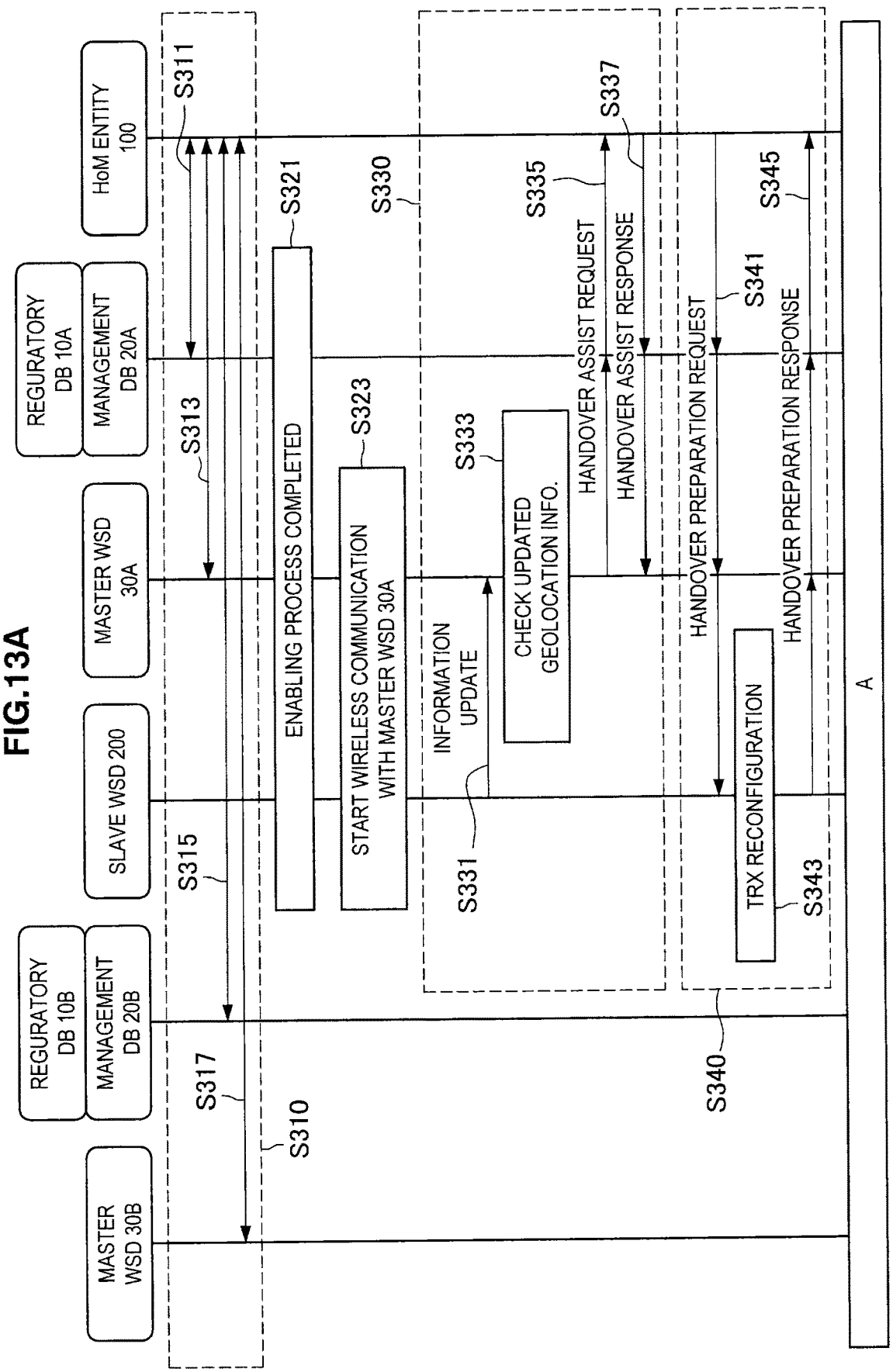
FIG. 13A is a first sequence diagram illustrating an example of a schematic flow of a communication control process according to a first embodiment.
Figure 13B:
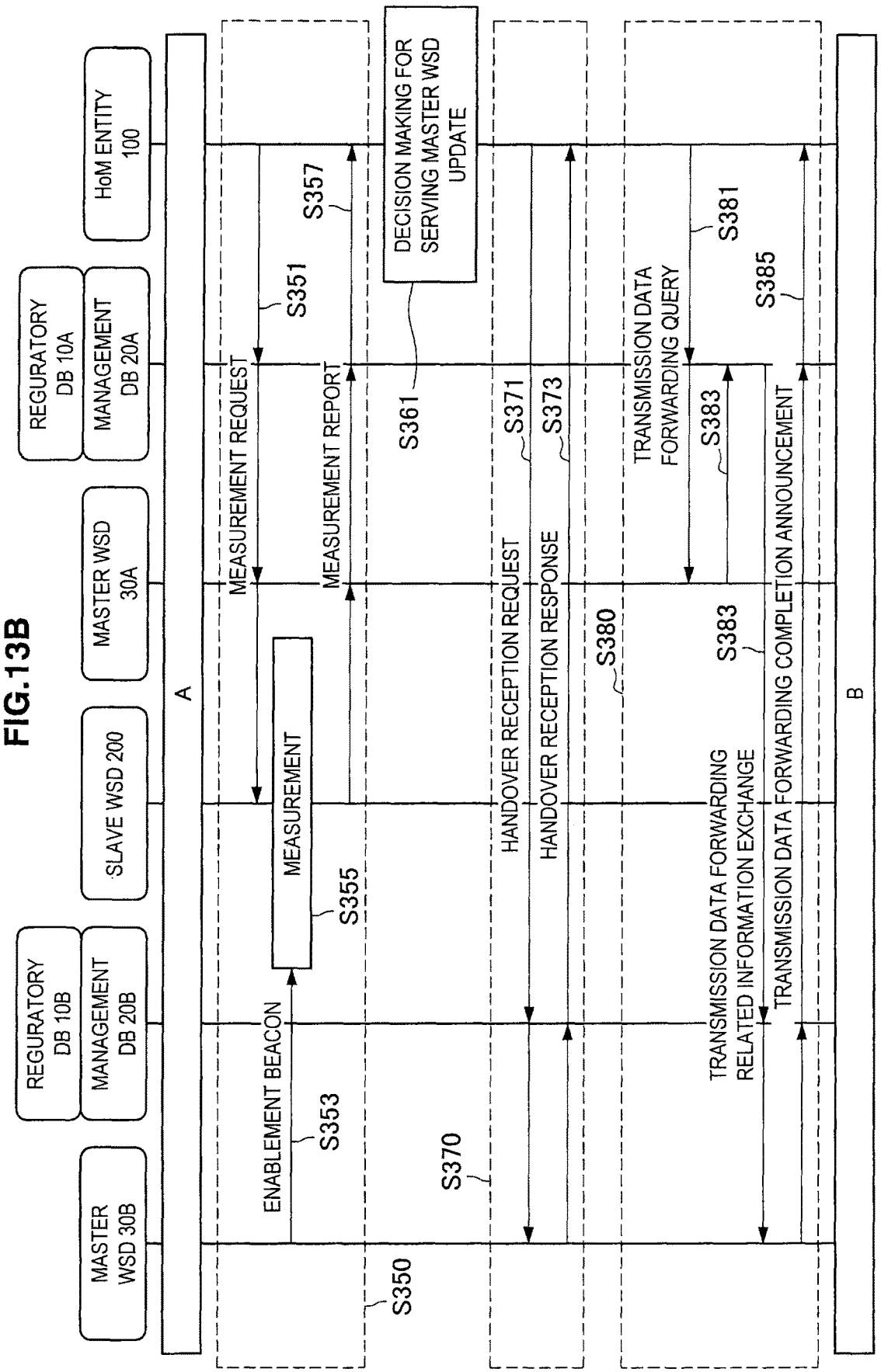
FIG. 13B is a second sequence diagram illustrating an example of a schematic flow of a communication control process according to a first embodiment.

Next, an example of the communication control process according to the first embodiment will be described with reference to FIGS. 13A to 13C. FIGS. 13A to 13C are sequence diagrams illustrating an example of the schematic flow of the communication control process according to the first embodiment.

An example of the above communication control process is a communication control process of the case in which the slave WSD 200 performs the handover from the master WSD of the first secondary system 30A to the master WSD of the second secondary system 30B, as illustrated in FIGS. 5 to 7. Note that the regulatory DB 10A and the management DB 20A correspond to the master WSD 30A, and the regulatory DB 10B and the management DB 20B correspond to the master WSD 30B.

First, the HoM entity 100 performs mutual authentication and/or exchange of basic information with each of the regulatory DB 10, the management DB 20, and the master WSD 30 (S310).

Then, when the enabling process ends (S321), the slave WSD 200 starts the wireless communication with the master WSD 30A (S323).

Thereafter, when the handover of the slave WSD 200 becomes necessary, the HoM entity 100 is requested to assist the handover (step S330). Specifically, the slave WSD 200 notifies the master WSD 30A of the update of the geolocation information (S331). Then, the master WSD 30A checks the updated geolocation information (S333). Then, the master WSD 30A requests the HoM entity 100 to assist the handover of the slave WSD 200, when the updated position is not in the network of itself or its vicinity (S335). Then, when permitting the acceptance of the assist, the HoM entity 100 notifies the master WSD 30A of the permission (S337).

Then, the slave WSD 200 performs the preparation for the handover (step S340).

Specifically, the HoM entity 100 requests the slave WSD 200 to prepare the handover (S341). Here, the slave WSD 200 is notified of the information relevant to the frequency channel of the handover destination (the center frequency, the channel band width, etc.). Also, the slave WSD 200 is notified of parameters for the reception of the enablement beacon, as necessary.

Then, the slave WSD 200 performs reconfiguration for the transmission and reception through the frequency channel of the handover destination (step S343). Specifically, for example, the radio access technology, the digital signal processing unit, the maximum transmission electric power, and the like are changed. The change of the digital signal processing unit includes change of forward error correction (FEC), fast fourier transform (FFT), code spreading, clock frequency and the like of analog-to-digital conversion (A/D conversion) and digital-to-analog conversion (D/A conversion). Also, for example, the analog processing unit is changed to satisfy the transmit spectrum mask. Specifically, radio frequency (RF) parameters are changed, or switch is performed to another RF processing system as necessary. The above RF parameters includes adjacent channel leakage ratio (ACLR), antenna gain, voltage gain amplifier (VGA) setting, and the like.

Thereafter, the slave WSD 200 notifies the HoM entity 100 that the reconfiguration for the transmission and reception through the frequency channel of the handover destination has completed (step S345).

Then, the measurement and report for deciding the master WSD 30 of the handover destination are performed (step S350). Specifically, the HoM entity 100 requests the slave WSD 200 to measure the communication quality (S351). Here, the slave WSD 200 is provided with a list of configuration of the transmission and reception, for the purpose of reception of the enablement beacon by the slave WSD 200. The list includes a plurality of different candidates of master WSD 30, and the information relevant to one or more utilizable channels (the center frequency, the band width, etc.) with respect to each candidate. Then, the slave WSD 200 measures the communication quality through each frequency channel in accordance with the above list, (S353, S355). For example, the reception electric power, the signal to noise ratio (SNR), the signal to interference plus noise ratio (SINR), and the like are obtained as measurement results. Then, the slave WSD 200 reports the HoM entity 100 the measurement results (S357). When the communication quality through any one of the frequency channels is unable to be measured, its reason (for example, failure in configuration, the frequency channel through which the measurement is impossible, etc.) may be reported to the slave WSD 200.

Thereafter, the HoM entity 100 executes the decision with respect to the update of the serving master WSD 30 (S361). In this example, the HoM entity 100 decides the execution of the handover to the master WSD 30B. Specifically, the HoM entity 100 selects the master WSD 30 of the handover destination. When the measurement is performed for the enablement beacon of a plurality of master WSDs 30 in step S350, the master WSD 30 with the best communication quality or the master WSD 30 determined to satisfy required QoS is selected on the basis of the measurement results. Note that, when an adequate master WSD 30 is not found, it may be notified.

Then, the process for receiving the handover in the master WSD 30B of the handover destination is performed (S370). Specifically, the HoM entity 100 requests the master WSD 30B of the handover destination to receive the handover (S371). Then, the master WSD 30B of the handover destination answers whether or not to be able to receive the handover (S373). Note that the master WSD 30B may notify the operation situation of itself (the quality, the utilization rate of the utilizable channel, the number of the connected slave WSDs 200, the traffic, etc.) in addition to whether or not to be able to receive the handover. In particular, when unable to receive the handover, the reason may be notified of as the status information. Also, the time to the next query (for example, the time estimated from the scheduling relevant to the slave WSD 200 in connection) may be notified of.

Thereafter, the forwarding to WSD 30B of the handover destination from the WSD 30A of the handover source is performed (S380). Specifically, the HoM entity 100 queries the first master WSD 30A to forward to the master WSD 30B of the handover destination the transmitted data addressed to the slave WSD 200 which remains in the master WSD 30A of the handover source (S381). Then, the master WSD 30A forwards the transmitted data addressed to the slave WSD 200 which remains in the master WSD 30A, to the master WSD 30B via the management DB 20A or the like (or directly) (S383). Then, when the forwarding is completed, the HoM entity 100 is notified of the completion of the forwarding (S385).

Then, the handover is executed (step S390). Specifically, the HoM entity 100 requests the slave WSD 200 to execute the handover to the master WSD 30B (S391). Then, the slave WSD 200 starts the handover to the master WSD 30B (S393), and executes the enabling process with the master WSD 30B (S395, S396). Further, the HoM entity 100 is notified of the completion of the handover to the master WSD 30B (S397). Then, the handover ends (S398).

Thereafter, the slave WSD 200 starts the wireless communication with the master WSD 30B (S399).

In the above, an example of the communication control process according to one embodiment has been described. Note that step S330 and S350 in the above example of the communication control process is optional, and may be included in the communication control process or not.

<4.4. Another Implementation Example of Hom Entity>

Next, another implementation example of the HoM entity will be described with reference to FIGS. 14 and 15.

In an example of the above first embodiment, the HoM entity 100 is implemented as another independent device that is not the regulatory DB 10 and the management DB 20, as illustrated in FIG. 11.

However, the implementation method of the HoM entity 100 is not limited to such an example. For example, the HoM entity 100 may be implemented as a part of the regulatory DB 10 or the management DB 20. In the following, a specific example will be described with reference to FIGS. 14 and 15, with respect to this point.

Figure 14:
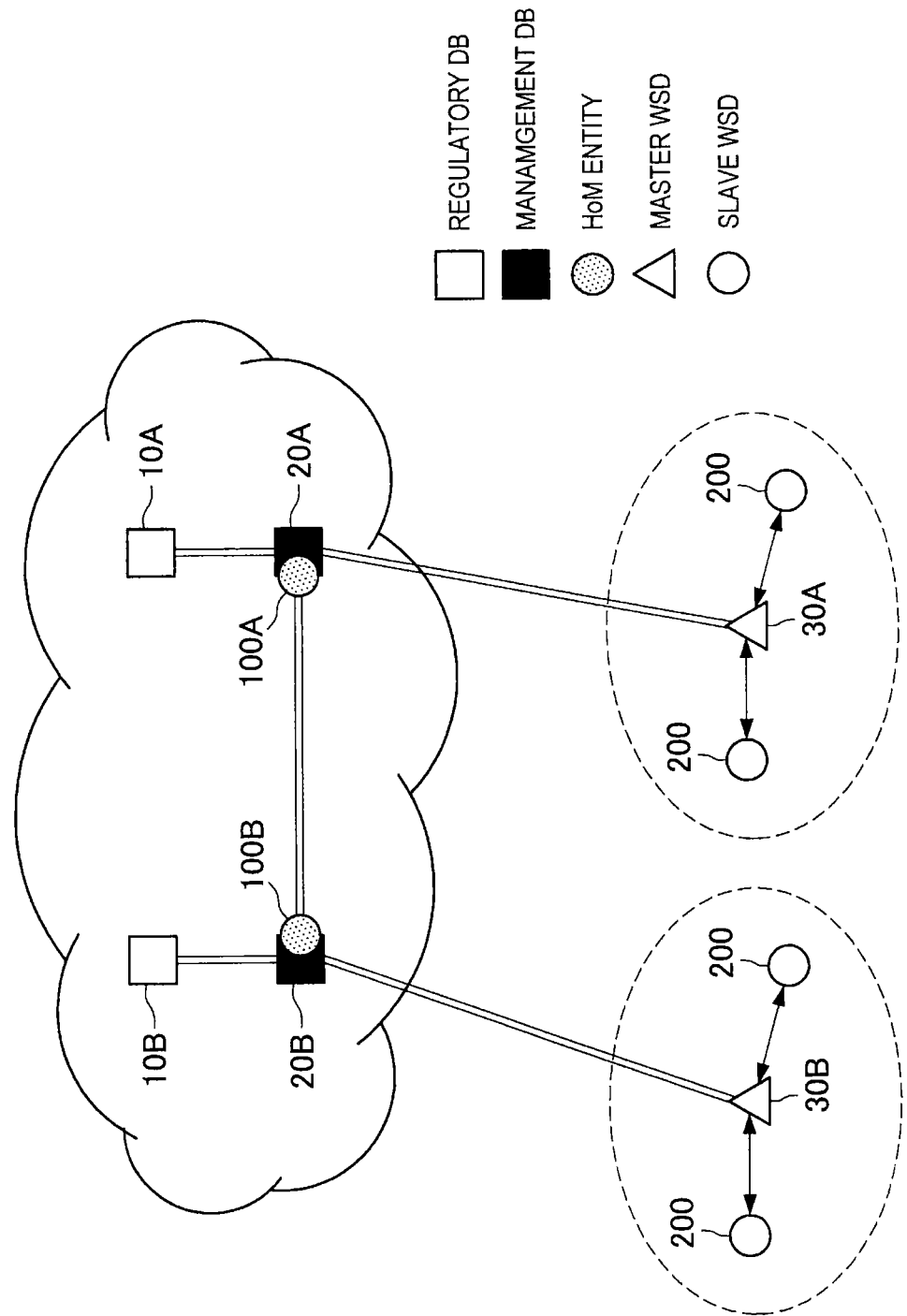
FIG. 14 is an explanatory diagram for describing another example of an implementation form of an HoM entity according to a first embodiment.

FIG. 14 is an explanatory diagram for describing another example of an implementation form of the HoM entity according to the first embodiment. Referring to FIG. 11, as in FIG. 11, the management DB 20A, the first secondary system including the master WSD 30A and the slave WSD 200, and the second secondary system including the management DB 20B, the master WSD 30B, and the slave WSD 200 are illustrated. Also, the regulatory DB 10A corresponding to the management DB 20A, and the regulatory DB 10B corresponding to the management DB 20B are illustrated. The regulatory DB 10A and the regulatory DB 10B may be the same regulatory DB, or may be different regulatory DBs. Then, in particular, in this example, the HoM entity 100 is implemented as a part of the management DB 20.

According to this implementation form, the handover in the secondary system (i.e., the handover under the control of the same management DB 20) is controlled by one HoM entity 100. Also, the handover between different secondary systems is controlled by one of two HoM entities 100, or is controlled by cooperation of two HoM entities 100.

Figure 15:
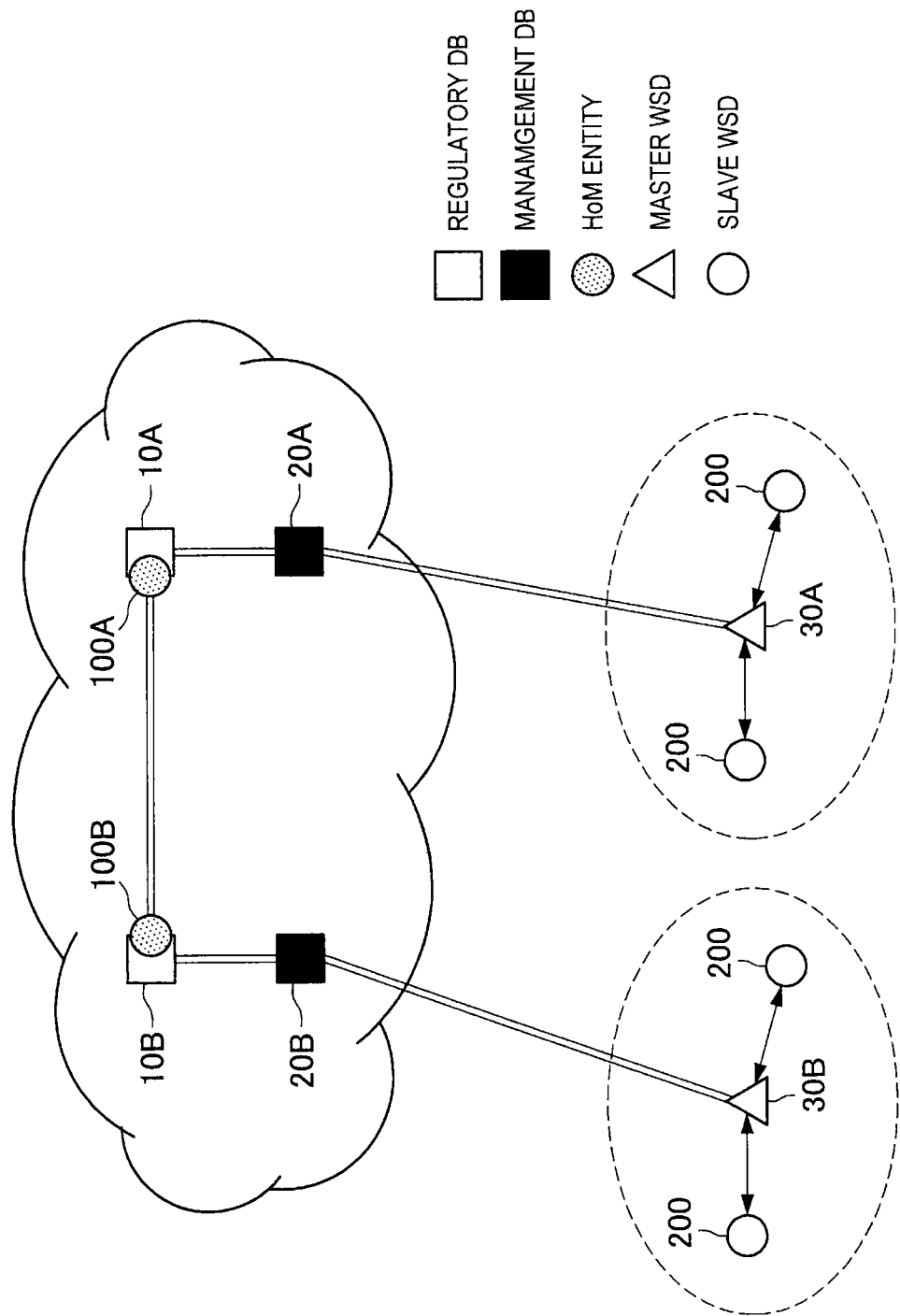
FIG. 15 is an explanatory diagram for describing yet another example of an implementation form of an HoM entity according to a first embodiment.

FIG. 15 is an explanatory diagram for describing yet another example of an implementation form of the HoM entity according to the first embodiment. Referring to FIG. 15, as in FIG. 15, the management DB 20A, the first secondary system including the master WSD 30A and the slave WSD 200, and the second secondary system including the management DB 20B, the master WSD 30B, and the slave WSD 200 are illustrated. Also, the regulatory DB 10A corresponding to the management DB 20A, and the regulatory DB 10B corresponding to the management DB 20B are illustrated. Then, in particular, in this example, the HoM entity 100 is implemented as a part of the regulatory DB 10.

According to this implementation form, the handover in the secondary system (i.e., the handover under the control of the same management DB 20) and the handover between secondary systems in the same country (i.e., the handover under the control of the same regulatory DB 10) are controlled by one HoM entity 100. Also, the handover between secondary systems in different countries is controlled by one of two HoM entities 100, or is controlled by cooperation of two HoM entities 100.

In the above, the first embodiment has been described. For example, as described above, the communication control device that controls the handover is a control node different from the slave WSD 200 of the handover target (i.e., the HoM entity 100).

Also, in the first embodiment, the handover that enables the slave WSD 200 to communicate wirelessly through the secondarily utilized frequency channel in the secondary system is recognized and controlled. Thereby, the wireless communication that is being performed already is allowed to continue in the secondary system.

More specifically, as described above, the secondary system secondarily utilizes the frequency channel that is not utilized temporarily by the primary system, as opposed to the primary system which can utilize the frequency channel basically any time. Hence, the utilizable frequency channel for the secondary system changes depending on time, and the utilizable frequency channel can be different for each secondary system (or for each master WSD of the secondary system). Hence, even if the master WSD 30 of the secondary system is present at the vicinity, the slave WSD 200 is not always able to execute the handover to the master WSD 30. Also, even if the slave WSD 200 is informed of another frequency channel utilizable for the master WSD 30 other than the frequency channel in use at a certain time, it is possible that the other frequency channel thereafter becomes unutilizable for the master WSD 30 after time passes. Hence, the slave WSD 200 is not always able to execute the handover to the above other frequency channel. As described above, in the secondary system, the handover is not performed in the same way as the handover in the cellular communication system.

Thus, as described above, in the first embodiment, the handover that enables the slave WSD 200 to communicate wirelessly through the secondarily used frequency channel in the secondary system (the master WSD 30 and/or the frequency channel) is recognized and controlled. Thereby, after the handover, the slave WSD 200 communicates wirelessly in the secondary system. That is, the slave WSD allows the wireless communication that is being performed already to be continued in the secondary system.

5. Second Embodiment

Figure 16:
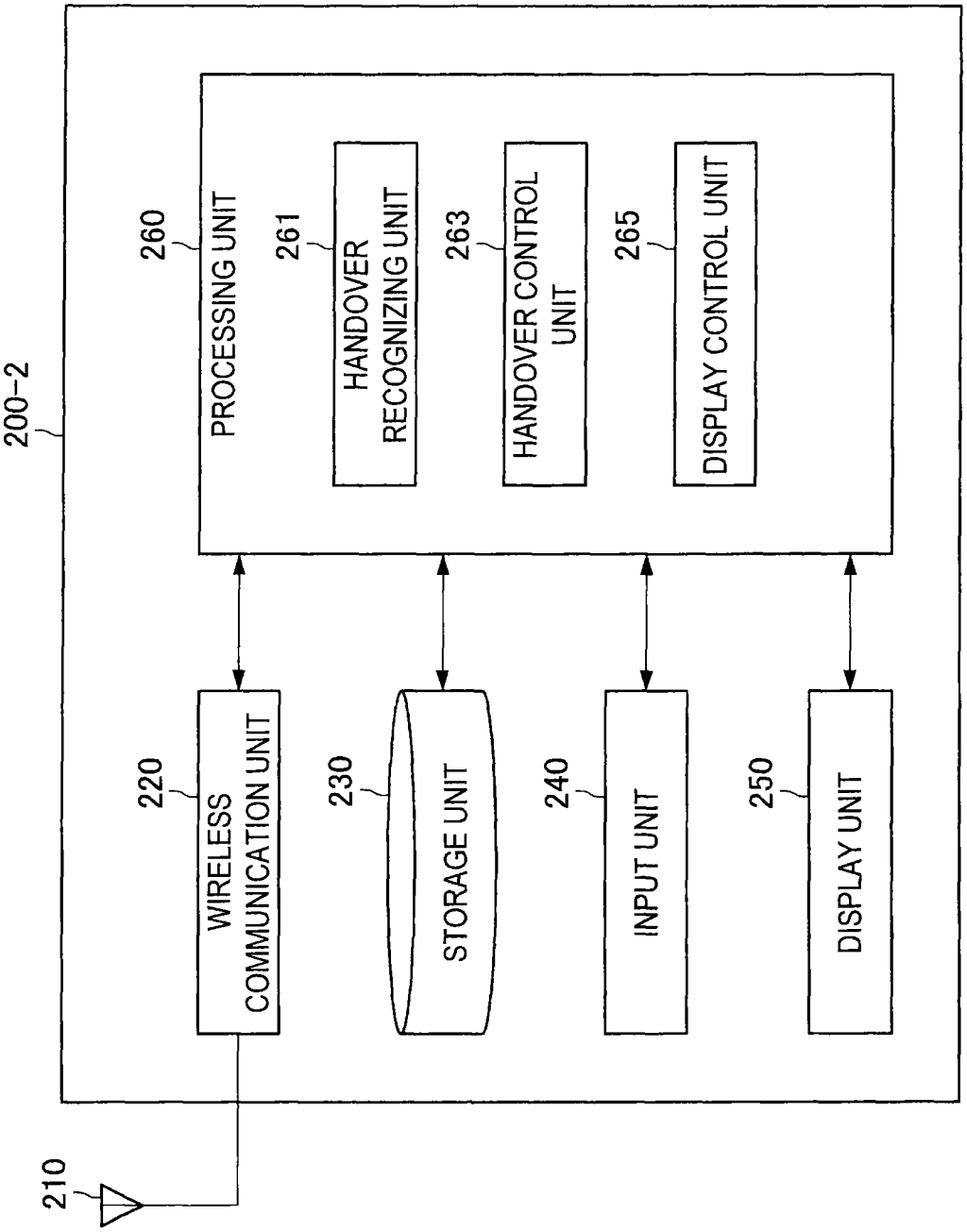
FIG. 16 is a block diagram illustrating an example of a configuration of a slave WSD according to a second embodiment.

Next, the second embodiment of the present disclosure will be described with reference to FIGS. 16 to 17. In the second embodiment of the present disclosure, the slave WSD 200 itself of the handover target controls the handover. Also, in the second embodiment, the slave WSD 200 executes the handover without the assist by the node of another communication control.

<5.1. Function and Configuration of Slave WSD>

First, with reference to FIG. 16, an example of the configuration of a slave WSD 200-2 according to the second embodiment will be described. FIG. 16 is a block diagram illustrating an example of the configuration of the slave WSD 200-2 according to the second embodiment. Referring to FIG. 16, the slave WSD 200-2 includes an antenna 210, a wireless communication unit 220, a storage unit 230, an input unit 240, a display unit 250, and a processing unit 260.

(Antenna 210)

The antenna 210 receives the radio signal, and outputs the received radio signal to the wireless communication unit 220. Also, the antenna unit 210 transmits the transmission signal output by the wireless communication unit 220.

(Wireless Communication Unit 220)

The wireless communication unit 220 communicates wirelessly through the frequency channel for the primary system, which is secondarily utilized by the secondary system. For example, the wireless communication unit 220 communicates wirelessly with the master WSD 30.

(Storage Unit 230)

The storage unit 230 stores programs and the data for the operation of the slave WSD 200-2. Also, the storage unit 230 stores various types of information provided by the regulatory DB 10, the management DB 20, and/or the master WSD 30, for example.

(Input Unit 240)

The input unit 240 accepts the input by the user of the slave WSD 200-2. Then, the input unit 240 provides the processing unit 260 with the input result.

(Display Unit 250)

The display unit 250 displays an output screen image (i.e., an output image) from the slave WSD 200-2. For example, the display unit 250 displays the output screen image, in response to the control by the processing unit 260 (the display control unit 265).

(Processing Unit 260)

The processing unit 260 provides various functions of the slave WSD 200-2. The processing unit 260 includes a handover recognizing unit 261, a handover control unit 263, and a display control unit 265.

(Handover Recognizing Unit 261)

The handover recognizing unit 261 recognizes the handover of the slave WSD 200-2 which enables the slave WSD 200-2 to communicate wirelessly through the frequency channel in the secondary system that secondarily utilizes the above frequency channel for the primary system.

In Case of Handover to Communication Control Node of Secondary System

As described above, for example, the above handover is a handover from the original communication control node that communicates wirelessly with the slave WSD 200-2, to one master WSD 30 that satisfies a predetermined condition among one or more master WSDs 30 included in the secondary system. That is, the above handover is a handover from the original communication control node, to the master WSD 30 of the secondary system. Also, the above predetermined condition includes being able to utilize the above frequency channel.

In this case, for example, the handover recognizing unit 261 recognizes the above handover, by recognizing at least one master WSD 30 that satisfies the above predetermined condition, among the above one or more master WSDs 30 included in the above secondary system.

When Utilizable Channel is Known

For example, the utilizable frequency channel for the secondary system (i.e., the utilizable channel) is known for the slave WSD 200-2. In this case, for example, the reconfiguration for the transmission and reception in the slave WSD 200-2 is performed to receive the signal through the utilizable channel. The specific content of the reconfiguration is as described in the first embodiment. Then, for example, the slave WSD 200-2 receives the enablement beacon from another master WSD 30 other than the master WSD 30 in communication with the slave WSD 200-2, through the above utilizable channel. Then, the handover recognizing unit 261 recognizes the other master WSD 30, as the master WSD 30 that satisfies a predetermined condition (i.e., the master WSD 30 that can utilize the utilizable channel). When the communication quality of the enablement beacon exceeds a predetermined threshold value, the above another master WSD 30 may be recognized as the master WSD 30 that satisfies a predetermined condition (i.e., the master WSD 30 that can utilize the utilizable channel).

When Utilizable Channel is Unknown

Also, for example, the utilizable channel is unknown for the slave WSD 200-2, in some cases.

For the first example, even when the utilizable channel is same for the master WSDs 30 in one secondary system (i.e., under the control of the same management DB 20), another utilizable channel different from the utilizable channel in use can be unknown for the slave WSD 200-2. As one example, when the master WSD 30 does not notify the slave WSD 200-2 of the utilizable channel, the utilizable channel can be unknown for the slave WSD 200-2.

For the second example, the one secondary system can be operated in such a manner that the definition of the utilizable channel is different depending on the master WSD 30 in one secondary system (i.e., under the control of the same management DB 20) as well. In this case, the utilizable channel for another master WSD 30 different from the master WSD in communication can be unknown for the slave WSD 200-2.

For the third example, the utilizable channel for the master WSD 30 in another secondary system (i.e., under the control of another management DB 20) can be unknown for the slave WSD 200-2. The utilizable channel is different depending on the management DB 20.

As described above, the utilizable channel can be unknown for the slave WSD 200-2. In this case, the slave WSD 200-2 receives a signal, while adjusting the center frequency, the band width, the radio access technology, the configuration parameters for transmission and reception. Then, when the enablement beacon is received, the handover recognizing unit 261 acquires a knowledge of the frequency channel through which the enablement beacon is received, as the utilizable channel.

Thereafter, in the same way as when the utilizable channel is known for the slave WSD 200-2, the master WSD 30 that satisfies a predetermined condition (i.e., the master WSD 30 that can utilize the utilizable channel) is recognized by the handover recognizing unit 261.

As described above, the master WSD 30 that can utilize the frequency channel secondarily utilized by the secondary system is recognized. Thereby, a knowledge of to which master WSD 30 the handover can be executed among the master WSDs 30 of the secondary system is acquired. As a result, the handover to the master WSD 30 of the secondary system can be actually executed.

In Case of Handover Between Frequency Channels

As described above, for example, the above secondary system secondarily utilizes two or more frequency channels. Then, the above handover is a handover from the original frequency channel through which the slave WSD 200-2 communicates wirelessly, among the above two or more frequency channels, to another frequency channel among the above two or more frequency channels. That is, the above handover is a handover between the frequency channels.

In this case, for example, the handover recognizing unit 261 recognizes the above handover by recognizing at least one frequency channel other than the above original frequency channel, among the above two or more frequency channels.

When Utilizable Channel is Known

Specifically, for example, the master WSD 30 that communicates wirelessly with the slave WSD 200-2 notifies the slave WSD 200-2 of the utilizable channel. In this case, the utilizable channel for the master WSD 30 is known by the slave WSD 200-2. Hence, the handover recognizing unit 261 recognizes the utilizable channel other than the utilizable channel in use (i.e., the original frequency channel) from the information notified as described above.

When Utilizable Channel is Unknown

Also, for example, it is possible that the slave WSD 200-2 is not notified of the utilizable channel. In this case, the slave WSD 200-2 receives a signal, while adjusting the center frequency, the band width, and the like. Then, when the enablement beacon is received, the handover recognizing unit 261 acquires a knowledge of the frequency channel through which the enablement beacon is received, as the utilizable channel. Then, the handover recognizing unit 261 recognizes the utilizable channel other than the utilizable channel in use (i.e., the original frequency channel) from the information of the utilizable channel for which a knowledge is acquired.

As described above, at least one frequency channel other than the original frequency channel through which the slave WSD 200-2 communicates wirelessly is recognized, among two or more frequency channels secondarily utilized by the secondary system. Thereby, a knowledge in terms of to which frequency channel the handover between frequencies is possible is acquired. As a result, the handover between frequencies is performed actually in the secondary system.

(Handover Control Unit 263)

The handover control unit 263 controls the above handover of the slave WSD 200-2. That is, the handover control unit 263 controls the handover recognized by the handover recognizing unit 261.

Decision of Execution of Handover

For example, the above control of the above handover includes deciding the execution of the above handover of the slave WSD 200-2. The above control of the above handover includes deciding the execution of the handover recognized by the handover recognizing unit 261.

More specifically, for example, when the handover (the master WSD 30 or the frequency channel) is recognized by the handover recognizing unit 261, the handover control unit 263 decides the execution of the handover. Also, when a plurality of handovers are recognized as candidates by the handover recognizing unit 261, the handover control unit 263 decides the execution of one handover among a plurality of handover candidates, on the basis of the measurement result or the like of the communication quality by the slave WSD 200-2, for example.

With this decision, the handover of the slave WSD 200-2 is actually executed. As a result, the slave WSD 200-2 is allowed to continue in the secondary system the wireless communication that is being performed already.

Control of Start of Enabling Process

As described above, in the secondary system, the process for enabling the wireless communication through the above frequency channel by the slave WSD 200-2 is performed, before the slave WSD 200-2 starts the wireless communication through the frequency channel secondarily used by the secondary system. Also, the process is executed at the time of the handover.

In this case, for example, the above control of the above handover includes controlling the start of the above process executed at the time of the above handover.

Specifically, for example, the above process is an enabling process. Then, after the decision of the execution of the handover, the handover control unit 263 triggers the enabling process. Then, the slave WSD 200-2 receives the enablement beacon through the utilizable channel of the handover destination, and transmits the reply to the enablement beacon (i.e., an enablement beacon response).

(Display Control Unit 265)

The display control unit 265 controls the display of the output screen image by the display unit 250. For example, the display control unit 265 generates the output screen image displayed by the display unit 250, and displays the output screen image on the display unit 250.

<5.2. Flow of Process>

Next, an example of the communication control process according to the second embodiment will be described with reference to FIG. 17. FIG. 17 is a sequence diagram illustrating an example of the schematic flow of the communication control process according to the second embodiment.

An example of the above communication control process is a communication control process of the case in which the slave WSD 200-2 performs the handover from the master WSD of the first secondary system 30A to the master WSD of the second secondary system 30B, as illustrated in FIGS. 5 to 7. Note that the regulatory DB 10A and the management DB 20A correspond to the master WSD 30A, and the regulatory DB 10B and the management DB 20B correspond to the master WSD 30B.

First, when the enabling process ends (S411), the slave WSD 200-2 starts the wireless communication with the master WSD 30A (S413).

Then, the candidates of the master WSD 30 of the handover destination are recognized (step S420). Specifically, the slave WSD 200-2 performs the reconfiguration for the transmission and reception (S421). Thereafter, the slave WSD 200 receives the enablement beacon from the master WSD 30 other than the master WSD 30A, and measures the communication quality (S423, S425). Note that, when the utilizable channel for the master WSD 30 other than the master WSD 30A is unknown for the slave WSD 200-2, steps S421 to S425 are repeated. That is, the slave WSD 200-2 adjusts the center frequency, the band width, the radio access technology, the configuration parameters for the transmission and reception, and the like, so as to receive the enablement beacon from the master WSD 30 other than the master WSD 30A, and receives the signal.

Thereafter, the slave WSD 200-2 make a decision with respect to the update of the serving master WSD 30 (S431). In this example, the slave WSD 200-2 decides the execution of the handover to the master WSD 30B. Specifically, the slave WSD 200-2 selects the master WSD 30 of the handover destination. For example, the master WSD 30 with the best communication quality or the master WSD 30 determined to satisfy required QoS is selected on the basis of the measurement result of the communication quality in step S425. Note that, when the adequate master WSD 30 is not found, the handover is not executed.

Then, the handover is executed (step S440). Specifically, the slave WSD 200-2 starts the handover to the master WSD 30B (S441), and executes the enabling process with the master WSD 30B (S443, S445). Then, the handover ends (S447).

Thereafter, the slave WSD 200-2 starts the wireless communication with the master WSD 30B (S451).

Note that, in step S420, when the slave WSD 200-2 includes a plurality of transmission and reception systems, the slave WSD 200-2 may receive the enablement beacon using another transmission and reception system, while wirelessly communicating with the original master WSD 30 using a certain transmission and reception system. Also, when the slave WSD 200-2 does not include a plurality of transmission and reception systems, the slave WSD 200-2 may break the wireless communication with the original master WSD 30, when detecting a deterioration in the communication quality, or when detecting that the slave WSD 200-2 is positioned at a predetermined region. Then, the slave WSD 200-2 may receive the enablement beacon from another master WSD 30 during the break.

In the above, the second embodiment has been described. For example, as described above, the communication control device that controls the handover is the slave WSD 200-2 of the handover target. Also, the slave WSD 200-2 executes the handover without the assist by the node of another communication control.

Also, in the second embodiment, in the same way as the first embodiment, the handover that enables the slave WSD 200-2 to communicate wirelessly in the secondarily utilized frequency channel in the secondary system is recognized and controlled. Thereby, the wireless communication that is being performed already is allowed to continue in the secondary system. This point is as described in the first embodiment.

6. Third Embodiment

Figure 18:
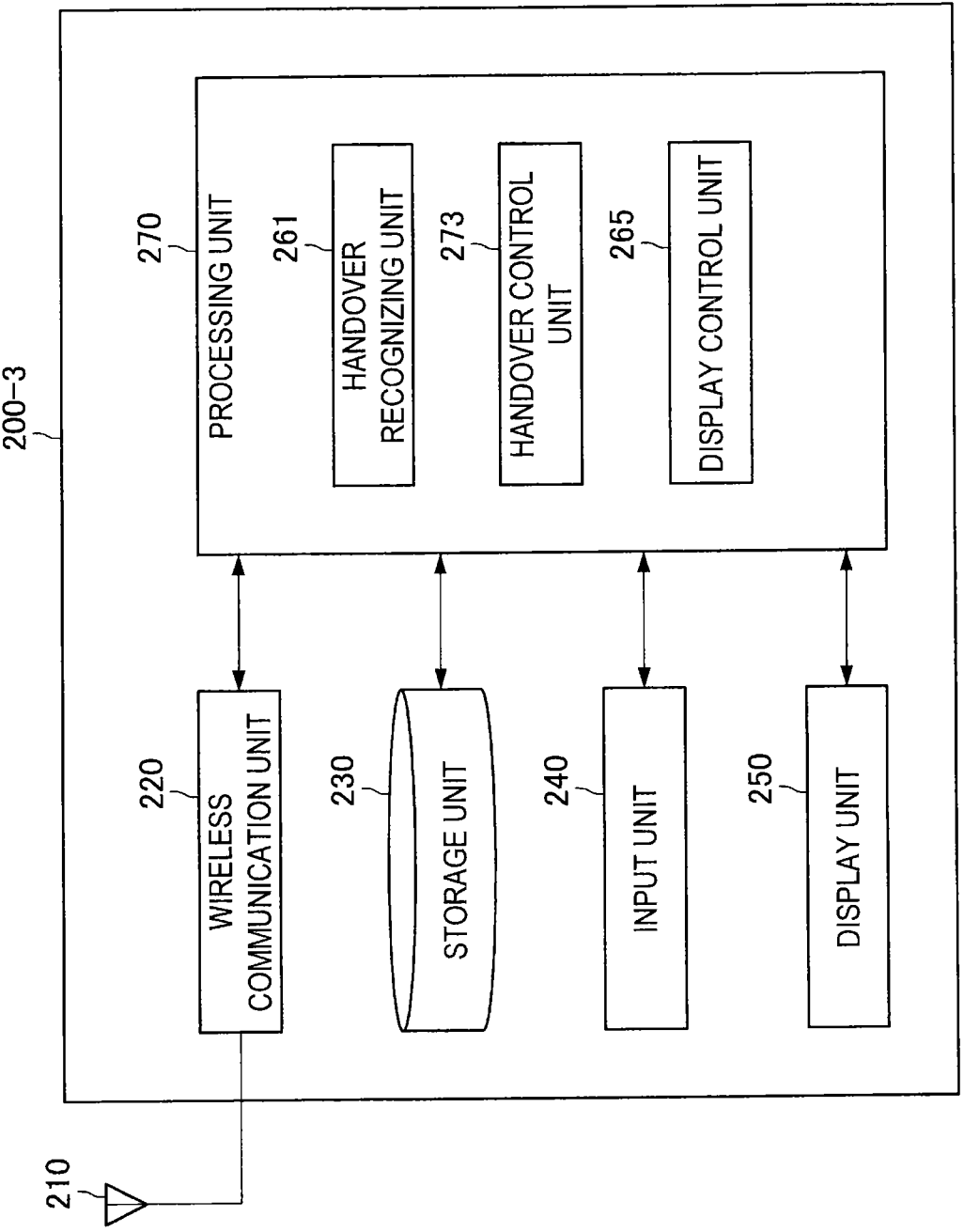
FIG. 18 is a block diagram illustrating an example of a configuration of a slave WSD according to a third embodiment.

Next, the third embodiment of the present disclosure will be described with reference to FIGS. 18 to 19B. In the third embodiment of the present disclosure, the slave WSD 200 itself of the handover target controls the handover. Also, in the third embodiment, the slave WSD 200 executes the handover with the assist by the node of another communication control.

<6.1. Function and Configuration of HoM Entity>

First, with reference to FIG. 18, an example of the configuration of a slave WSD 200-3 according to the third embodiment will be described. FIG. 18 is a block diagram illustrating an example of the configuration of the slave WSD 200-3 according to the third embodiment. Referring to FIG. 18, the slave WSD 200-3 includes the antenna 210, the wireless communication unit 220, the storage unit 230, the input unit 240, the display unit 250, and a processing unit 270.

Here, there is no difference between the second embodiment and the third embodiment, with respect to the antenna 210, the wireless communication unit 220, the storage unit 230, the input unit 240, the display unit 250, the handover recognizing unit 261, and the display control unit 265. Hence, here, the handover control unit 273 included in the processing unit 270 will be described.

(Handover Control Unit 273)

The handover control unit 273 controls the above handover of the slave WSD 200-3. That is, the handover control unit 273 controls the handover recognized by the handover recognizing unit 261.

Decision of Execution of Handover

For example, the above control of the above handover includes deciding the execution of the above handover of the slave WSD 200-3. This point is as described in the second embodiment.

Control of Transfer Associated with Handover

As described above, for example, the above handover is a handover from the original communication control node that communicates wirelessly with the slave WSD 200-3, to one master WSD 30 that satisfies a predetermined condition among one or more master WSDs 30 included in the secondary system.

In this case, in the third embodiment in particular, the above control of the above handover includes the control of forwarding the communication data addressed to the slave WSD 200 from the above original communication control node to above one master WSD 30.

More specifically, for example, the execution of the handover of the slave WSD 200 from the first master WSD 30 to the second master WSD 30 is decided. Then, the handover control unit 273 queries (or requests) the management DB 20 or the regulatory DB 10 corresponding to the first master WSD 30, to assist the handover, via the wireless communication unit 220. As a result, the management DB 20 or the regulatory DB 10 corresponding to the first master WSD 30 executes the process for the reception of the handover to the second master WSD 30. Then, when the handover is received, the transmitted data addressed to the slave WSD 200-3 which remains in the first master WSD 30 of the handover source is forwarded to the second master WSD 30 of the handover destination, by the control of the management DB 20 or the regulatory DB 10 corresponding to the first master WSD 30. As described above, the handover control unit 273 triggers the forwarding of the communication data addressed to the slave WSD 200, by the query or the request of the assist of the handover.

By the control of this forwarding, the transmitted data which remains in the master WSD 30 of the handover source becomes transmittable from the master WSD 30 of the handover destination. Hence, the slave WSD 200-3 can receive the transmitted data seamlessly. Thereby, the communication quality is enhanced at the time of the handover.

Control of Start of Enabling Process

As described above, in the secondary system, the process for enabling the wireless communication through the above frequency channel by the slave WSD 200-3 is performed, before the slave WSD 200-3 starts the wireless communication through the frequency channel secondarily used by the secondary system. Also, the process is executed at the time of the handover.

In this case, for example, the above control of the above handover includes controlling the start of the above process executed at the time of the above handover. This point is as described in the second embodiment.

<6.2. Flow of Process>

Next, an example of the communication control process according to the third embodiment will be described with reference to FIGS. 19A and 19B. FIGS. 19A and 19B are sequence diagrams illustrating an example of the schematic flow of the communication control process according to the third embodiment.

An example of the above communication control process is a communication control process of the case in which the slave WSD 200-3 performs the handover from the master WSD of the first secondary system 30A to the master WSD of the second secondary system 30B, as illustrated in FIGS. 5 to 7. Note that the regulatory DB 1 OA and the management DB 20A correspond to the master WSD 30A, and the regulatory DB 10B and the management DB 20B correspond to the master WSD 30B.

Figure 17:
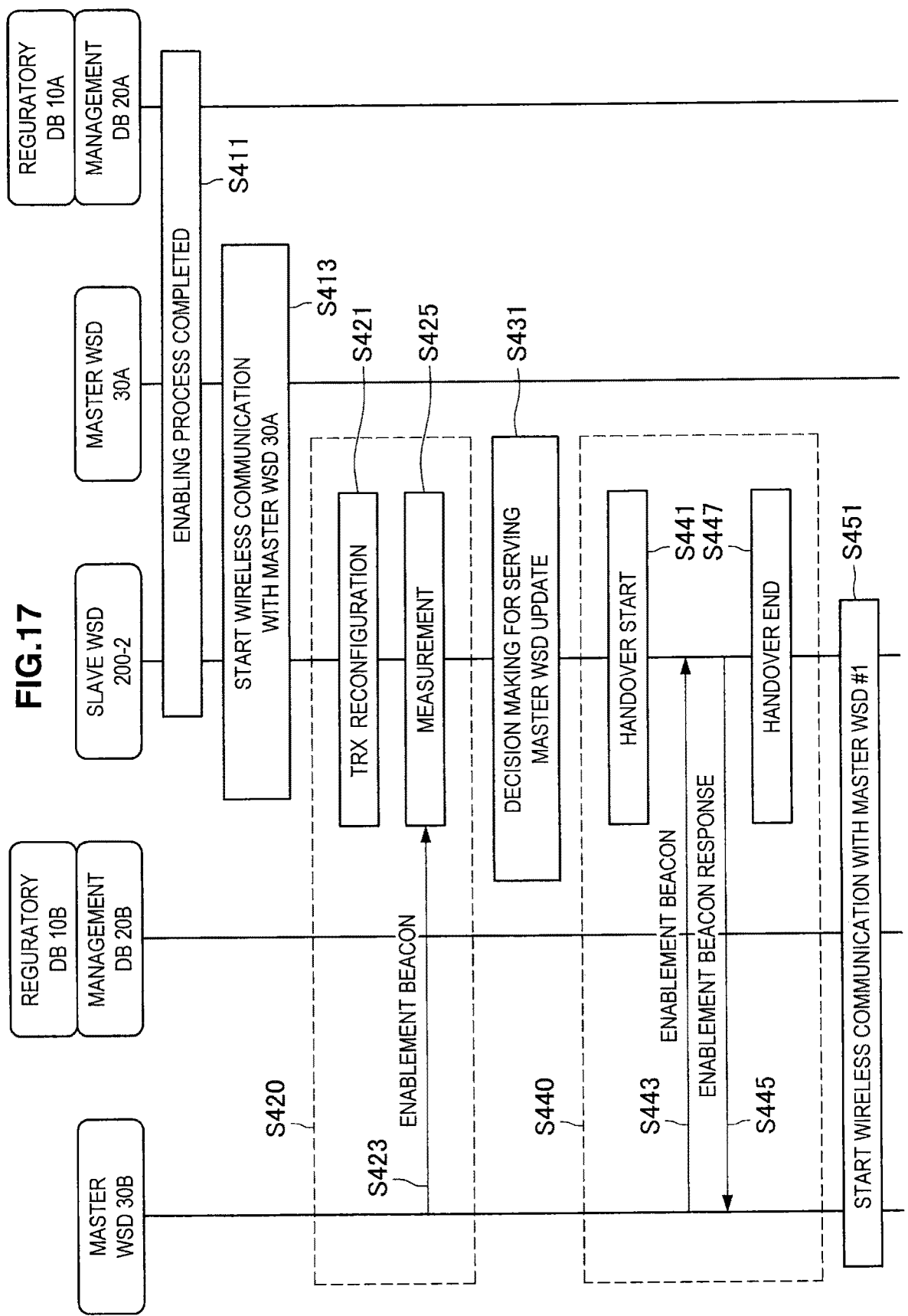
FIG. 17 is a sequence diagram illustrating an example of a schematic flow of a communication control process according to a second embodiment.

Here, steps S511 to S531 of the third embodiment illustrated in FIG. 19A are same as steps S411 to S431 according to the second embodiment illustrated in FIG. 17. Also, steps S561 to S571 of the third embodiment illustrated in FIG. 19B are same as steps S441 to S451 according to the second embodiment illustrated in FIG. 17. Hence, here, step S540 and step S550 will be described.

When the execution of the handover is decided (S531), the assist of the handover by the management DB 20A or the regulatory DB 10A is started (step S540). Specifically, the slave WSD 200-3 queries (or requests) the management DB 20A or the regulatory DB 10A to assist the handover, via the master WSD 30A (S541). Here, the slave WSD 200-3 notifies the management DB 20A or the regulatory DB 10A of the master WSD 30B of the handover destination and the frequency channel. Then, the management DB 20A or the regulatory DB 10A requests the master WSD 30B of the handover destination to receive the handover (S543). Then, the master WSD 30B of the handover destination answers whether or not to be able to receive the handover (S545). Note that the master WSD 30B may notify the operation situation of itself (the quality, the utilization rate of the utilizable channel, the number of the connected slave WSDs 200, the traffic, etc.) in addition to whether or not to be able to receive the handover. In particular, when unable to receive the handover, the reason may be notified of as the status information. Also, the time to the next query (for example, the time estimated from the scheduling relevant to the slave WSD 200-3 in connection) may be notified of.

Thereafter, the forwarding from the WSD 30A of the handover source to WSD 30B of the handover destination is performed (S550). Specifically, the management DB 20A or the regulatory DB 10A requests the master WSD 30A to forward to the master WSD 30B of the handover destination the transmitted data addressed to the slave WSD 200 which remains in the master WSD 30A of the handover source (S551). Then, the master WSD 30A answers whether or not to be able to forward (S552). The master WSD 30A may notify the reason, when unable to forward (for example, at the time of the data communication in which handover is difficult, and which is seamless like streaming). Then, when able to forward, the management DB 20A or the regulatory DB 10A requests the master WSD 30B of the handover destination to receive the above transmitted data addressed to the slave WSD 200 (S553). Then, the master WSD 30B answers whether or not to be able to receive (S554). The master WSD 30B may notify the reason, when unable to accept (for example, when there is no extra buffer, when executing heavy load process, etc.). Then, when able to receive, the master WSD 30A forwards the transmitted data addressed to the slave WSD 200 which remains in the master WSD 30A, to the master WSD 30B via the management DB 20A or the like (or directly) (S555). Then, when the forwarding is completed, the slave WSD 200-3 is notified of the completion of the forwarding (S557).

In the above, the third embodiment has been described. For example, as described above, the communication control device that controls the handover is the slave WSD 200-3 of the handover target. Also, the slave WSD 200-3 executes the handover with the assist by the node of another communication control.

Also, in the third embodiment, in the same way as the first embodiment and the second embodiment, the handover that enables the slave WSD 200-3 to communicate wirelessly in the secondarily utilized frequency channel in the secondary system is recognized and controlled. Thereby, the wireless communication that is being performed already is allowed to continue in the secondary system. This point is as described in the first embodiment.

7. Exemplary Variant

Next, the exemplary variant of the present embodiment will be described with reference to FIGS. 20 to 26B.
<<7.1. First Exemplary Variant>>

First, the first exemplary variant of the present embodiment will be described with reference to FIGS. 20 to 22C. According to the first exemplary variant of the present embodiment, the enabling process executed at the time of the handover is simplified more. As a result, the load in the master WSD 30 of the handover destination is reduced, and the time taken for the handover can be shortened.
(Overview of First Exemplary Variant)

As described above, in the secondary system, the process for enabling the wireless communication through the above frequency channel by the slave WSD 200-2 is performed, before the slave WSD 200-2 starts the wireless communication through the frequency channel secondarily used by the secondary system. Also, for example, the process includes making a request for the wireless communication through the above frequency channel by the slave WSD 200. Also, the process is executed at the time of the handover.

First, according to each embodiment described above, the above request is performed by the slave WSD 200.

Specifically, for example, after the execution of the handover is decided, the slave WSD 200 makes a request for the slave WSD 200 to wirelessly communicate through the utilizable channel, by replying to the enablement beacon through the utilizable channel of the handover destination (i.e., by transmitting the enablement beacon response). In the following, with respect to this point, a specific example will be described with reference to FIG. 20.

FIG. 20 is an explanatory diagram for describing an example in which the request for the wireless communication through the utilizable channel is performed by the slave WSD 200. Referring to FIG. 20, the slave WSD 200 which is the handover target, and the master WSD 30A of the handover source, and the master WSD 30B of the handover destination are illustrated. After the execution of the handover of the slave WSD 200 is decided, the slave WSD 200 receives the enablement beacon transmitted through the utilizable channel of the handover destination by the master WSD 30B of the handover destination. Then, the slave WSD 200 transmits the enablement beacon response through the utilizable channel. As described above, the request is performed by the slave WSD 200.

On the other hand, in the first exemplary variant of the present embodiment in particular, the above request is performed instead by the device other than the slave WSD 200, when performed at the time of the above handover.

In the first embodiment of the present embodiment, for example, the above request is performed instead by the HoM entity 100. Specifically, for example, after the execution of the handover is decided, the HoM entity 100 makes a request for the slave WSD 200 to communicate wirelessly through the utilizable channel of the handover destination, to the master WSD 30B of the handover destination, or the management DB 20B or the regulatory DB 10B corresponding to the master WSD 30B. The request is performed through the network of the backhaul. In the following, with respect to this point, a specific example will be described with reference to FIG. 21.

Figure 21:
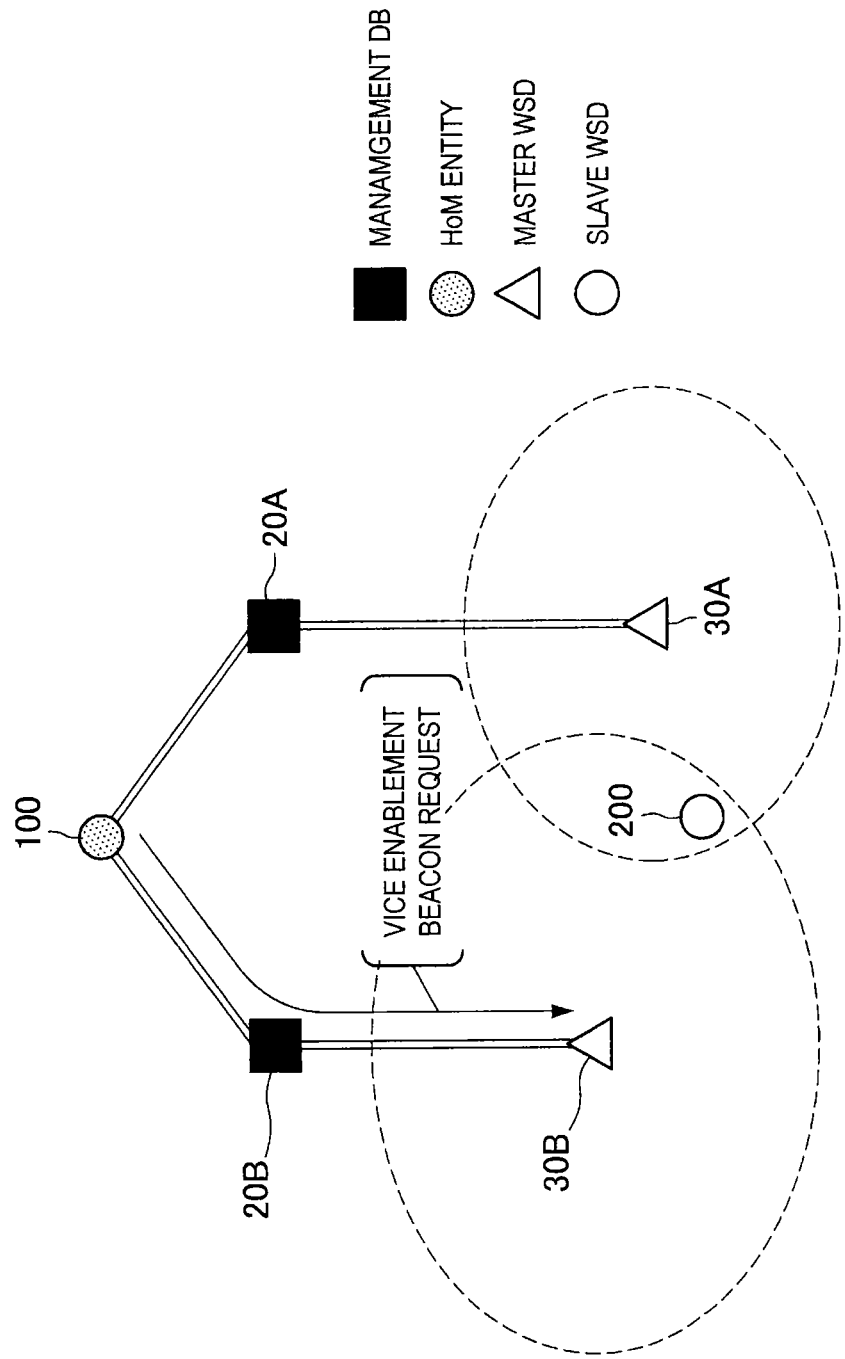
FIG. 21 is an explanatory diagram for describing an example of a request performed for a wireless communication through a utilizable channel by an HoM entity.

FIG. 21 is an explanatory diagram for describing an example in which the request for the wireless communication is performed through the utilizable channel by the HoM entity 100. Referring to FIG. 21, the slave WSD 200 which is the handover target, and the master WSD 30A of the handover source, and the master WSD 30B of the handover destination are illustrated. After the execution of the handover is decided, the HoM entity 100 transmits a vice enablement request, to make a request for the slave WSD 200 to communicate wirelessly through the utilizable channel of the handover destination. The transmission of the vice enablement request makes it unnecessary to receive the enablement beacon and to transmit the enablement beacon response.

Although an example in which the first exemplary variant is applied to the first embodiment has been described, the first exemplary variant is not limited to such an example. For example, the first exemplary variant may be applied to the third embodiment. In this case, for example, the above request may be executed instead by the management DB 20A or the regulatory DB 10A corresponding to the master WSD 30A of the handover source.

(Flow of Process)

Figure 22A:
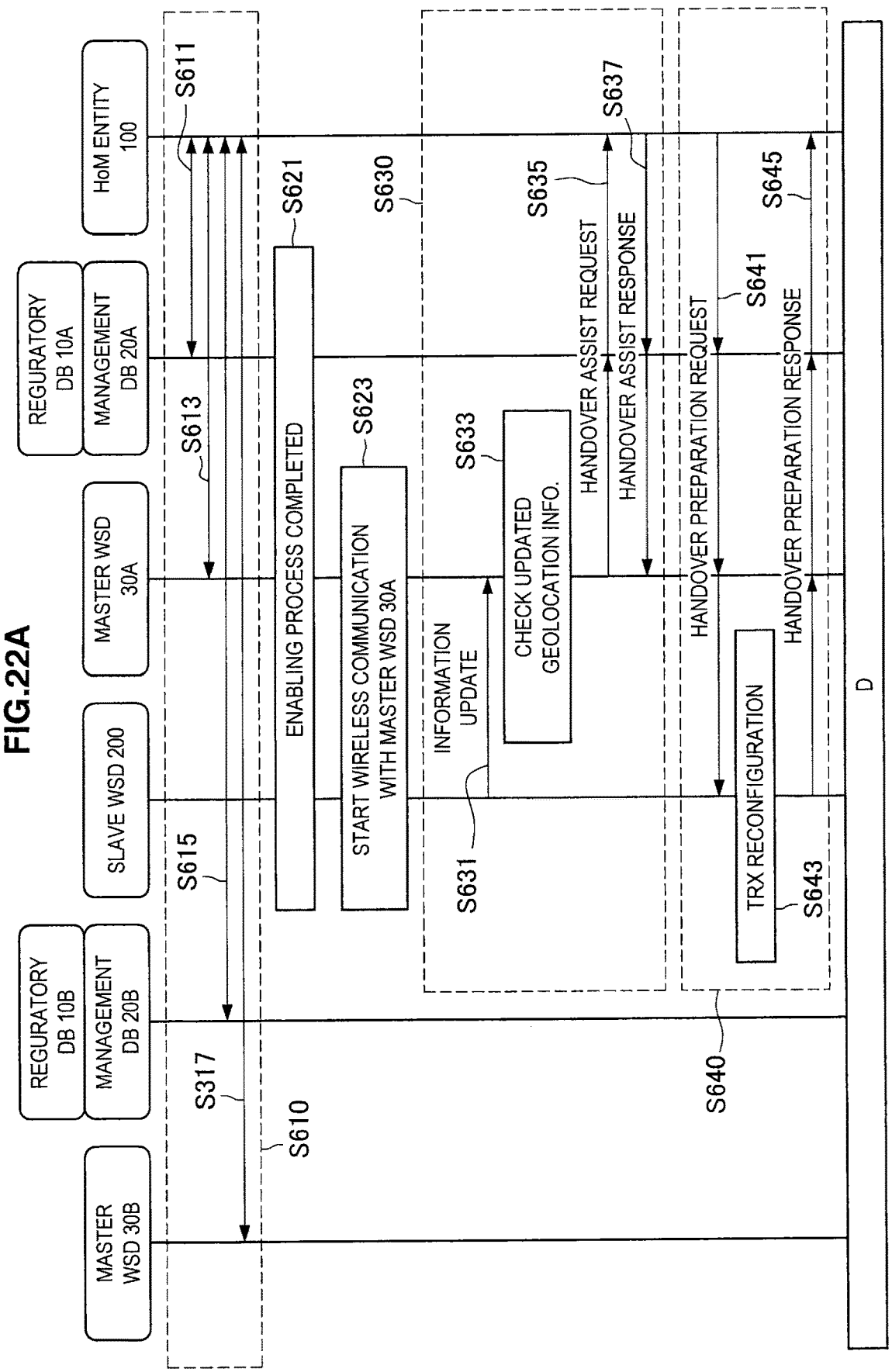
FIG. 22A is a first sequence diagram illustrating an example of a schematic flow of a communication control process according to a first exemplary variant of an embodiment of the present disclosure.
Figure 22B:
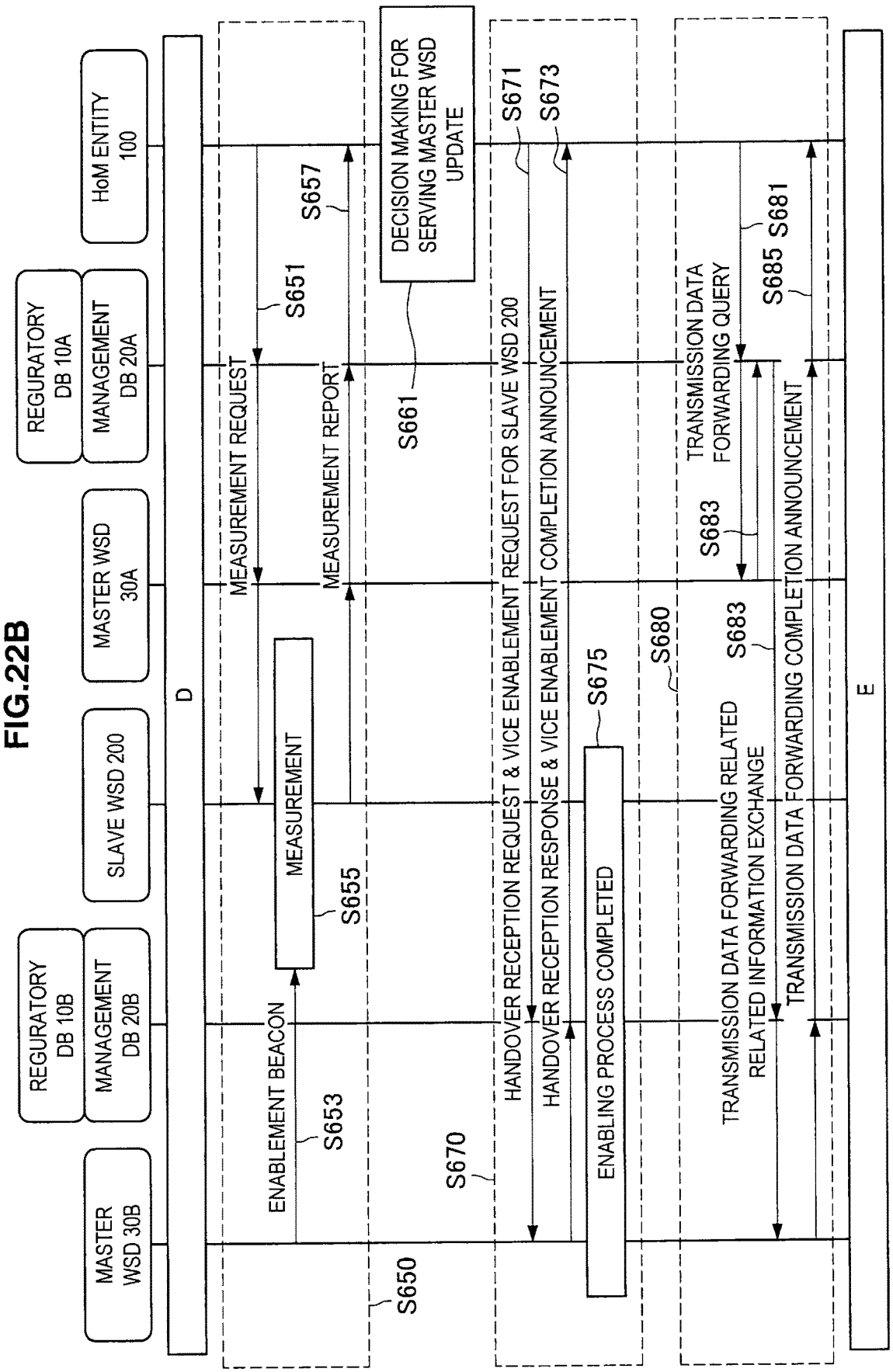
FIG. 22B is a second sequence diagram illustrating an example of a schematic flow of a communication control process according to a first exemplary variant of an embodiment of the present disclosure.

Next, with reference to FIGS. 22A to 22C, an example of the communication control process according to the first exemplary variant of the present embodiment will be described. FIGS. 22A to 22C are sequence diagrams illustrating an example of the schematic flow of the communication control process according to the first exemplary variant of the present embodiment.

An example of the above communication control process is a communication control process of the case in which the slave WSD 200 performs the handover from the master WSD of the first secondary system 30A to the master WSD of the second secondary system 30B, as illustrated in FIGS. 5 to 7. Note that the regulatory DB 10A and the management DB 20A correspond to the master WSD 30A, and the regulatory DB 10B and the management DB 20B correspond to the master WSD 30B.

Also, an example of the above communication control process is an example in which the first exemplary variant is applied to the first embodiment.

Here, steps S611 to S661 and step S680 of the first exemplary variant illustrated in FIGS. 22A to 22C are same as steps S311 to S361 and step S380 according to an example of the first embodiment illustrated in FIGS. 13A to 13C. Hence, here, steps S670, S691, and S699 will be described.

When the execution of the handover is decided (S661), the process for receiving the handover in the master WSD 30B of the handover destination is performed (S670).

Specifically, the HoM entity 100 requests the master WSD 30B of the handover destination to receive the handover (S671). Here, the HoM entity 100 transmits the vice enablement request, to also perform the request for the slave WSD 200 to communicate wirelessly through the utilizable channel of the handover destination. Then, the master WSD 30B of the handover destination answers whether or not to be able to receive the handover (S673). Here, the master WSD 30B of the handover destination also performs a vice enablement completion announcement. Then, the enabling process ends (S675).

Also, the HoM entity 100 requests the slave WSD 200 to execute the handover to the master WSD 30B (S691). As the enabling process has ended already, the slave WSD 200 thereafter starts the wireless communication with the master WSD 30B (S699)

In the above, the first exemplary variant of the present embodiment has been described. According to the first exemplary variant of the present embodiment, the enabling process performed at the time of the handover is simplified more. That is, the slave WSD 200 is needless to perform the reception of the enablement beacon and the transmission of the enablement beacon response once again. As a result, the master WSD 30 of the handover destination does not receive the enablement beacon response from the slave WSD 200, and therefore the load in the wireless communication for the master WSD 30 of the handover destination is reduced. Also, the time taken for the handover can be shortened.

<<7.2. Second Exemplary Variant>>

First, the first exemplary variant of the present embodiment will be described with reference to FIGS. 23 to 26B. According to the first exemplary variant of the present embodiment, the utilizable channels for the master WSD 30 increase. As a result, the throughput in the wireless network of the master WSD 30 improves.

(Overview of Second Exemplary Variant)

According to the above each embodiment, the master WSD 30 communicates wirelessly through the utilizable channel for itself. In the following, with respect to this point, a specific example will be described with reference to FIG. 23.

FIG. 23 is an explanatory diagram for describing an example of the utilizable channel for each master WSD 30. Referring to FIG. 23, the first secondary system including the management DB 20A, the master WSD 30A, and the slave WSD 200A, and the second secondary system including the management DB 20B, the master WSD 30B, and the slave WSD 200B are illustrated. For example, in this example, the utilizable channel for the first secondary system is the frequency channel A, and the utilizable channel for the second secondary system is the frequency channel B. Hence, when the enabling process with respect to the slave WSD 200A ends in the first secondary system, the slave WSD 200A communicates wirelessly with the master WSD 30A through the frequency channel A. Also, when the enabling process with respect to the slave WSD 200B ends in the second secondary system, the slave WSD 200B communicates wirelessly with the master WSD 30B through the frequency channel B.

On the other hand, in the second exemplary variant of the present embodiment in particular, the master WSD 30 also performs the wireless communication through the utilizable channel for another master WSD 30, other than the utilizable channel for itself. For example, the other master WSD 30 is included in another secondary system. Then, the utilizable channel utilizable for the other master WSD is the utilizable channel for the other secondary system. In the following, with respect to this point, a specific example will be described with reference to FIGS. 24 and 25.

FIG. 24 is an explanatory diagram for describing an example in which the first secondary system causes the master WSD of the second secondary system 300 to act as the slave network node. Referring to FIG. 24, the first secondary system including the management DB 20A, the master WSD 30A, and the slave WSD 200A, and the second secondary system including the management DB 20B, the master WSD 30B, and the slave WSD 200B are illustrated in the same way as FIG. 23. In particular, in this example, the first secondary system causes the master WSD of the second secondary system 30B, to act as the slave network node for the first secondary system (or the master WSD 30A). Specifically, for example, by the control of the first secondary system, the master WSD 30B become operable to utilize the utilizable channel for the first secondary system (i.e., the frequency channel A) through the enabling process in the first secondary system. As a result, for example, when the enabling process ends with respect to the slave WSD 200B through both of the frequency channel A and the frequency channel B, the slave WSD 200B communicates wirelessly with the master WSD 30B through both of the frequency channel A and the frequency channel B. That is, the network of the slave WSD 200B is the slave network for the first secondary system. Note that the master WSD 30B has a capability (extra transmission and reception processing resource, the authentication ID of the regulatory DB 10A, etc.) necessary for this wireless communication.

FIG. 25 is an explanatory diagram for describing an example in which the master WSD of the first secondary system 30 acts as the slave network node of the second secondary system. Referring to FIG. 25, the first secondary system including the management DB 20A, the master WSD 30A, and the slave WSD 200A, and the second secondary system including the management DB 20B, the master WSD 30B, and the slave WSD 200B are illustrated in the same way as FIG. 23. In particular, in this example, the master WSD of the first secondary system 30A acts as the slave network node for the second secondary system (or the master WSD 30B). Specifically, for example, the master WSD 30A become operable to utilize the utilizable channel for the second secondary system (i.e., the frequency channel B) through the enabling process in the second secondary system. As a result, for example, when the enabling process ends with respect to the slave WSD 200A through both of the frequency channel A and the frequency channel B, the slave WSD 200A communicates wirelessly with the master WSD 30A through both of the frequency channel A and the frequency channel B. That is, the network of the slave WSD 200A is the slave network for the second secondary system. Note that the master WSD 30A has a capability (extra transmission and reception processing resource, the authentication ID of the regulatory DB 10A, etc.) necessary for this wireless communication.

(Flow of Process)

Figure 26A:
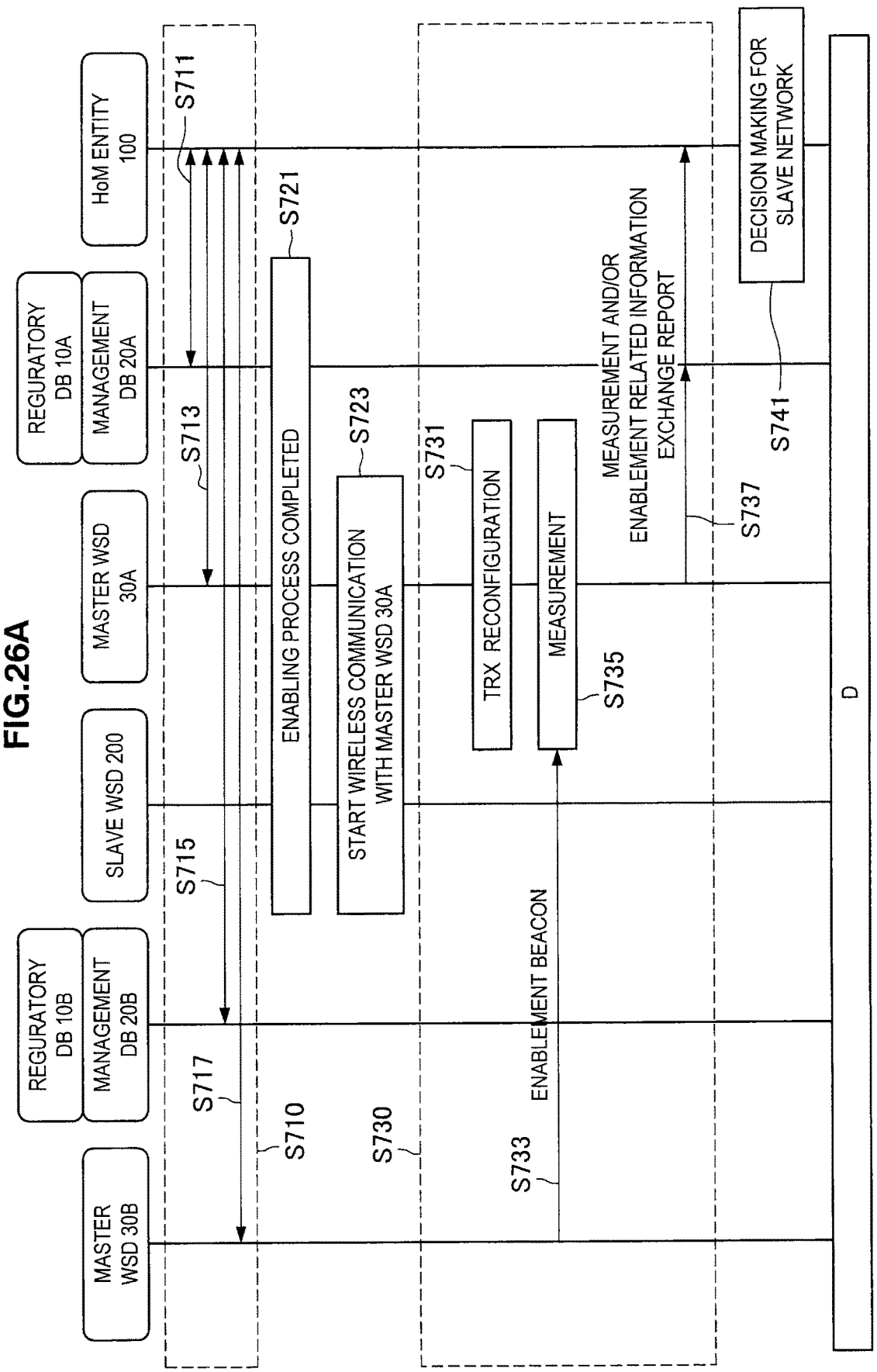
FIG. 26A is a first sequence diagram illustrating an example of a schematic flow of a communication control process according to a second exemplary variant of an embodiment of the present disclosure.
Figure 26B:
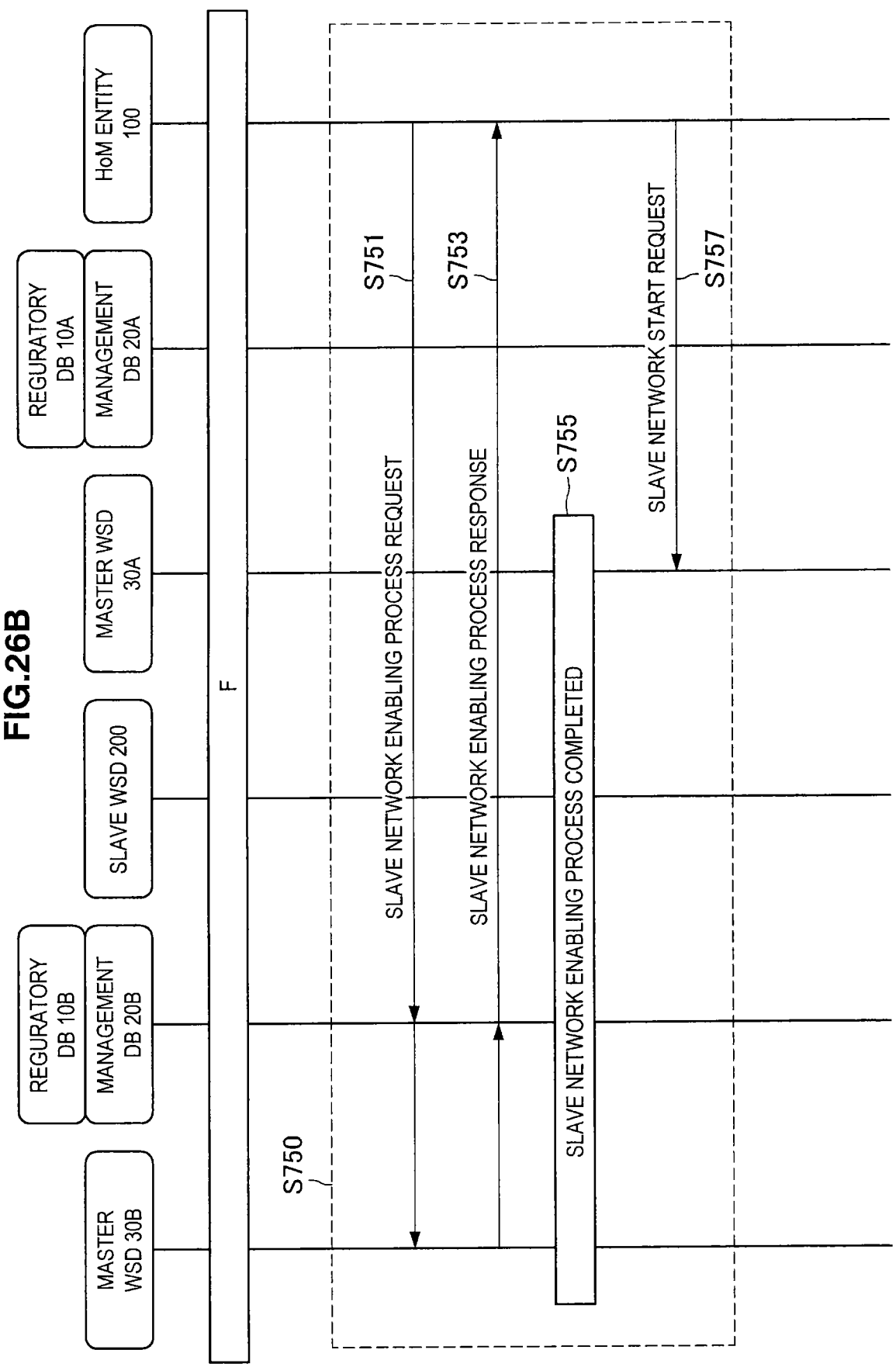
FIG. 26B is a second sequence diagram illustrating an example of a schematic flow of a communication control process according to a second exemplary variant of an embodiment of the present disclosure.

Next, with reference to FIGS. 26A and 26B, an example of the communication control process according to the second exemplary variant of the present embodiment will be described. FIGS. 26A and 26B are sequence diagrams illustrating an example of the schematic flow of the communication control process according to the second exemplary variant of the present embodiment.

An example of the above communication control process is the communication control process of the case in which the master WSD of the first secondary system 30A acts as the slave network node of the second secondary system, as illustrated in FIG. 25. Note that the regulatory DB 10A and the management DB 20A correspond to the master WSD 30A, and the regulatory DB 10B and the management DB 20B correspond to the master WSD 30B.

Also, an example of the above communication control process is an example in which the second exemplary variant is applied to the first embodiment.

First, the HoM entity 100 performs mutual authentication and/or exchange of basic information with each of the regulatory DB 10, the management DB 20, and the master WSD 30 (S710).

Then, when the enabling process ends (S721), the slave WSD 200 starts the wireless communication with the master WSD 30A (S723).

Also, the preparation for making the master WSD 30A the slave network node of the second secondary system is performed (step S730). Specifically, the slave WSD 200 performs the reconfiguration for the transmission and reception through the utilizable channel for the second secondary system (step S731). Then, the slave WSD 200 measures the communication quality through the utilizable channel for the second secondary system (S733, S735). Then, the slave WSD 200 reports the measurement result and Enablement related information, to the HoM entity 100 (S737).

Thereafter, the HoM entity 100 makes a decision with respect to the slave network (S741). In this example, the HoM entity 100 decides to make the master WSD 30A the slave network node. At the time of this decision, the position of the slave WSD 200 that communicates wirelessly with the master WSD 30B, and the position of the master WSD 30A may be considered. For example, when there is no slave WSD 200 that communicates wirelessly with the master WSD 30B at the vicinity of the master WSD 30A, there is no risk of interference, and therefore it is decided to make the master WSD 30A the slave network node. On the other hand, for example, when there is the slave WSD 200 that communicates wirelessly with the master WSD 30B at the vicinity of the master WSD 30A, there is a risk of interference, and therefore it is decided to not make the master WSD 30A the slave network node.

Then, the process for making the master WSD 30A the slave network node is performed (S750). Specifically, the HoM entity 100 requests the master WSD 30B, the management DB 20B, or the regulatory DB 10B, to execute the enabling process for the slave network (S751). Then, the master WSD 30B, the management DB 20B, or the regulatory DB 10B replies to the request of the slave network process (i.e., transmits a slave network enabling process response) (S753). Then, the enabling process of the slave network ends (S755), and the HoM entity 100 requests the master WSD 30A to start the slave network (S757).

In the above, the first exemplary variant of the present embodiment has been described. According to the first exemplary variant of the present embodiment, the utilizable channels for the master WSD 30 increase. That is, the master WSD 30 that is made the slave network node becomes operable to utilize the utilizable channel for another master WSD 30 (for example, the master WSD 30 of another secondary system) as well, and therefore the utilizable channels for the master WSD 30 that is made the slave network node increase. As a result, the throughput in the wireless network of the master WSD 30 that is made the slave network node improves.

8. Application Examples

The technology of the present disclosure is applicable to various products. For example, a HoM entity 100 may be realized as any type of server such as a tower server, a rack server, and a blade server. At least a part of the elements of the HoM entity 100 may be realized as a control module (such as an integrated circuit module including a single die, and a card or a blade that is inserted into a slot of a blade server) mounted on a server.

For example, a slave WSD 200 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The slave WSD 200 may also be realized as a terminal (that is also referred to as a machine type communication (MTC) terminal) that performs machine-to-machine (M2M) communication. Furthermore, at least a part of the elements of the slave WSD 200 may be realized as a wireless communication module (such as an integrated circuit module including a single die) mounted on each of the terminals.

8-1. Application Example Regarding HoM Entity

Figure 27:
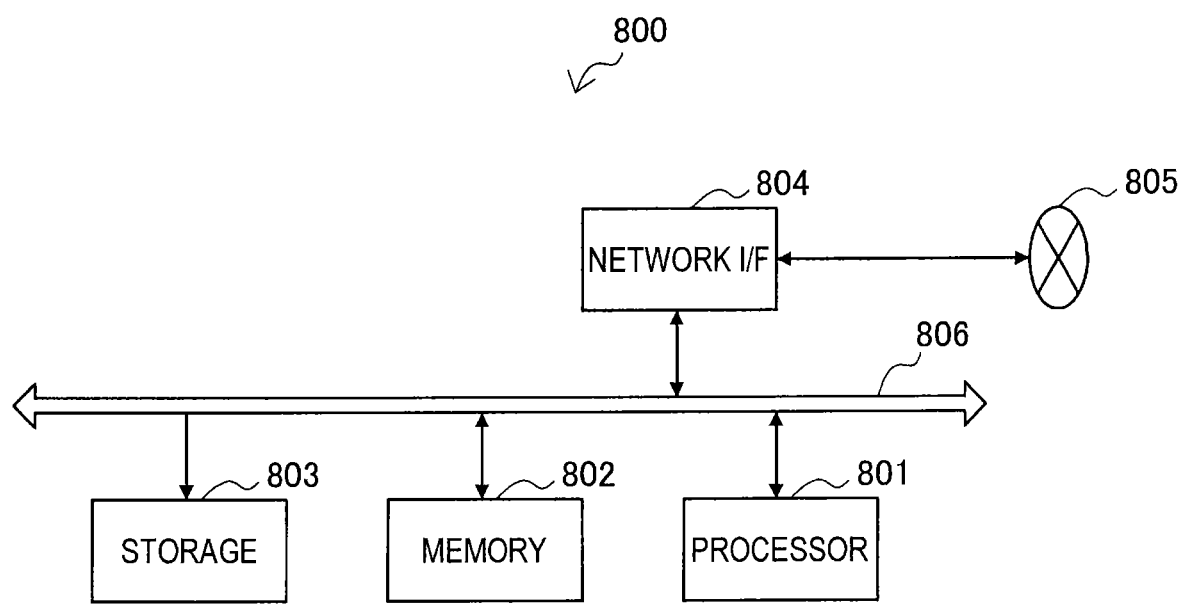
FIG. 27 is a block diagram illustrating an example of a schematic configuration of a server.

FIG. 27 is a block diagram illustrating an example of a schematic configuration of a server 800 to which the technology of the present disclosure may be applied. The server 800 includes a processor 801, a memory 802, a storage 803, a network interface 804, and a bus 806.

The processor 801 may be, for example, a central processing unit (CPU) or a digital signal processor (DSP), and controls functions of the server 800. The memory 802 includes random access memory (RAM) and read only memory (ROM), and stores a program that is executed by the processor 801 and data. The storage 803 may include a storage medium such as a semiconductor memory and a hard disk.

The network interface 804 is a wired communication interface for connecting the server 800 to a wired communication network 805. The wired communication network 805 may be a core network such as an Evolved Packet Core (EPC), or a packet data network (PDN) such as the Internet.

The bus 806 connects the processor 801, the memory 802, the storage 803, and the network interface 804 to each other. The bus 806 may include two or more buses (such as a high speed bus and a low speed bus) each of which has different speed.

In the server 800 illustrated in FIG. 27, the handover recognizing unit 131 and the handover control unit 133 described with reference to FIG. 12 may be implemented in the processor 801. As one example, a program for causing the processor to function as the handover recognizing unit 131 and the handover control unit 133 (in other words, a program for causing the processor to execute the operation of the handover recognizing unit 131 and the handover control unit 133) may be installed in a server 700, and the processor 701 may execute the program. As another example, the server 700 is equipped with a module including the processor 701 and the memory 702, and the handover recognizing unit 131 and the handover control unit 133 may be implemented in the module. In this case, the above module stores in the memory 702 the program for causing the processor to function as the handover recognizing unit 131 and the handover control unit 133, and the program may be executed by the processor 701. As described above, the server 700 or the above module may be provided as a device including the handover recognizing unit 131 and the handover control unit 133, and the above program for causing the processor to function as the handover recognizing unit 131 and the handover control unit 133 may be provided. Also, a readable storage medium that stores the above program may be provided.

8.2. Application Examples Regarding Slave WSD

First Application Example

Figure 28:
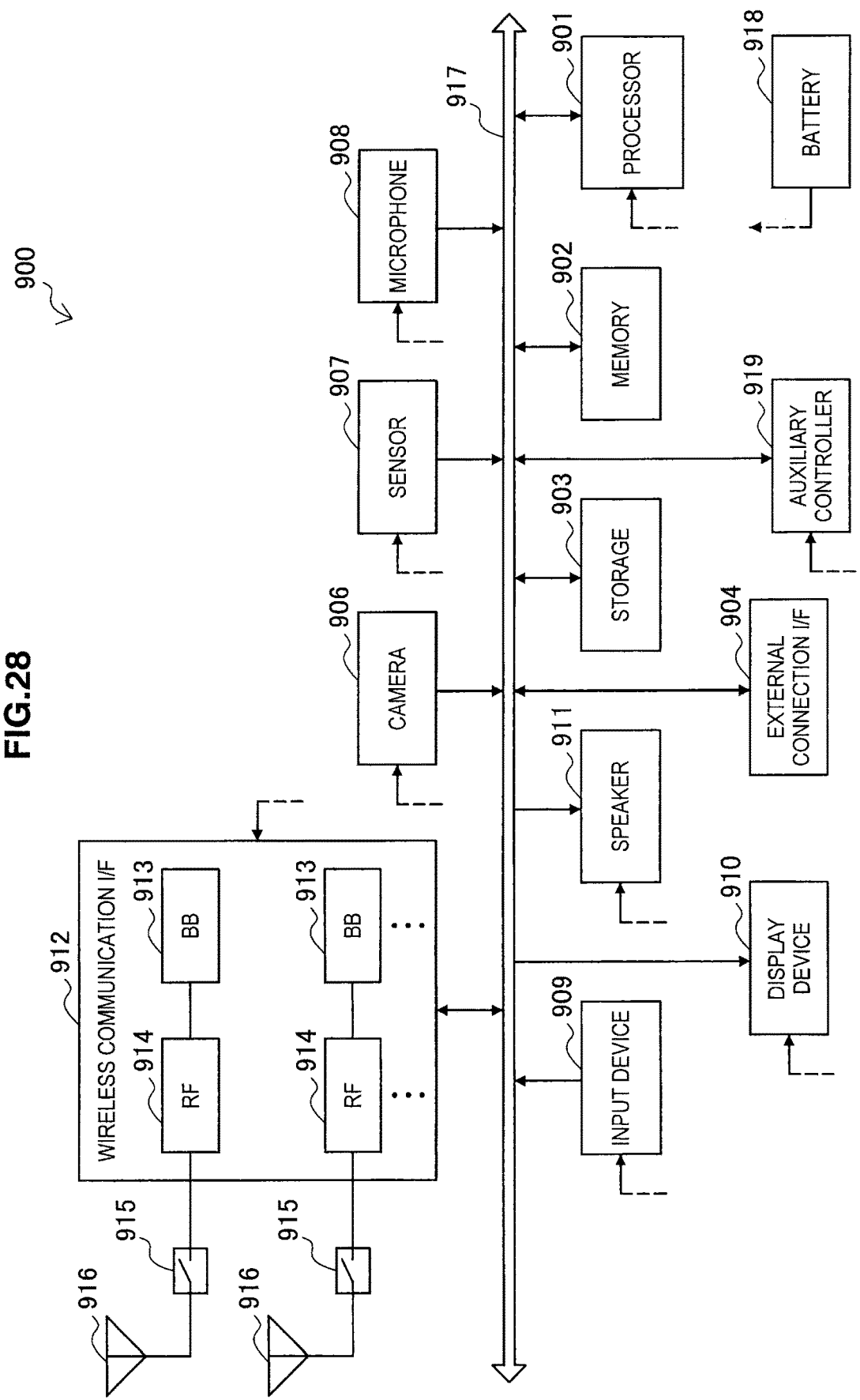
FIG. 28 is a block diagram illustrating an example of a schematic configuration of a smartphone.

FIG. 28 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 913 and the multiple RF circuits 914, as illustrated in FIG. 28. Although FIG. 28 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a radio local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 28. Although FIG. 28 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 28 via feeder lines, which are partially shown as dashed lines in the figure. The auxiliary controller 919 operates a minimum necessary function of the smartphone 900, for example, in a sleep mode.

In the smartphone 900 illustrated in FIG. 28, the handover recognizing unit 261 and the handover control unit 263 described with reference to FIG. 16 may be implemented in the wireless communication interface 912. Also, at least a part of these components may be implemented in the processor 901 or the auxiliary controller 919. As one example, the smartphone 900 may be equipped with a module including a part (for example, the BB processor 913) or all of the wireless communication interface 912, the processor 901, and/or the auxiliary controller 919, and the handover recognizing unit 261 and the handover control unit 263 may be implemented in the module. In this case, the above module may store a program for causing the processor to function as the handover recognizing unit 261 and the handover control unit 263 (in other words, a program for causing the processor to execute the operation of the handover recognizing unit 261 and the handover control unit 263), and execute the program. As another example, the program for causing the processor to function as the handover recognizing unit 261 and the handover control unit 263 may be installed in the smartphone 900, and the wireless communication interface 912 (for example, the BB processor 913), the processor 901, and/or the auxiliary controller 919 may execute the program. As described above, the smartphone 900 or the above module may be provided as a device including the handover recognizing unit 261 and the handover control unit 263, and the program for causing the processor to function as the handover recognizing unit 261 and the handover control unit 263 may be provided. Also, a readable storage medium that stores the above program may be provided. With respect to these points, the handover recognizing unit 261 and the handover control unit 273 described with reference to FIG. 18 are same as the handover recognizing unit 261 and the handover control unit 263.

Second Application Example

FIG. 29 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 29. Although FIG. 29 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a radio LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation apparatus 920 may include the multiple antennas 937, as illustrated in FIG. 29. Although FIG. 29 illustrates the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In that case, the antenna switches 936 may be omitted from the configuration of the car navigation apparatus 920.

The battery 938 supplies power to blocks of the car navigation apparatus 920 illustrated in FIG. 29 via feeder lines that are partially shown as dashed lines in the figure. The battery 938 accumulates power supplied form the vehicle.

In the car navigation apparatus 920 illustrated in FIG. 29, the handover recognizing unit 261 and the handover control unit 263 described with reference to FIG. 16 may be implemented in the wireless communication interface 933. Also, at least a part of these components may be implemented in the processor 921. As one example, the car navigation apparatus 920 may be equipped with a module including a part (for example, the BB processor 934) or all of the wireless communication interface 933 and/or the processor 921, and the handover recognizing unit 261 and the handover control unit 263 may be implemented in the module. In this case, the above module may store a program for causing the processor to function as the handover recognizing unit 261 and the handover control unit 263 (in other words, a program for causing the processor to execute the operation of the handover recognizing unit 261 and the handover control unit 263), and execute the program. As another example, the program for causing the processor to function as the handover recognizing unit 261 and the handover control unit 263 may be installed in the car navigation apparatus 920, and the wireless communication interface 933 (for example, the BB processor 934) and/or the processor 921 may execute the program. As described above, the car navigation apparatus 920 or the above module may be provided as a device including the handover recognizing unit 261 and the handover control unit 263, and the program for causing the processor to function as the handover recognizing unit 261 and the handover control unit 263 may be provided. Also, a readable storage medium that stores the above program may be provided. With respect to these points, the handover recognizing unit 261 and the handover control unit 273 described with reference to FIG. 18 are same as the handover recognizing unit 261 and the handover control unit 263.

The technology of the present disclosure may also be realized as an in-vehicle system (or a vehicle) 940 including one or more blocks of the car navigation apparatus 920, the in-vehicle network 941, and a vehicle module 942. That is, the in-vehicle system (or the vehicle) 940 may be provided as the device including the handover recognizing unit 261 and the handover control unit 263 (or the handover recognizing unit 261 and the handover control unit 273). The vehicle module 942 generates vehicle data such as vehicle speed, engine speed, and trouble information, and outputs the generated data to the in-vehicle network 941.

9. Conclusion

In the above, the communication device and each process according to the embodiment of the present disclosure have been described, using FIGS. 1 to 29. According to the embodiment according to the present disclosure, the handover that enables the slave WSD 200 to communicate wirelessly through the frequency channel secondarily utilized in the secondary system is recognized and controlled.

Thereby, the wireless communication that is being performed already is allowed to continue in the secondary system.

More specifically, as described above, the secondary system secondarily utilizes the frequency channel that is not utilized temporarily by the primary system, as opposed to the primary system which can utilize the frequency channel basically any time. Hence, the utilizable frequency channel for the secondary system changes depending on time, and the utilizable frequency channel can be different for each secondary system (or for each master WSD of the secondary system). Hence, even if the master WSD 30 of the secondary system is present at the vicinity, the slave WSD 200 is not always able to execute the handover to the master WSD 30. Also, even if the slave WSD 200 is informed of another frequency channel utilizable for the master WSD 30 other than the frequency channel in use at a certain time, it is possible that the other frequency channel thereafter becomes unutilizable for the master WSD 30 after time passes. Hence, the slave WSD 200 is not always able to execute the handover to the above other frequency channel. As described above, in the secondary system, the handover is not performed in the same way as the handover in the cellular communication system.

Thus, as described above, in the first embodiment, the handover that enables the slave WSD 200 to communicate wirelessly through the secondarily used frequency channel in the secondary system (the master WSD 30 and/or the frequency channel) is recognized and controlled. Thereby, after the handover, the slave WSD 200 communicates wirelessly in the secondary system. That is, the slave WSD allows the wireless communication that is being performed already to be continued in the secondary system.

First, for example, according to the first embodiment, the above control of the above handover includes notifying the slave WSD 200 of the above handover.

For example, with this notification, the slave WSD 200 can perform the measurement for deciding the handover to be executed from among the plurality of handover candidates. As a result, an optimal handover for the slave WSD 200 can be selected. Also, the slave WSD 200 can perform reconfiguration when the handover is executed actually.

Second, for example, according to the first to third embodiments, the above control of the above handover includes deciding the execution of the above handover of the slave WSD 200.

With this decision, the handover of the slave WSD 200 is actually executed. As a result, the slave WSD 200 is allowed to continue in the secondary system the wireless communication that is being performed already.

Third, for example, according to the first embodiment or the third embodiment, the above handover is a handover from the original communication control node that communicates wirelessly with the slave WSD 200, to one master WSD 30 that satisfies a predetermined condition among one or more master WSDs 30 included in the secondary system. In this case, for example, the above control of the above handover includes the control of forwarding the communication data addressed to the slave WSD 200 to above one master WSD 30 from the above original communication control node.

By the control of this forwarding, the transmitted data which remains in the master WSD 30 of the handover source becomes transmittable from the master WSD 30 of the handover destination. Hence, the slave WSD 200 can receive the transmitted data seamlessly. Thereby, the communication quality is enhanced at the time of the handover.

Fourth, for example, according to the first to third embodiments, in the secondary system, the process for enabling the wireless communication through the above frequency channel by the slave WSD 200 is performed, before the slave WSD 200 starts the wireless communication through the frequency channel secondarily used by the secondary system. Also, the process is executed at the time of the handover. In this case, for example, the above control of the above handover includes controlling the start of the above process performed at the time of the above handover.

With this control, the slave WSD communicates wirelessly in the handover destination actually.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, the embodiment in the context of a TV white space has been described mainly. However, the technology according to the present disclosure is not limited to such an example. The primary system and the secondary system may be a communication system other than the primary system and the secondary system relevant to a TV white space.

For the first example, in the study of the fifth generation (5G) wireless communication scheme at 3GPP release 12 and onwards, macro cells and small cells overlapped on each other is proposed to improve the communication capacity, (NTT DOCOMO, INC., "Requirements, Candidate Solutions & Technology Roadmap for LTE Rel-12 Onward", 3GPP Workshop on Release 12 and onwards, Ljubljana, Slovenia, Jun. 11-12, 2012). The technology according to the present disclosure can be applied to a case in which the secondary system corresponding to this small cell secondarily utilizes the frequency channel for the primary system corresponding to this macro cell. In this case, in the handover between the nodes, the communication control node of the handover destination is the base station of the small cell. Then, the handover source base station may be a base station of the macro cell, or may be a base station of another small cell, or may be a communication control node (for example, a master WSD) of another type. Also, the wireless communication device which is the target of the handover may be a terminal device, such as user equipment (UE).

Also, for the second example, the technology according to the present disclosure is applicable to the case of LSA based on the infrastructure sharing.

Also, for the third example, the technology according to the present disclosure is applicable to a case in which there are the primary system operated by a mobile network operator (MNO), and the secondary system operated by a mobile virtual network operator (MVNO) and/or a mobile virtual network enabler (MVNE).

Processing steps in the communication control apparatus (for example, the HoM entity, the slave WSD) in the present specification do not necessarily have to be performed in the chronological order described in the flowcharts. For example, the processing steps in the communication control process may be performed in order different from the order described as the flowcharts, or may be performed in parallel.

Also, a computer program for causing the processor (for example, CPU, DSP, etc.) equipped in the node of the present specification (for example, the HoM entity or the slave WSD) to function as the components (for example, the handover recognizing unit and the handover control unit) of the above node (in other words, a computer program for causing the above processor to execute the operation of the components of the above node) can be created. Also, the storage medium that stores the computer program may be provided. Also, the device including the memory that stores the above computer program and one or more processors that can execute the above computer program (for example, a processing circuit, a chip, or a module) may be provided. That is, the below information processing apparatus may be provided.

An information processing apparatus including:
a memory that stores a program; and
a processor configured to execute the program,
wherein the program is a program for executing
recognizing a handover of a wireless communication device, wherein the handover enables the wireless communication device to communicate wirelessly through a frequency channel for a primary system in a secondary system that secondarily utilizes the frequency channel, and
controlling the handover of the wireless communication device.

Additionally, the present technology may also be configured as below.

(1)
A communication control device including:
a recognizing unit configured to recognize a handover of a wireless communication device, the handover enabling the wireless communication device to communicate wirelessly through a frequency channel for a primary system in a secondary system that secondarily utilizes the frequency channel; and
a control unit configured to control the handover of the wireless communication device.

(2)
The communication control device according to (1), wherein
the secondary system includes one or more communication control nodes that communicate wirelessly through the frequency channel,
the handover is a handover from an original communication control node that communicates wirelessly with the wireless communication device to one communication control node that satisfies a predetermined condition among the one or more communication control nodes, and
the predetermined condition includes being able to utilize the frequency channel.

(3)
The communication control device according to (2), wherein
the control of the handover includes a control of forwarding communication data addressed to the wireless communication device from the original communication control node to the one communication control node.

(4)
The communication control device according to any one of (2) and (3), wherein
the recognizing unit recognizes the handover by recognizing at least one communication control node that satisfies the predetermined condition among the one or more communication control nodes.

(5)
The communication control device according to any one of (2) to (4), wherein
the original communication control node is a communication control node included in another system different from the secondary system.

(6)
The communication control device according to (5), wherein
the other system different from the secondary system is another secondary system that is not the secondary system.

(7)
The communication control device according to (5), wherein
the other system different from the secondary system is the primary system.

(8)
The communication control device according to any one of (2) to (4), wherein the original communication control node is another communication control node among the one or more communication control nodes included in the secondary system.

(9)

The communication control device according to (1), wherein the secondary system secondarily utilizes two or more frequency channels, and the handover is a handover from an original frequency channel through which the wireless communication device communicates wirelessly among the two or more frequency channels to another frequency channel among the two or more frequency channels.

(10)

The communication control device according to (9), wherein the recognizing unit recognizes the handover by recognizing at least one frequency channel other than the original frequency channel among the two or more frequency channels.

(11)

The communication control device according to any one of (1) to (10), wherein the control of the handover includes deciding an execution of the handover of the wireless communication device.

(12)

The communication control device according to any one of (1) to (11), wherein in the secondary system, a process for enabling wireless communication through the frequency channel by the wireless communication device is executed, before the wireless communication device starts wireless communication through the frequency channel, and the process is executed at a time of the handover.

(13)

The communication control device according to (12), wherein the control of the handover includes controlling a start of the process executed at the time of the handover.

(14)

The communication control device according to (12) or (13), wherein the process includes making a request for wireless communication through the frequency channel by the wireless communication device.

(15)

The communication control device according to (14), wherein the request is performed instead by a device other than the wireless communication device, when executed at the time of the handover.

(16)

The communication control device according to any one of (1) to (15), wherein the communication control device is a control node different from the wireless communication device.

(17)

The communication control device according to (16), wherein the control of the handover includes notifying the wireless communication device of the handover.

(18)

The communication control device according to any one of (1) to (15), wherein the communication control device is the wireless communication device.

(19)

The communication control device according to (1) to (18), wherein the secondary system secondarily utilizes the frequency channel by utilizing the frequency channel within a period when the frequency channel for the primary system is not utilized for the primary system.

(20)

A communication control method including:

recognizing a handover of a wireless communication device, the handover enabling the wireless communication device to communicate wirelessly through a frequency channel for a primary system in a secondary system that secondarily utilizes the frequency channel; and controlling the handover of the wireless communication device.

REFERENCE SIGNS LIST 10 regulatory database
20 management database
30 master white space device
100 handover management entity
131 handover recognizing unit
133 handover control unit
200 slave white space device
261 handover recognizing unit
263, 273 handover control unit

The invention claimed is:

1. A communication control device that manages a secondary system that secondarily utilizes a first frequency channel for a primary system, the secondary system including one or more communication control nodes that communicate wirelessly through the first frequency channel, and a wireless communication device that communicates with the communication control nodes, the communication control device comprising:

circuitry configured to
identify, from among the one or more communication control nodes, candidate communication control nodes which the wireless communication device can wirelessly communicate with based on geolocation information of the wireless communication device and geolocation information of the one or more communication control nodes;
transmit a reconfiguration request to the wireless communication device;
transmit a measurement request to the wireless communication device in response to receiving, from the wireless communication device, a response after the wireless communication device performs a reconfiguration for performing a measurement with the candidate communication control nodes;
receive a measurement report from the wireless communication device regarding a communication quality between the wireless communication device and the candidate communication control nodes after the wireless communication device performs the reconfiguration;
identify, from among the identified candidate communication control nodes, a second communication control node that satisfies a predetermined condition of being able to utilize the first frequency channel for the primary system based on the measurement report; and
control a handover from a first communication control node that wirelessly communicates with the wireless communication device to the second communication control node that satisfies the predetermined condition, wherein the circuitry notifies the wireless communication device of information regarding a second frequency channel of a handover destination and requests the second communication control node to receive the handover when the first communication control node requests an assist with the handover, the predetermined condition includes a condition that the wireless communication device can secondarily utilize the first frequency channel without causing interference to the primary system even after the handover is performed, the second communication control node is identified as satisfying the condition, and the wireless communication device receives, through the first frequency channel, an enablement beacon from the second communication control node.

2. The communication control device according to claim 1, wherein when the first communication control node further requests the assist of the handover, the circuitry notifies the wireless communication device of a parameter for receiving a beacon transmitted through a frequency channel that the secondary system is able to utilize.

3. The communication control device according to claim 2, wherein the handover includes a control of forwarding communication data addressed to the wireless communication device from the first communication control node to the second communication control node.

4. The communication control device according to claim 1, wherein the circuitry recognizes at least one second communication control node that satisfies the predetermined condition among the one or more communication control nodes on a basis of a measurement result of a communication quality.

5. The communication control device according to claim 1, wherein the circuitry recognizes the handover by recognizing at least one communication control node that satisfies the predetermined condition among the one or more communication control nodes.

6. The communication control device according to claim 1, wherein the first communication control node is a communication control node included in another system different from the secondary system.

7. The communication control device according to claim 6, wherein the another system different from the secondary system is the primary system.

8. The communication control device according to claim 1, wherein the first communication control node is another communication control node among the one or more communication control nodes included in the secondary system.

9. The communication control device according to claim 1, wherein the secondary system secondarily utilizes two or more frequency channels, and the handover is a handover from an original frequency channel through which the wireless communication device communicates wirelessly among the two or more frequency channels to another frequency channel among the two or more frequency channels.

10. The communication control device according to claim 9, wherein the circuitry recognizes the handover by recognizing at least one frequency channel other than the original frequency channel among the two or more frequency channels.

11. The communication control device according to claim 1, wherein the control of the handover includes deciding an execution of the handover of the wireless communication device.

12. The communication control device according to claim 1, wherein in the secondary system, a process for enabling wireless communication through the frequency channel by the wireless communication device is executed, before the wireless communication device starts wireless communication through the frequency channel, and the process is executed at a time of the handover.

13. The communication control device according to claim 12, wherein the handover includes controlling a start of the process executed at the time of the handover.

14. The communication control device according to claim 12, wherein the process includes making a request for wireless communication through the frequency channel by the wireless communication device.

15. The communication control device according to claim 14, wherein the request is performed instead by a device other than the wireless communication device, when executed at the time of the handover.

16. The communication control device according to claim 15, wherein the control of the handover includes notifying the wireless communication device of the handover.

17. The communication control device according to claim 1, wherein the communication control device is a control node different from the wireless communication device.

18. The communication control device according to claim 1, wherein the communication control device is the wireless communication device.

19. The communication control device according to claim 1, wherein the secondary system secondarily utilizes the frequency channel by utilizing the frequency channel within a period when the frequency channel for the primary system is not utilized for the primary system.

20. The communication control device according to claim 1, wherein the wireless communication device is configured to notify the first communication control node of update of geolocation information of the communication control device, the first communication control node is configured to check the update of the geolocation information of the communication control device, and the first communication control node is configured to request the communication control device the assist with the handover in response to determining the update of the geolocation information of the communication control device is not in a network of the first communication control node.

21. The communication control device according to claim 1, wherein the wireless communication device transmits, through the first frequency channel, a response to the enablement beacon.

22. A communication control method that is performed by a communication control device, the communication control device managing a secondary system that secondarily utilizes a first frequency channel for a primary system, the secondary system including one or more communication control nodes that communicate wirelessly through the first frequency channel, and a wireless communication device that communicates with the communication control nodes, the communication control method comprising:
identifying, using circuitry, from among the one or more communication control nodes, candidate communication control nodes which the wireless communication device can wirelessly communicate with based on geolocation information of the wireless communication device and geolocation information of the one or more communication control nodes;
transmitting a reconfiguration request to the wireless communication device;
transmitting a measurement request to the wireless communication device in response to receiving, from the wireless communication device, a response after the wireless communication device performs a reconfiguration for performing a measurement with the candidate communication control nodes;
receiving a measurement report from the wireless communication device regarding a communication quality between the wireless communication device and the candidate communication control nodes after the wireless communication device performs the reconfiguration;
identifying, from among the identified candidate communication control nodes, a second communication control node that satisfies a predetermined condition of being able to utilize the first frequency channel for the primary system based on the measurement report; and
controlling a handover from a first communication control node that wirelessly communicates with the wireless communication device to the second communication control node that satisfies the predetermined condition, wherein
the control of the handover includes notifying the wireless communication device of information regarding a second frequency channel of a handover destination and requesting the second communication control node to receive the handover when the first communication control node requests an assist with the handover,
the predetermined condition includes a condition that the wireless communication device can secondarily utilize the first frequency channel without causing interference to the primary system even after the handover is performed,
the second communication control node is identified as satisfying the condition, and
the wireless communication device receives, through the first frequency channel, an enablement beacon from the second communication control node.

* * * * *